(12) United States Patent
Nishizaka et al.

(10) Patent No.: US 8,147,021 B2
(45) Date of Patent: Apr. 3, 2012

(54) PRINTER

(75) Inventors: Katsuhiko Nishizaka, Kitakyushu (JP); Hisataka Kugimachi, Matsumoto (JP); Tsutomu Iwanaga, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 12/559,859

(22) Filed: Sep. 15, 2009

(65) Prior Publication Data

US 2010/0097420 A1   Apr. 22, 2010

Related U.S. Application Data

(62) Division of application No. 11/725,213, filed on Mar. 15, 2007, now Pat. No. 7,607,748.

(30) Foreign Application Priority Data

| Mar. 15, 2006 | (JP) | 2006-071372 |
| Mar. 23, 2006 | (JP) | 2006-080191 |
| Mar. 27, 2006 | (JP) | 2006-086128 |
| Apr. 3, 2006 | (JP) | 2006-101567 |

(51) Int. Cl.
*B41J 29/38* (2006.01)

(52) U.S. Cl. ............... 347/14; 347/7; 347/101

(58) Field of Classification Search ............... 347/7, 14, 347/19, 22, 23, 29, 35, 36, 40–43, 89, 90
See application file for complete search history.

(56) References Cited

U.S. PATENT DOCUMENTS

| 5,706,037 | A * | 1/1998 | McIntyre | 347/3 |
| 5,856,834 | A | 1/1999 | Murphy, III | |
| 6,116,715 | A | 9/2000 | Lefebvre et al. | |
| 6,762,854 | B1 | 7/2004 | Murakami et al. | |
| 6,918,645 | B2 * | 7/2005 | Takahashi | 347/16 |
| 6,995,858 | B2 | 2/2006 | Murakami et al. | |
| 7,195,329 | B2 * | 3/2007 | Lapstun et al. | 347/17 |
| 7,283,258 | B1 | 10/2007 | Kuno et al. | |
| 7,362,466 | B2 | 4/2008 | Semma et al. | |
| 7,481,520 | B2 | 1/2009 | Takei | |
| 2009/0122124 | A1 | 5/2009 | Takei | |

FOREIGN PATENT DOCUMENTS

| JP | 63-052159 A | 3/1988 |
| JP | 09-120238 A | 5/1997 |
| JP | 10-095132 A | 4/1998 |
| JP | 10-166615 A | 6/1998 |

(Continued)

*Primary Examiner* — Thinh Nguyen

(74) *Attorney, Agent, or Firm* — Nutter McClennen & Fish LLP; John J. Penny, Jr.; Michael P. Visconti, III

(57) ABSTRACT

When the number of sheets that have been printed has reached the number of sheets guaranteed for printing, a number representing a upper limit of the number of sheets that can be printed, an ink jet printer declines to perform printing with an ink cartridge for which the number of sheets guaranteed for printing has been set, but when the number of sheets printed has not reached the number of sheets guaranteed for printing, performs printing of an image onto a recording sheet S by using the ink cartridge, the ink jet printer determining the number of sheets remaining N on the basis of the number of sheets printed that have been printed, and displaying on a display unit 82 the number of sheets remaining information display screen 80 incorporating a number of sheets remaining display unit 80b that causes visual recognition of a relation between the number of sheets guaranteed for printing and the number of sheets remaining.

9 Claims, 31 Drawing Sheets

FOREIGN PATENT DOCUMENTS

| | | |
|---|---|---|
| JP | 2000071582 A | 3/2000 |
| JP | 2001-253148 A | 9/2001 |
| JP | 2001253148 A | 9/2001 |
| JP | 2002169431 A | 6/2002 |
| JP | 2002-283670 A | 10/2002 |
| JP | 2004330770 A | 11/2004 |
| JP | 2004331344 A | 11/2004 |
| JP | 2005-059304 A | 3/2005 |
| JP | 2005238832 A | 9/2005 |

* cited by examiner

PRINTER

BACKGROUND OF THE INVENTION

1. Field of the Invention

The present invention relates to a printing device that prints on a print medium.

2. Description of the Related Art

Conventionally, a printing device has been proposed that ejects ink to print and provides a user with information on the amount of ink remaining (For instance, refer to JP-A-2002-283670 (FIG. 15)). The device described in this publication manages, as usage information, the amount of ink consumed during previous instances of printing, and on the basis of the usage information calculated displays on a display unit the number of sheets, together with the amount of ink remaining.

A printing device has also been proposed that incorporates a function of printing on a print sheet by ejecting from nozzles of a print head ink contained in a cartridge and a function of cleaning the nozzles by absorbing from the nozzles ink contained in the cartridge. This device also manages the amount of ink remaining in the cartridge and when the amount of ink remaining reaches a certain value reduces to a half of a normal value the amount of ink to be used for cleaning (for instance, refer to JP-A-2005-59304 (FIG. 9)). This printing device makes it possible to reduce the amount of ink used for cleaning, thereby increasing the number of sheets that can still be printed.

In addition, a device has also been proposed that performs flushing while a printing operation is being performed. In this operation the flushing ejects ink onto an area in which printing is not taking place, so as to clear thickening of ink caused by evaporation from nozzles of volatile liquid contained in the ink (For instance, refer to JP-A-10-95132).

SUMMARY OF THE INVENTION

In the printing device described in the JP-A-2002-283670, however, some cases have arisen in which if printing has been performed in conditions that are different from those of previous printings, the number of sheets available for printing that is being displayed may differ from the number of sheets that can in practice be printed. The reason for this is that the number of sheets that can still be printed is determined on the basis of usage information during prior printings, and the number of sheets that can still be printed that is determined on this basis is displayed. However, users wish to know the number of sheets that can still be printed with the cartridge, and to ensure that a scheduled number of sheets can indeed be printed. Thus, there is a desire to ascertain with a greater degree of certainty the number of sheets that can actually be printed.

In a printing device, it is possible to mount a cartridge in which the number of sheets guaranteed for printing has been set is the upper limit of the number of sheets that can still be printed, and to adopt a method of control according to which use of the cartridge is terminated (described as shut-off control) whenever the number of sheets that has been printed reaches the number of sheets guaranteed for printing. If such a shut-off control is adopted, a user can easily and clearly calculate from the number of sheets that has been printed and the number of sheets guaranteed for printing how many sheets can still be printed with a cartridge that is mounted at that time. In this way, by checking the amount of ink remaining, as in previous cases, the need for a user to predict personally how many sheets can still be printed (the number of sheets that can still be printed), can be eliminated, and this can enhance usability. In a printing device in which such shut-off control has been adopted, predictions are made about the amount of ink necessary for printing the number of sheets guaranteed for printing and the amount of ink that is likely to be consumed in the processes of cleaning or flushing to be performed before printing of the number of sheets guaranteed for printing has been completed, and on the basis of this prediction, the amount of ink to be filled in a cartridge before shipping from a plant is set.

However, when use of a cartridge has been terminated as a result of shut-off control, the amount of ink remaining in a cartridge may still be greater if the number of actual instances of cleaning has been smaller than a number of instances of cleaning that has been predicted. In contrast, if the number of actual instances of cleaning is larger than the number of instances of cleaning that has been predicted, the amount of ink remaining in the cartridge may as the result of shut-off control prove inadequate before use of the cartridge is terminated, and such an eventuality would force a user to cancel the instances of cleaning. In addition, in a printing device in which such a shut-off function has been adopted, as described in JP-A-2005-59304, even though the amount of ink used for cleaning is halved when an amount of ink remaining reaches a certain value, if the number of actual instances of cleaning is greater than the number of times predicted, ink may still run out even before the number of pages actually printed reaches that of pages guaranteed for printing. Thus, there is a danger of malfunctioning of the shut-off control occurring frequently. Similarly, when the number of actual instances of flushing is greater than the number of instances of flushing that have been scheduled, problems can nonetheless arise, insofar that, even though the number of pages that has been printed is less than the number of sheets guaranteed for printing, use of the cartridge may nonetheless be terminated as the amount of ink in the cartridge becomes insufficient. This would thus prevent implementation of shut-off control, or alternatively force a user to cancel flushing in order to ensure printing of the number of pages guaranteed for printing.

One of objects of the present invention is to provide a printing device, a print alarm method, and a program therefore that, by means of a cartridge containing colorants, can advice a user with a greater degree of certainty of the number of pages remaining for printing.

Another object of the present invention is to provide a printing device, a print alarm method, and a program therefore that can notify a user of the number of pages remaining for printing on the basis of a plurality of more reliable printing media.

In a printing device in which the shut-off control has been adopted, a further object of the present invention is not only to implement shut-off control, but also to guarantee reliable performing of the cleaning of nozzles whenever cleaning of nozzles is requested.

In a printing device in which the shut-off function has been adopted, a still further object of the present invention is not only to implement shut-off control, but also to provide a guarantee of reliable flushing whenever a request for such flushing is made while printing is being performed.

In order to achieve at least one of the objects described above, the present invention is constructed as follows.

A first printing device of the present invention is a device for printing on a print medium, including: a printing module that prints an image onto a print medium by using a cartridge that contains a colorant, and for which cartridge is set a number of sheets guaranteed for printing, the number representing an upper limit of sheets that can be printed; a notification module that notifies information on a number of sheets remaining that can be printed with the cartridge; and a control module that prevents the printing module from printing with the cartridge when the number of sheets printed by the printing module has reached the number of sheets guaranteed for printing, and causes the printing module to print an image onto the print medium with the cartridge when the number of sheets printed has not reached the number of sheets guaranteed for printing, the control module determining, on the basis of a number of sheets that have been printed, the number of sheets remaining and causing the notification module to notify information on thus determined number of sheets remaining.

In this first printing device, when the number of sheets that have been printed reaches the number of sheets guaranteed for printing which is an upper limit of the number of sheets that can still be printed, printing by use of a cartridge that contains colorants, and for which the number of sheets guaranteed for printing has been set, is disabled, and when the number of sheets printed has still to reach the level of sheets guaranteed for printing, printing of images onto a print medium is enabled by use of the cartridge. Specifically on the basis of the number of sheets guaranteed for printing that in turn is based on the number of sheets printed, the print device determines the number of sheets remaining, a number that represents the number of sheets that can still be printed, and notifies information relating to the number of sheets remaining that has thus been determined. In this way, by using a cartridge for which the number of sheets guaranteed for printing has been set, the printing device continues printing until such time as the number of sheets printed reaches that of the number of sheets guaranteed for printing, and notifies users of information relating to the number of sheets remaining, information obtained from the number of sheets guaranteed for printing with this cartridge and that of sheets already printed. Thus, with a cartridge containing colorants it becomes possible to notify users of the number of sheets that can still be printed more accurately. Here, "notifying users of information on the number of sheets that can still be printed" includes, in addition to notifying directly actual information on the number of sheets remaining, notifying indirectly the information by notifying information on the number of sheets that have been printed.

The first printing device of the invention may further include a storage module that stores the number of sheets remaining; and an acquisition module that acquires a notification command for causing the notification module to notify the number of sheets remaining. In this structure, the control module, after causing the printing module to print an image onto the print medium by using the cartridge, reduces the number of sheets remaining and causes the storage module to store the number of sheets remaining; and when the acquisition module has acquired the notification command, the control module reads from the storage module the number of sheets remaining and on the basis of the results read causes the notification module to notify information on the number of sheets remaining.

As the number of sheets remaining is stored in the storage module, the printing device can manage relatively easily information on the number of sheets remaining. Here, "store(s) the number of sheets remaining" includes, in addition to storing directly the actual number of sheets remaining, storing indirectly the number of sheets remaining by storing the number of sheets already printed which is reduced from the number of sheets guaranteed for printing so as to compute the number of sheets remaining. The storage module may be a memory element provided in the cartridge. In this way, since the number of sheets remaining is stored in the memory element provided in the cartridge, the cartridge can be reliably tied to the number of sheets that remain for printing by the cartridge.

In the first printing device of the invention, the control module may cause the notification module to notify the information on the number of sheets remaining in a mode such that a relationship can be recognized between the number of sheets guaranteed for printing and the number of sheets remaining. It thus becomes possible for a user to recognize the number of sheets remaining for printing relative to the number of sheets guaranteed for printing that constitutes an upper limit. The notification module may be a display module that can display images, and the control module may cause the display module to display information on the number of sheets remaining in a mode that facilitates recognition of the relationship between the number of sheets guaranteed for printing and the actual number of sheets remaining, by causing the display module to display in different modes an area corresponding to the number of sheets remaining and an area corresponding to the number of sheets actually printed. In this manner, a user can recognize the number of sheets remaining visually by means of images, Furthermore, as the number of sheets remaining and the number of sheets actually printed are displayed in different modes as areas, a user can check visually, more rapidly than in a case in which a user reads written (characters), the relationship between the number of sheets guaranteed for printing and that of sheets remaining. The control module may cause the display means to display in different colors an area corresponding to the number of sheets remaining and an area corresponding to the number of sheets already printed. In this way, it becomes easier to check visually an area corresponding to the number of sheets remaining and an area corresponding to the number of sheets already printed. When causing the display module to display in different modes an area corresponding to the number of sheets remaining and an area corresponding to the number of sheets already printed, the control module may divide the number of sheets guaranteed for printing into a plurality of blocks within the areas in which the number of sheets guaranteed for printing is displayed and cause the display means to display in different modes blocks corresponding to the number of sheets remaining and those corresponding to the number of sheets already printed. In this way, it becomes easier to differentiate and display by means of blocks an area corresponding to the number of sheets remaining and an area corresponding to the number of sheets actually printed. The control module may cause the display means to display in a mode such that as the number of sheets printed increases, out of areas in which the number of sheets guaranteed for printing is displayed, areas corresponding to the number of sheets remaining shrink. When printing takes place, the area corresponding to the number of sheets remaining is reduced on the display screen, and it becomes easier for a user to keep track of progress in the number of sheets remaining.

In the first printing device of the invention, the control module may keep track of an amount of colorant remaining in the cartridge, and when the amount of the colorant remaining falls below a first predetermined amount remaining, or when the number of sheets remaining falls below a first predetermined number of sheets remaining, the control module may cause the notification module to notify a message to the effect that the number of sheets that can be printed with the cartridge is limited, and as soon as, and after, the amount of the colorant remaining has reached a second predetermined amount remaining, or the number of sheets remaining has reached a second predetermined number of sheets remaining, the control module may cause the notification module to notify a message to the effect that printing is not possible with the cartridge, and prevent the printing module from printing with the cartridge. In this way, it becomes possible for a user to keep track, by means of messages, of decreases in the number of sheets remaining, or in the amounts of colorant remaining. Furthermore, because no printing takes place with the cartridge after the amount of colorant remaining reaches the second predetermined amount remaining, any potential damage to the printing module caused by using it when the amount of colorant remaining is limited can be prevented. Moreover, because no printing takes place with the cartridge after the number of sheets remaining reaches the second predetermined number of sheets remaining, printing between the start of printing and the second predetermined number of sheets remaining can be ensured. The "second predetermined number of sheets remaining", may be set to a number of sheets that guarantees the printing of the number of sheets guaranteed for printing.

In the first printing device of the invention, the printing module may print a photographic image onto the print medium by using the cartridge that contains ink as the colorant. In this way, in comparison with a case in which printing of characters and photographs is mixed together, fluctuations in the amounts of colorants consumed in the course of the printing of images will be reduced, and the amounts of colorant that need to be contained in a cartridge in advance may be determined relatively easily. In addition, clear printing can be performed by using ink as a colorant when a photograph is printed.

A second printing device of the invention is a device for printing on a print medium, including: a notification module that notifies information; a printing module that prints an image onto a print medium by using a cartridge that contains at least a guaranteed amount of colorant for printing, the guaranteed amount being an amount of colorant that is adequate for printing an upper limit of sheets for printing, the upper limit set as an upper limit of the number of sheets that can be printed; a storage module that stores information on amounts necessary, including amounts of colorants necessary, the amounts of colorants necessary being amounts of colorants that are adequate to print a predetermined number of sheets of each of multiple types of print media; and a control module that prevents the print module from printing with the cartridge when the amount of colorant printed for printing by the printing module has reached the amount of colorant guaranteed for printing, and causes the printing module to print an image onto the print medium with the cartridge when the amount of colorant printed has not reached the amount of colorant guaranteed for printing, the control module determining, on the basis of the amounts of colorants printed, the amounts of colorants guaranteed for printing, and the information on amounts necessary stored in the storage module, the number of sheets remaining for each of the multiple types of print media, and causing the notification module to notify information on thus determined number of sheets remaining.

When the amount of colorant printed reaches the amount of colorant guaranteed for printing, this second printing device does not permit printing by use of a cartridge that contains colorant of at least the amount of colorant guaranteed for printing, but it does permit printing of images onto a print medium with this cartridge when the amount of colorant printed has not reached the amount of colorant guaranteed for printing. On the basis of information on amounts necessary for multiple types of print media, including the amounts of colorant already printed, the amount of colorant guaranteed for printing, and the amounts of colorant necessary, the printing device determines in respect of each of the multiple types of print media, the number of sheets remaining, and notifies the numbers of sheets remaining thus determined. In other words, by using amounts of colorant guaranteed for printing that correspond to an upper limit of sheets for printing, the amounts of colorant consumed during printing, and information about the amounts necessary, including the amounts of colorant necessary, by using the cartridge until the upper print limit that is the upper limit for printing is reached, the number of sheets remaining can be determined for each of the multiple types of print media while printing is taken place. Thus, in comparison with a case in which no upper limit is set for the number of sheets to be printed with the cartridge, and in comparison with circumstances where the number of sheets remaining is notified by determining, on the basis of colorants used in printing in the past, the number of sheets of various print media remaining, the printing device of the present invention can notify a user of the numbers of sheets remaining for printing corresponding multiple types of print media more accurately In the second printing device of the invention, the control module determines the amounts of colorant remaining in respect of each of the multiple types of printing media, on the basis of the amounts of colorant printed, the amounts of colorant guaranteed for printing, and on the basis of information on the necessary amounts stored in the storage module. The control module may determine the amounts remaining for printing, which constitutes the amounts of colorant that remain available for printing, on the basis of the difference between the amounts of colorant already used in printing and the amounts of colorant guaranteed for printing, and may determine the number of sheets remaining in respect of each of the multiple types of print media by dividing the amounts of colorant remaining thus determined by the necessary amounts of colorant that are contained in the information relating to amounts necessary.

In the second printing device of the invention, the storage module may also store the amount of colorant printed, and the control module may, after causing the print module to print an image onto the print medium by using the cartridge, add an amount of colorant which has been used during the printing to the amount of colorant printed, and cause the storage module to store the amount of colorant printed. In this way, it becomes possible to store updated amounts of colorant that have been printed, thereby facilitating relatively easy management of amounts of colorant printed. Here, "store the amounts of colorant printed" includes, in addition to storing directly the amounts of coloring material printed, storing the amounts of colorant printed indirectly by storing the amount of colorant remaining, an amount that can compute the amount of colorant printed by subtracting this amount from the amount of colorant guaranteed for printing.

In the second printing device of the invention, the storage module may also stores the number of sheets remaining, and the control module may, after causing the printing module to print images onto the print media by using the cartridge, determine an amount of colorant printed to which the amount of colorant used in printing has been added. The second printing device may also determine the number of sheets remaining in respect of each of the multiple types of printing media, on the basis of the amounts of colorant printed thus determined, the amounts of colorant guaranteed for printing, and the information relating to necessary amounts stored in the storage module, and store in the storage module, the number of sheets remaining thus determined. In this way, as the number of sheets remaining for printing is stored in the storage module when the printing module prints on a print medium, the number of sheets remaining can be notified more rapidly than for instance in the case of any printing device that determines the number of sheets remaining only after a notification command has been issued relating to the number of sheets remaining. Here, "store the number of sheets remaining", includes, in addition to storing directly the number of sheets remaining, storing the number of sheets remaining indirectly by storing the number of sheets that has been printed, a number that can compute the number of sheets remaining by means of subtracting this number from the upper printing limit.

In the second printing device of the invention, in the aspect of storing in the storage module the amount of colorant printed and the number of sheets remaining, the storage module may be a memory element provided in the cartridge. In this manner, as information on the cartridge (such as the amount of colorant printed) is stored in the memory element provided in the cartridge, the cartridge and the information on the cartridge can be reliably linked.

The second printing device of the invention may further include an acquisition module that can acquire a notification command to the effect that the notification module notify the number of sheets remaining, and when the acquisition module acquires the notification command, the control module may cause the notification module to notify the number of sheets remaining thus determined. In this way, it becomes possible to notify the number of sheets remaining, whenever a user needs it.

In the second printing device of the invention, the storage module stores the information on amounts necessary, information in which the necessary amount of colorant has been defined on the basis of printing conditions, including at least one of bordered or borderless printing, and normal quality or high-quality printing, and on the basis of the amounts of colorant printed, the amounts of colorant guaranteed for printing, and the information on necessary amounts stored in the storage module, in the course of determining, for each of the multiple types of print media, the number of sheets remaining, the control module may determine the number of sheets remaining in respect of each of the multiple types of print media. In this way, as the number of sheets remaining that meet the printing conditions for each of the multiple types of print media can be notified, a user can obtain more detailed information on the number of sheets remaining.

In the second printing device of the invention, when the number of sheets remaining thus determined is less than one sheet, the control module may determine that the amount of colorant printed has reached the amount of colorant guaranteed for printing and may thus prevent the printing module from printing with the cartridge. In this manner, printing in excess of the amounts of colorant guaranteed for printing can be avoided.

In the second printing device of the invention, the notification module may be a display module that is capable of displaying images, and the control module may enable the display module to display the number of sheets remaining thus determined. In this way, a user can recognize the number of sheets remaining visually by means of images.

In the second printing device of the invention, the printing module may print images of photographs onto the print media by use of a cartridge that contains ink as the colorant. In this way, clear printing can be performed by using ink as a colorant when a photograph is printed.

A third printing device of the present invention is a device for printing on a print medium, including: a printing module that prints onto a print medium by causing ink contained in a cartridge to be ejected from nozzles of a print head; a printing control module that controls the printing module in such a way that, when a number of sheets printed has not reached the number of sheets guaranteed for printing, printing onto the print medium is performed on the basis of print data and, when the number of sheets printed has reached the number of sheets guaranteed for printing, printing with the cartridge is shut off; a cleaning module that cleans the nozzles by sucking in from the nozzles ink contained in the cartridge; an amount of cleaning ink setting module that, in response to a request for cleaning, sets an amount of cleaning ink to be used in an instance of the requested cleaning, the amount of cleaning ink being less than an amount of residual ink that is predicted to remain in the cartridge after the number of sheets that have been printed has reached the number of sheets guaranteed for printing; and a cleaning control module that controls the cleaning module to perform cleaning with the amount of cleaning ink set by the amount of cleaning ink setting module.

When the number of sheets printed has not reached the number of sheets guaranteed for printing, the third printing device controls the printing module in such a way that printing is performed onto a print medium on the basis of print data, and the printing device shuts off printing with a cartridge when and after the number of sheets printed reaches the number of sheets guaranteed for printing (shut-off control). When a request has been made for the cleaning of nozzles, sets an amount of cleaning ink to be used in an instance of the requested cleaning, the amount of cleaning ink being less than an amount of residual ink that is predicted to remain in the cartridge after the number of sheets that have been printed has reached the number of sheets guaranteed for printing, and controls the cleaning module to perform cleaning with the amount of cleaning ink set by the amount of cleaning ink setting module. Thus, as the amount of cleaning ink set is less than the predicted amount of residual ink at the time that the number of sheets printed reaches the number of sheets guaranteed for printing, running out of ink hardly occurs before the number of sheets printed reaches the number of sheets guaranteed for printing, and effective shut-off control is thereby achieved. As the amount of cleaning ink is set within a range of the predicted amount of residual ink, whenever a request is made for the cleaning of nozzles, the cleaning of nozzles can be performed reliably. The printing control module and the cleaning control module may be configured as either a single control unit, or as separate control units.

In the third printing device of the invention, the amount of cleaning ink setting module, in response to a request for cleaning, may set a value obtained by dividing the amount of residual ink predicted by a pre-fixed value (>1) as the amount of cleaning ink to be used in an instance of the requested cleaning. In this manner, the amount of cleaning ink can be set easily. The fixed value need not in particular be limited as long as it is a value that is greater than 1, but is preferably set to 2.

The third printing device of the invention may further include: a total amount of printed ink derivation module that derives the total amount of printed ink used in printing onto the print medium; and a total amount of cleaning ink derivation module that derives the total amount of cleaning ink used in cleaning of the nozzles. In this third printing device, the amount of cleaning ink setting module, in response to a request for cleaning, may determine, on the basis of the total amount of printed ink printed by that time, a predicted value of the total amount of ink that will have been printed by the time that the number of sheets printed reaches the number of sheets guaranteed for printing, and may set, as the amount of residual ink predicted, a value obtained by subtracting a total ink consumption amount which includes the predicted value of the total amount of printed ink and the total amount of cleaning ink used by that time from an initial amount of ink initially filled in the cartridge. In this way, the predicted amount of residual ink can be determined more accurately. The total amount of ink consumed preferably includes an amount consumed in any task other than printing or cleaning (e.g., in flushing). The amount of cleaning ink setting module may set, as the predicted total amount of printing ink, a value obtained by multiplying by the number of sheets guaranteed for printing a value obtained by dividing the total amount of printing ink by the total number of sheets printed by that time. In this way the predicted total amount of printing ink can be determined more accurately.

A fourth printing device of the present invention is a device for printing onto a print medium, including: a printing module that prints onto a print medium by causing ink contained in a cartridge to be ejected from nozzles of a print head; a printing control module that controls the printing module in such a way that, when a number of sheets printed has not reached the number of sheets guaranteed for printing, printing onto the print medium is performed on the basis of print data and, when the number of sheets printed has reached the number of sheets guaranteed for printing, printing with the cartridge is shut off; a cleaning module that cleans the nozzles by sucking in from the nozzles the ink contained in the cartridge; a cleaning number storage module that stores a number of instances of cleaning performed during one or more cartridges used before a new cartridge were attached; an anticipated cleaning number setting module that sets, on the basis of the number of instances of cleaning stored in the cleaning number storage module, an anticipated number of instances of cleaning that are considered likely to be performed during the new cartridge is attached; an amount of cleaning ink setting module that, in response to a first request for cleaning after conversion to the new cartridge, sets an amount of cleaning ink to be used for each instance of cleaning performed before the number of request for cleaning reaches the anticipated number of instances of cleaning, on the basis of the amount of residual ink predicted and the anticipated number of instances of cleaning, while the amount of cleaning ink setting module sets, in response to a request for cleaning, whose number is equal or greater than the anticipated number of instances of cleaning after conversion to the new cartridge, an amount less than the residual ink predicted as an amount of cleaning ink to be used for each instance of cleaning performed when and after the number of request for cleaning reaches the anticipated number of instances of cleaning; and a cleaning control module that controls the cleaning module to perform cleaning of the nozzles with the amount of cleaning ink set by the amount of cleaning ink setting module.

When the number of sheets printed does not reach the predefined number of sheets guaranteed for printing, the fourth printing device controls the control module in such a way that printing onto a print medium is performed on the basis of print data, and printing with the cartridge is shut off when the number of sheets printed reaches the number of sheets guaranteed for printing (shut-off control). In response to a first request for cleaning after conversion to the new cartridge, the fourth printing device sets an amount of cleaning ink to be used for each instance of cleaning performed before the number of request for cleaning reaches the anticipated number of instances of cleaning, on the basis of the amount of residual ink predicted and the anticipated number of instances of cleaning. On the other hand, in response to a request for cleaning, whose number is equal or greater than the anticipated number of instances of cleaning after conversion to the new cartridge, the fourth printing device sets an amount less than the residual ink predicted as an amount of cleaning ink to be used for each instance of cleaning performed when and after the number of request for cleaning reaches the anticipated number of instances of cleaning. And the fourth printing device further controls the cleaning module to perform cleaning of the nozzles with the amount of cleaning ink set by the amount of cleaning ink setting module. In this printing device, when a cartridge is replaced by a new one, the amount of cleaning ink is set in the light of the number of instances of cleaning that have been performed while one or more cartridges that had been used before the new cartridge were attached. Thus, the amount of cleaning ink for one instance of cleaning will be appropriate amount. In addition, after the number of instances of cleaning following the replacement of a new cartridge reaches the predicted number of instances of cleaning, cleaning is done with an amount of cleaning ink that is less than the predicted amount of residual ink predicted at that time. Thus, cleaning can be performed reliably, and running out of ink hardly occurs before the number of sheets printed reaches the number of sheets guaranteed for printing, and effective shut-off control is thereby achieved. The printing control module and the cleaning control module may be configured as either a single control unit, or as separate control units.

In the fourth printing device of the invention, the amount of cleaning ink setting module may set, in response to a request for cleaning, whose number is equal or greater than the anticipated number of instances of cleaning after conversion to the new cartridge, a value obtained by dividing the amount of residual ink predicted by a pre-fixed value (>1) as the amount of cleaning ink to be used for each instance of cleaning performed when and after the number of request for cleaning reaches the anticipated number of instances of cleaning. In this way, the amount of cleaning ink can be set easily. The fixed value need not in particular be limited as long as it is a value greater than 1, but preferably is set to 2.

In the fourth printing device of the invention, the cleaning number storage module may stores the number of instances of cleaning performed during a cartridge used immediately before the new cartridge is attached, and the anticipated cleaning number setting module may set, when the cartridge is replaced with the new cartridge, the number of instances of cleaning stored in the cleaning number storage module to the anticipated number of instances of cleaning which is considered to be performed during the new cartridge is attached. In this way, the amount of cleaning ink for one instance of cleaning tend to be appropriate amount. The predicted number of instances of cleaning may be an average value of all cartridges used before replacement in respect of instances of cleaning that were performed while individual cartridges were mounted or an average value of instances of cleaning performed while only some of all the cartridges used before replacement were mounted.

The fourth printing device of the present invention may further include a total amount of printed ink derivation module that derives the total amount of printed ink used in printing onto the print medium; and a total amount of cleaning ink derivation module that derives the total amount of cleaning ink used in cleaning of the nozzles. In this fourth printing device, the amount of cleaning ink setting module, in response to a first request for cleaning after conversion to the new cartridge, or in response to a request for cleaning, whose number is equal or greater than the anticipated number of instances of cleaning after conversion to the new cartridge, may determines on the basis of the total amount of printed ink printed by that time, a predicted value of the total amount of ink that will have been printed by the time that the number of sheets printed reaches the number of sheets guaranteed for printing, and may set, as the amount of residual ink predicted, a value obtained by subtracting a total ink consumption amount which includes the predicted value of the total amount of printed ink and the total amount of cleaning ink used by that time from an initial amount of ink initially filled in the cartridge. In this way, the predicted amount of residual ink can be determined more accurately. The total amount of ink consumed preferably includes an amount consumed in any task other than printing or cleaning (e.g., in flushing). The amount of cleaning ink setting module may set, as the predicted total amount of printing ink, a value obtained by multiplying by the number of sheets guaranteed for printing a value obtained by dividing the total amount of printing ink by the total number of sheets printed by that time. In this way the predicted total amount of printing ink can be determined more accurately.

The third and fourth printing devices of the invention are preferably a printer used exclusively for printing photographs. For instance, if they print character strings, they may print character strings on only one line of one sheet, or on several tens of lines on one sheet. Thus, although the amount of printing ink used per page tends to vary widely, the degree of precision of the predicted amounts of residual ink will improve because, if only photographs are printed, variations in the amount of printing ink used per page can be restricted. It is also preferable that the size of a print medium be a predetermined one. For instance, the amount of printing ink tends to vary widely if printing devices print photographs on both an L-sized sheet and an A-4 size sheet. However, if printing is confined to L-size sheets, precision in the predicted amount of residual ink will improve because variations in the amount of printing ink can be confined to a low level.

A fifth printing device of the present invention is a device for printing on a print medium, including: a print head in which are formed a plurality of nozzles that are capable of ejecting ink contained in a cartridge; a printing control module that controls the print head in such a way that, when a number of sheets printed has not reached a number of sheets guaranteed for printing, a printing operation of ejecting ink onto a print medium from the nozzles is performed on the basis of print data, and when the number of sheets printed has reached the number of sheets guaranteed for printing, the printing operation is shut off; a flushing request module that requests performance of flushing that ejects ink from the nozzles onto an area where printing does not take place: and a flushing control module that, in response of a request for flushing by the flushing request module while a printing operation onto a sheet of print medium is being performed, controls the print head in such a way that the requested flushing is performed to an extent that an ink amount actually used for flushing per sheet does not exceed an allowable ink amount for flushing that is derived on the basis of the amount of residual ink predicted and the number of sheets remaining for printing and can be used for flushing per sheet of print medium, where the amount of residual ink predicted being an amount which is predicted to remain superfluous in the cartridge on the assumption that only printing is performed from a time immediately prior to the commencement of the printing operation and the number of sheets printed has reached the number of sheets guaranteed for printing, and the number of sheets remaining for printing being obtained by subtracting the number of sheets printed from the number of sheets guaranteed for printing.

This fifth printing device controls the print head in such a way that, when the number of sheets printed does not reach the number of sheets guaranteed for printing, a printing operation is performed in which ink is ejected on to a print medium from the nozzles on the basis of print data, and when the number of sheets printed reaches the number of sheets guaranteed for printing, the printing operation is shut off (shut-off control). In response of a request for flushing while a printing operation onto a sheet of print medium is being performed, the fifth printing device controls the print head in such a way that the requested flushing is performed to an extent that an ink amount actually used for flushing per sheet does not exceed an allowable ink amount for flushing that is derived on the basis of the amount of residual ink predicted and the number of sheets remaining for printing and can be used for flushing per sheet of print medium, where the amount of residual ink predicted being an amount which is predicted to remain superfluous in the cartridge on the assumption that only printing is performed from a time immediately prior to the commencement of the printing operation and the number of sheets printed has reached the number of sheets guaranteed for printing, and the number of sheets remaining for printing being obtained by subtracting the number of sheets printed from the number of sheets guaranteed for printing. In this way, even if flushing is performed multiple times, actual usage on flushing in respect of one sheet of print medium will very rarely exceed the amount of ink available for flushing in respect of one sheet of the print medium, an amount that is derived on the basis of the predicted amount of residual ink for one sheet of the print medium. Thus, running out of ink hardly occurs before the number of sheets printed reaches the number of sheets guaranteed for printing, and effective shut-off control is thereby achieved. Further, even if more than one instance of flushing is requested in respect of one sheet of print medium, each instance of flushing can be carried out with a degree of certainty. The printing control module and the flushing module may be configured as a single control unit, or as separate control units.

In the fifth printing device of the invention, the flushing control module may determine an amount of ink per flushing on the basis of the allowable ink amount for flushing and a preset number of flushings anticipated per sheet of print medium, and control the print head in such a way that the requested flushing is performed with the determined amount of ink. In this manner, the effects of the present invention can be obtained with a relatively simple structure.

In the fifth printing device of the invention, after the number of instances of flushing, for which requests have been made by the flushing request module while a printing operation was being performed on one sheet of the print medium, has reached the anticipated number, as the amount of ink to be used in the course of this flushing, an amount of ink may be set that is obtained by dividing the amount of ink used in the previous flushing by a numeric value greater than 1. In such a way, even when the number of instances of flushing in respect of one sheet of the print medium exceeds the number of instances of flushing anticipated, actual usage on flushing will not exceed the amount of ink available for usage as flushing in respect of one sheet of the print medium. Here, "a numeric value greater than 1" may be either a fixed value or a fluctuating value, and preferably is a fixed value of "2".

In the fifth printing device of the invention, the flushing request module may request that flushing be performed every time that a predetermined time elapses while a printing operation is being performed on one piece of the print medium. In this manner, flushing can reliably eliminate any thickening of ink in the nozzles. In other words, even when a printing operation has been performed, ink contained in nozzles from which ink has not been ejected thickens. Moreover, the longer the nozzles are left, the more noticeable becomes the degree of the thickening. Thus, it is preferable that flushing be performed every time that a predetermined time elapses. In this context, a relationship between nozzle thickening and the lapse of time can be determined in advance through experimentation, and, on the basis of this relationship, a "predetermined time" can accordingly be set, in other words, a period of time during which a value of viscosity will not prevent ejection of ink from the nozzles. In addition, as the degree of thickening within nozzles may vary depending on the surrounding environment (factors such as temperature and humidity), the predetermined time may also be varied so as to conform with the surrounding environment.

The fifth printing device of the invention is preferably a printer used exclusively for printing photographs. For instance, if character strings are printed, character strings may be printed on only one line of one sheet, or on several tens of lines of one sheet. Thus, although the amount of printing ink per page tends to vary widely, precision in the predicted amount of residual ink will improve because, if only photographs are printed, variations in the amount of printing ink per page can be confined to a low level. It is also preferable that the size of a print medium be a predetermined one. For instance, the amount of ink printed tends to vary widely if printing devices print photographs on both an L-sized sheet and an A-4 size sheet. However, if printing is confined to only L-size sheets, the level of precision in the predicted amount of residual ink will improve because variations in the amount of printing ink can be restricted to low levels.

DESCRIPTION OF THE PREFERRED EMBODIMENTS

First Embodiment

Figure 1:
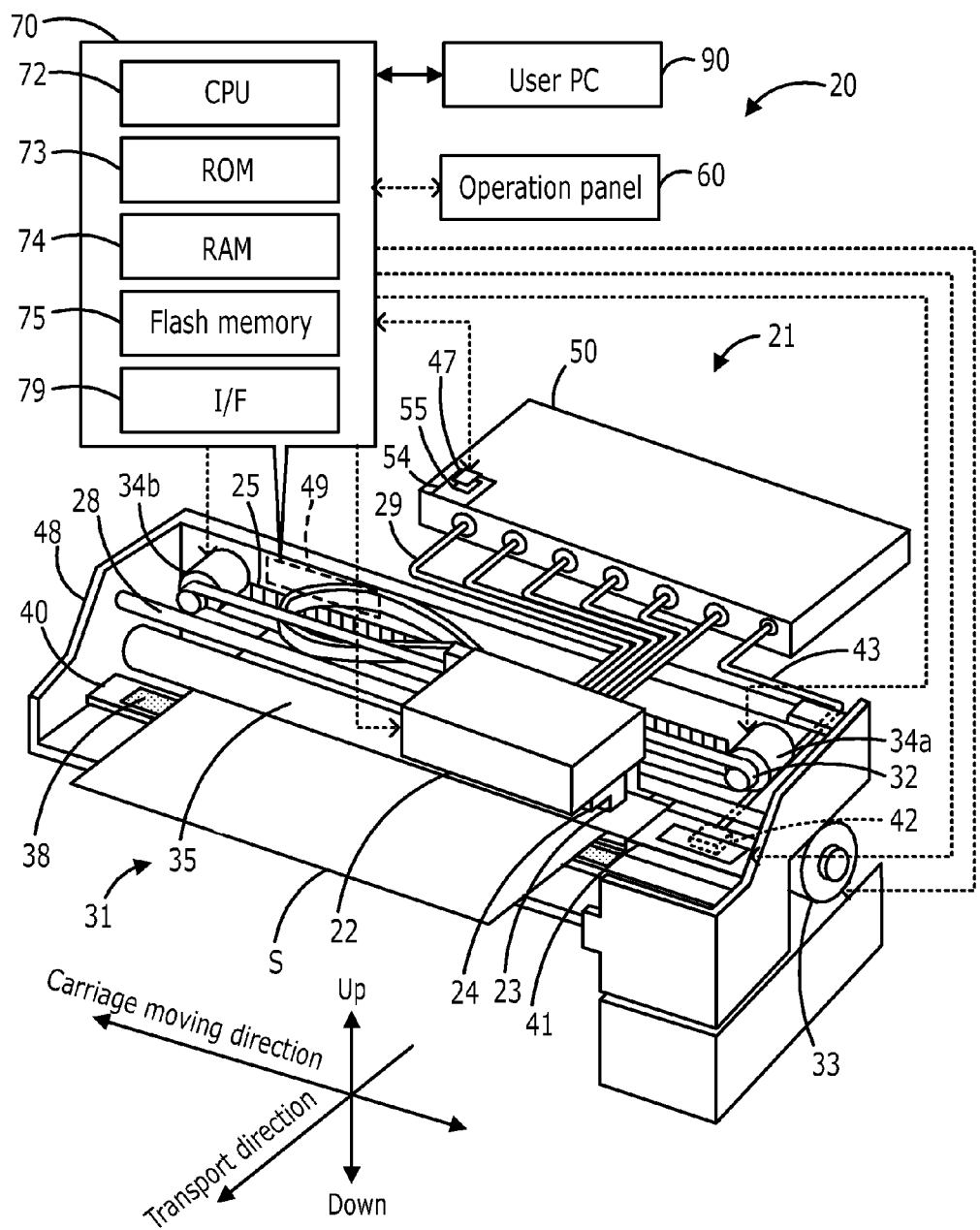
FIG. 1 is a block diagram illustrating an outline of the configuration of an ink jet printer 20 of a first embodiment.
Figure 2:
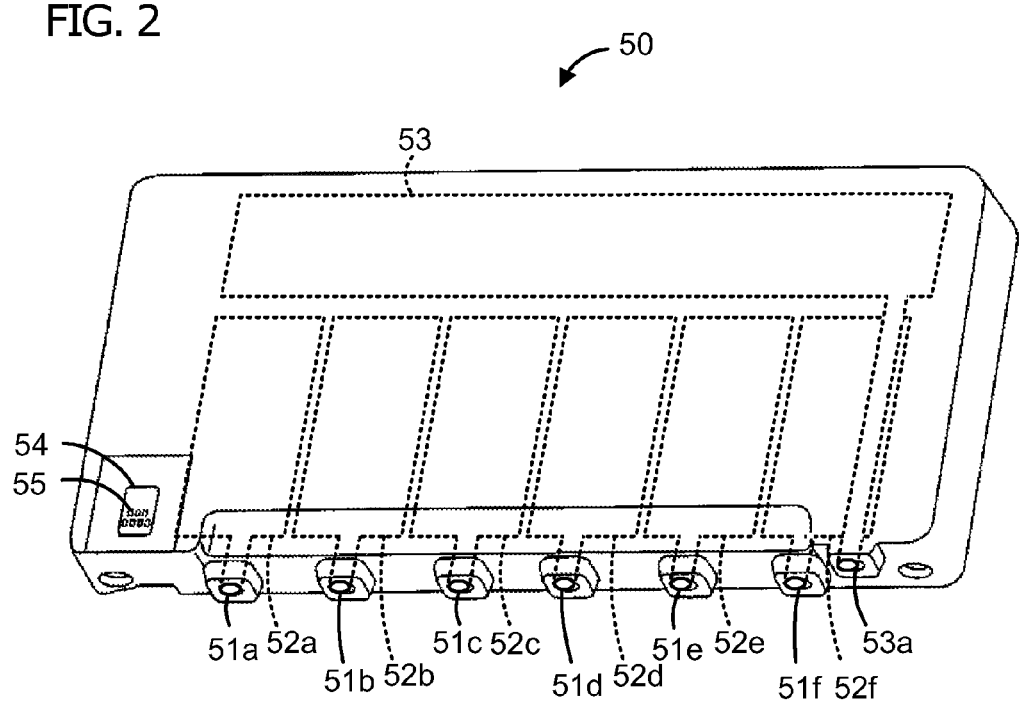
FIG. 2 is an illustration of an outline of the configuration of an ink cartridge 50 of the first embodiment.
Figure 3:
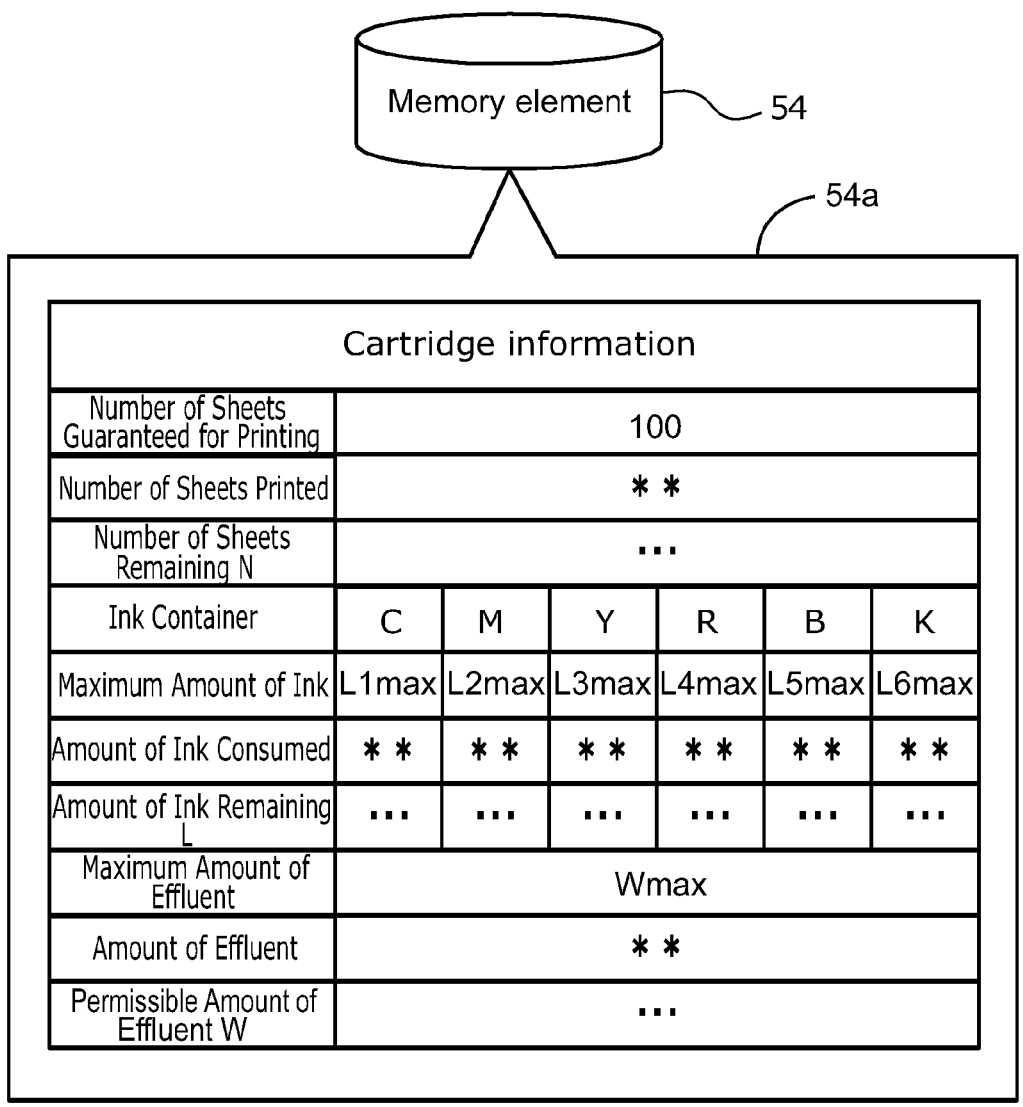
FIG. 3 is an illustration of information 54a stored in a memory element 54 of the first embodiment.
Figure 4:
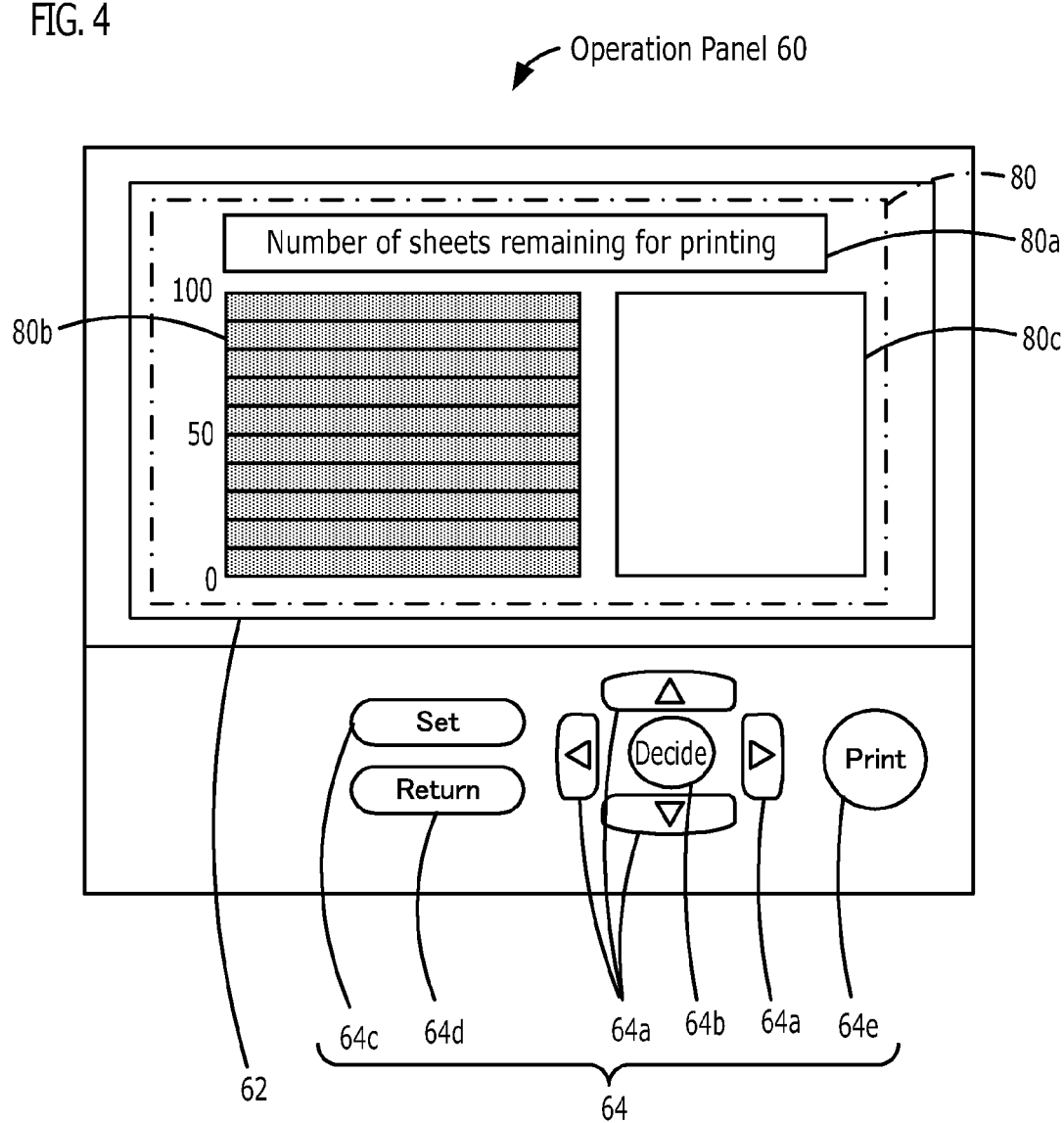
FIG. 4 is an illustration of an operation panel 60 of the first embodiment.

Next, one embodiment of this invention will be described. FIG. 1 is a block diagram illustrating an outline of the configuration of an ink jet printer 20. FIG. 2 is an illustration of an outline of the configuration of an ink cartridge 50. FIG. 3 is an illustration of the cartridge information 54a stored in a memory element 54. FIG. 4 is an illustration of an operation panel 60.

The ink jet printer 20 of this embodiment is configured as a so-called printer used exclusively for printing photographs, a printer that uses as images for printing photographs, photographic images taken with an item of equipment such as a digital camera, and that uses photograph-size paper as a recording sheet S. In addition, in this embodiment, an ink cartridge 50, in which the number of sheets guaranteed for printing has been set as an upper limit of a predetermined number of sheets available for printing, and recording sheets S for this number of sheets guaranteed for printing, are sold as a set, and the ink jet printer 20 is configured so as to be capable of using the ink cartridge 50 and the recording sheets S that are on sale as a set. This ink jet printer 20 is set in such a way that, even if ink is remaining after printing has been completed of the number of sheets guaranteed for printing with the ink cartridge 50, a number in respect of which the number of sheets guaranteed for printing has been set, printing with the ink cartridge 50 will be disabled. A user purchases the set for which printing of a predetermined number of sheets has been guaranteed, and performs printing by setting the ink cartridge 50 and the recording sheets S in the ink jet printer 20. In this embodiment, the function of disabling printing with that cartridge after printing of the number of sheets guaranteed for printing has been completed is referred to as a "shut-off function", and the act of disabling printing with that cartridge is referred to as "shutting off".

As shown in FIG. 1, the ink jet printer 20 of this embodiment comprises a printer mechanism 21 that performs printing by ejecting ink droplets onto a recording sheet S, ink droplets transported above the platen 40 from the back to the front in the Figure; a paper handling mechanism 31 that includes a paper feed roller 35 driven by a drive motor 33; a capping unit 41 formed at one end of the platen 40; an operation panel 60 on which a user enters various instructions; and a controller 70 that controls the entire ink jet printer 20.

The printer mechanism 21 comprises a carriage 22 that reciprocates along a guide 28 by means of a carriage belt 32; an ink cartridge 50 that contains separately inks of colors of cyan (C), magenta (M), yellow (Y), red (R), blue (B) and black (K) and that can supply the inks to the carriage 22; and a print head 24 that applies pressure to each ink supplied from the ink cartridge 50. The carriage 22 moves as the carriage belt 32, installed between a carriage motor 34a mounted to the right of the mecha frame 48 and the driven roller 34b mounted to the left of the mecha frame 48, and is driven by the carriage motor 34a. In this context, a so-called off-carriage type in which the ink cartridge 50 is not mounted on the carriage 22 has been adopted. The print head 24 is provided at the lower part of the carriage 22, at the lower part of the carriage 22, and a piezoelectric element deformed by applying voltage pressurized inks of various colors, thereby ejecting inks from nozzles 23 provided on the underside of the print head 24. Alternatively, the print head 24 may adopt a method whereby ink is pressurized by air bubbles generated when the ink is heated by means of applying voltage to a heat element (for instance, a heater). On the back face of the carriage 22 is arranged a linear type encoder 25 for detecting a position of the carriage 22, and management of the position of the carriage 22 is thereby made possible.

The ink cartridge 50 is detachably mounted on to the mecha frame 48, and as shown in FIG. 2, comprises ink containers 52a to 52f, respectively containing ink that contains dyestuffs or pigments as a colorant in water as a solvent, and that is used for printing of inks of cyan (C), magenta (M), yellow (Y), red (R), blue (B) and black (K); an effluent pad 53 that absorbs and preserves waste ink discharged during processes such as cleaning; and a memory element 54 that stores information relating to the ink cartridge 50. In the ink cartridge 50, by means of driving the supply pump (not illustrated), ink can be supplied to the carriage 22 by way of a supply tube 29 connected between ink supply ports 51a to 51f and the carriage 22, (see FIG. 1). The memory element 54 is a non-volatile IC memory to and from which writing and reading is possible, and when the ink cartridge 50 is mounted on to the main body, an output terminal 55 provided on a surface thereof and a connection terminal 47 provided in the main body are connected, thus facilitating reading of information from the memory element 54 and writing of information to the memory element 54. In the memory element 54 is stored cartridge information 54a that is information relating to the ink cartridge 50. As shown in FIG. 3, the cartridge information 54a contains information such as a number of sheets guaranteed for printing, in other words the largest number of sheets guaranteed for printing that can be guaranteed with that cartridge; a number of sheets printed, in other words, the number of sheets that have been printed with that cartridge up to that time; a number of sheets remaining that is a difference value between the number of sheets guaranteed for printing and the number of sheets remaining that can be printed; the maximum ink amounts (L1max to L6max) corresponding respectively to ink containers 52a to 52f (C, M, Y, R, B, K); the amounts of ink that have so far been consumed in the course of printing; an amount of ink remaining, an amount of ink remaining at that time which is a difference value between the maximum amount of ink and the amount of ink consumed; the maximum amount of effluent (Wmax) that can be absorbed by the effluent pad 53; an amount of effluent that has so far been absorbed by the effluent pad 53, a permissible amount of effluent, which is a difference value between the maximum amount of effluent and the amount of effluent and the represents how much effluent can still be absorbed. In this context, as amounts of ink deemed necessary for purposes of maintenance, such as printing and cleaning of the number of sheets guaranteed for printing, the number of sheets guaranteed for printing is set to 100 sheets, and the ink containers 52a to 52f are filled with inks of the maximum amounts of ink mentioned above. The amounts of ink deemed necessary for printing of the number of sheets guaranteed for printing is defined as the amount of ink necessary for a standard photograph image plus a predetermined amount of ink as a margin.

A flushing area 38 is provided off to the left of the printable area of platen 40 in the FIG. 1, and is used when a so-called flushing operation is performed in which ink droplets are ejected regularly, or at predetermined timings, independently of print data, in order to prevent ink from drying, or from becoming solidified at the tip of a nozzle 23. The flushing area 38 is provided so as to face the nozzle 23 of the print head 24 when the print head moves, together with the carriage 22, to the left end. Thus, a flushing operation should take place after the print head 24 has moved to the left end, together with the carriage 22.

The capping device 41 is provided off to the right of the printable area of the platen 40 and comprises an almost rectangular-shaped housing with the top opened. The capping device 41 is also used to seal the print head 24 so as to prevent the print head 24 from drying when printing has been halted, etc. Moreover, to the capping device 41 is connected a suction pump 42, and, when the suction pump 42 is actuated, negative pressure is generated in an internal space of the capping device 41. Generation of negative pressure while the capping device 41 forcibly seals nozzles 23 results in ink being pumped out of the print head 24. The ink pumped out by the suction pump 42 is absorbed, as waste ink, by an effluent pad 53 of the ink cartridge 50 by way of the effluent tube 43 and the effluent port 53a.

An operation panel 60 is a device for a user to enter various instructions directed to the ink jet printer 20, and, as shown in FIG. 4, is provided with a display unit 62 whereby, on the basis of various instructions, characters, graphics or symbols are displayed, and with an operating unit 64 for performing various operations. The display unit 62 comprises, for instance, a liquid crystal display panel that displays color images. On the operating unit 64 are arranged a cursor key 64a that is pressed when a user moves an item of equipment such as a cursor for selecting an item such as a process or characters, a decision key 64b that is pressed when a user decides on the selection of an item such as a process, a setting key 64c that is pressed when various settings are made, a return key 64d that is pressed at times such as cancellation, and a print execution key 64e that is pressed when printing is executed of an image that has been selected. Details of the number of sheets remaining information display screen 80 are described below.

As shown in FIG. 1, a controller 70 is provided on a main board 49 mounted on the back face of the mecha frame 48, composed as a microprocessor that centers on a CPU 72, and comprises a ROM 73 that stores various processing programs, a RAM 74 that temporarily stores or saves data, a flash memory 75 that can write and erase data, an interface (I/F) 79 for exchanging information with external devices, and an input/output port (not shown). In the ROM 73 are stored printing and display control routines that will be described below. In the RAM 74, a print buffer area is provided, and print data sent from a user PC 90 is temporarily stored in the print buffer area. In preparation for removal or re-mounting of the ink cartridge 50, the flash memory 75 stores cartridge information that is similar to the cartridge information 54a of the ink cartridge mounted at the time, as mentioned above. Not only are signals from the memory element 54 and signals from the operation panel 60 entered into the controller 70, through an input port (not shown), but also a print job outputted from the user PC90 can be entered through I/F 79. In addition, the controller 70 not only outputs through an output port (not shown) signals such as a control signal to the print head 24 or a control signal to the drive motor 33, a drive signal to the carriage motor 34a, an operation control signal to the suction pump 42, or a control signal to the operation panel 60, but also outputs print status information to the user PC 90 through I/F 79.

Figure 5:
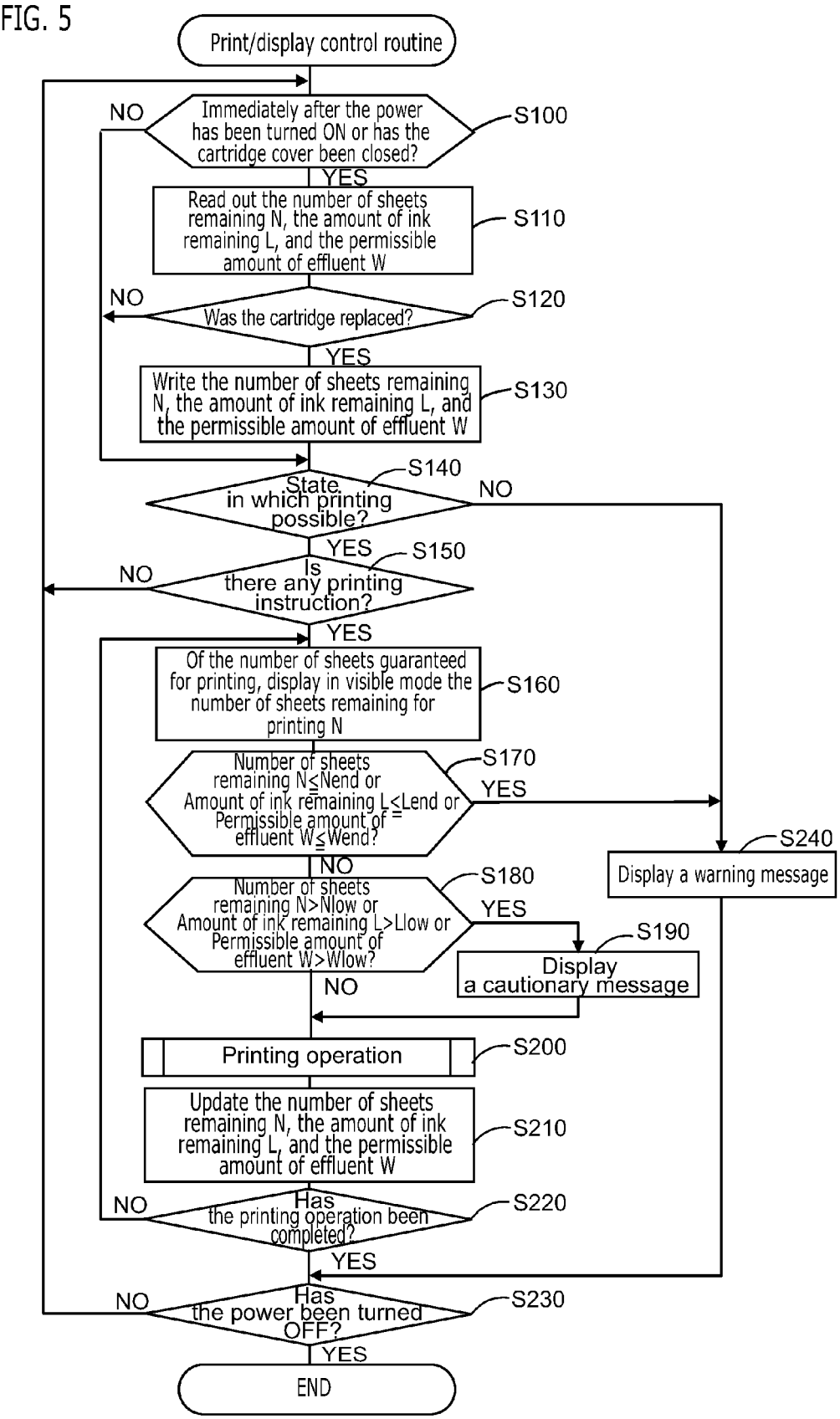
FIG. 5 is a flow chart illustrating one example of a printing and display control routine of the first embodiment.

Next, an operation will be described of the ink jet printer 20 of this embodiment that has been thus configured. FIG. 5 is a flow chart illustrating one example of a printing and displaying control routine executed by the CPU 72 of the controller 70. The routine is stored in the ROM 73 and executed by the CPU 72 after the power of the ink jet printer 20 has been turned ON. First, when this routine is started, the CPU 72 judges whether or not the routine was started immediately after the power of the ink jet printer 20 had been turned ON, or whether or not the opened cartridge cover (not shown) has been closed (step S100). The judgment is made to assess whether or not the ink cartridge 50 could possibly have been replaced. The judgment as to whether or not the cartridge cover has been closed is made on the basis of a signal from a contact type sensor (not shown). When at least one of the conditions has been met, namely, that the routine was started immediately after the power of the ink jet printer 20 had been turned ON, or that the cartridge cover has been closed, the CPU 72 deems that the ink cartridge 50 could possibly have been replaced, reads from the cartridge information 54a stored in the memory element 54 of the ink cartridge 50 the number of sheets remaining N, the amount of ink remaining L, and the permissible amount of effluent W (step S110), and judges whether or not the ink cartridge 50 has been replaced (step S120). This judgment as to whether or not the ink cartridge 50 has been replaced is made by reading the cartridge information stored in the flash memory 75, and on the basis of whether or not each numeric value contained in the memory element 54 matches one stored in the flash memory 75. If it is judged that the ink cartridge 50 has been replaced, the CPU 72 writes into the flash memory 75 the content read at step S110 (step S130). Thus, in circumstances where the ink cartridge 50 has been replaced, the cartridge information stored in the memory element 54 should be identical to the cartridge information stored in the flash memory 75.

Figure 7:
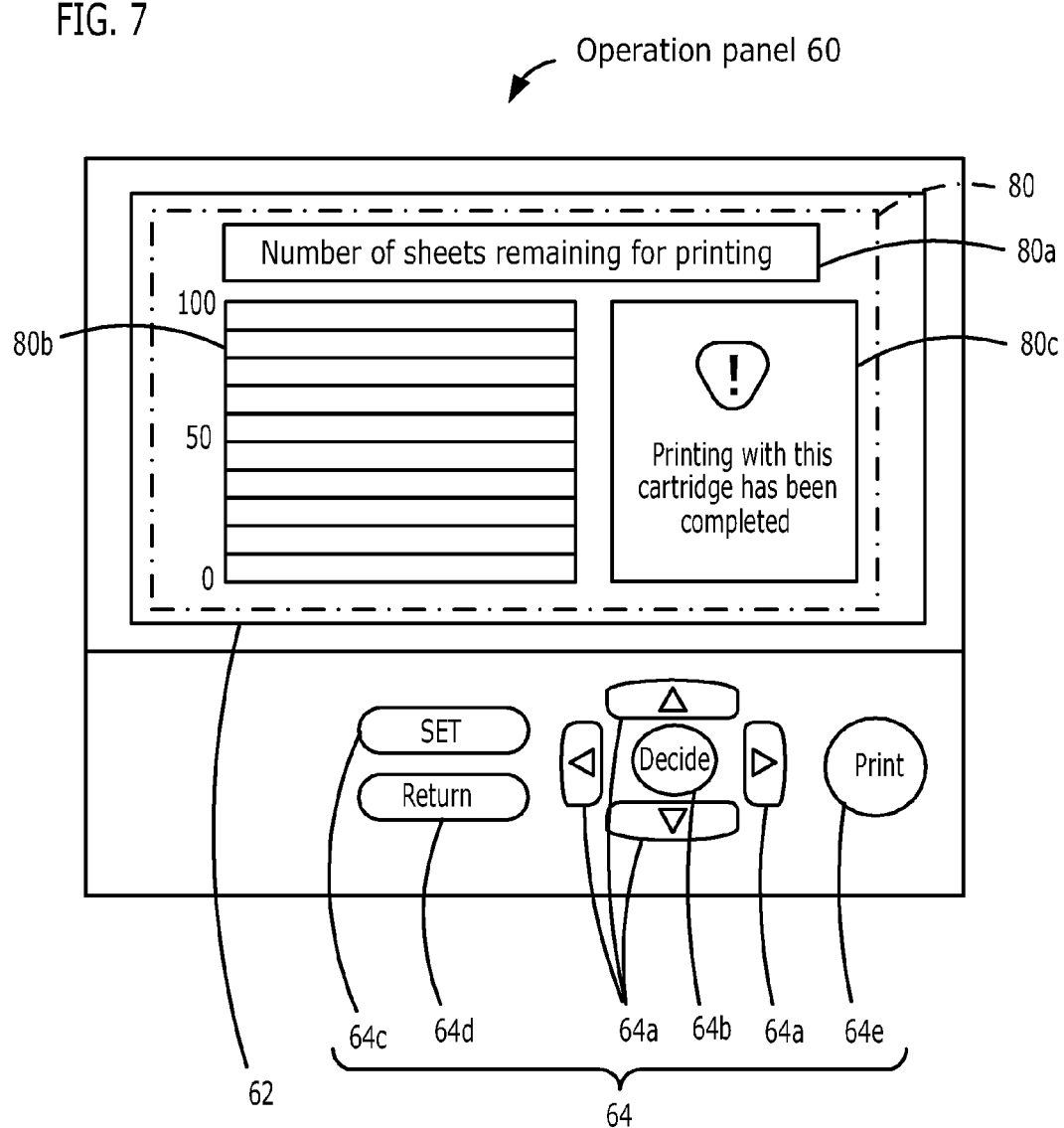
FIG. 7 is an illustration of a display screen 80 of the first embodiment on which information about the number of sheets remaining is displayed.

If it is judged after step S130, or at step S100, that the routine did not start immediately after the power of the ink jet printer 20 had been turned ON, and that the open cartridge cover has not been closed, or if it is judged at step S120 that the ink cartridge 50 has not been replaced, the CPU 72 judges whether or not the ink cartridge 50 is in a state in which printing can take place (step S140). The judgment as to whether or not the ink cartridge 50 is in a state that enables printing to take place is made on the basis of the cartridge information stored in the flash memory 75, factors such as whether or not the number of sheets remaining N for the ink cartridge is 0, whether or not any amount of ink L is remaining, and whether the permissible amount of effluent W is not value zero. If it is judged that the ink cartridge 50 is not in a state in which printing can take place, as shown in FIG. 7, a warning message to the effect that printing is not possible with this ink cartridge 50 appears on the display unit 62 (Step S240).

Figure 6:
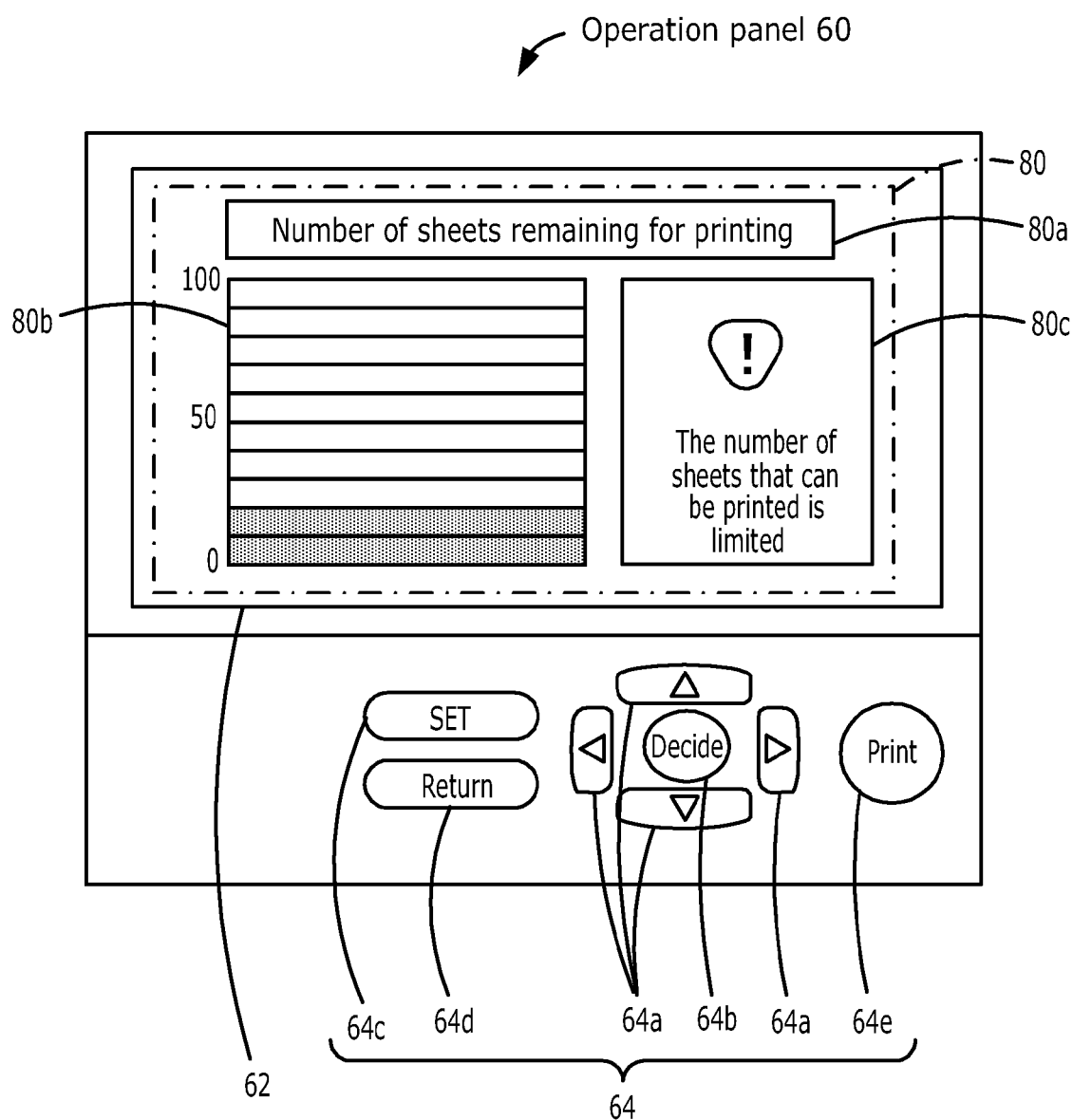
FIG. 6 is an illustration of a display screen 80 of the first embodiment on which information about the number of sheets remaining is displayed.

If, on the one hand, it is judged at step S140 that the ink cartridge 50 is in a state in which printing can take place, a judgment is made as whether or not any printing instruction exists (step S150). The judgment as to whether any printing instruction has been issued is made on the basis of whether or not print data was received from the user PC 90, or whether or not the print execution key 64e has been pressed. If it is judged that no printing instruction exists, the CPU 72 executes the processes of steps S100 to S140. If it is judged that a printing instruction does exist, in order to notify a user of the condition for use of the current ink cartridge 50, the number of sheets remaining for printing N, out of the number of sheets guaranteed for printing, is displayed on the display unit 62 in such a manner that the relationship between the number of sheets guaranteed for printing and the number of sheets remaining is visible (step 160). Here, as shown FIG. 4, the number of sheets remaining information display screen 80, which is determined based on cartridge information stored in flash memory 75, is read, is displayed on the display unit 62. On the number of sheets remaining information display screen 80 are provided a title display unit 80a, on which a title of the screen is displayed, or a number of sheets remaining display unit 80b, on which a relationship between the number of sheets guaranteed for printing and the number of sheets remaining is displayed visibly, and an item such as a message display unit 80c that notifies a user of the latest situation by means of characters. The number of sheets remaining display unit 80b is configured in such away that rectangular blocks corresponding to a predetermined percentage (10 percent in this case) are vertically arranged, blocks corresponding to the number of sheets remaining are colored, and blocks corresponding to the number of sheets printed are displayed in white above the blocks corresponding to the number of sheets remaining. More specifically, as shown in FIG. 6, if the number of sheets remaining N is between 11 and 20, the number of sheets remaining display unit 80b is displayed with the blocks in the two lower columns colored. In addition, in the number of sheets remaining display unit 80b, the display is such that when the number of sheets printed increases, out of the blocks showing the number of sheets guaranteed for printing, the number of blocks corresponding to the number of sheets remaining N decreases in terms of area. Thus, it becomes easier for a user to understand how the number of sheets remaining N decreases with the use of the ink cartridge 50. Thus, as the number of sheets remaining in relation to the number of sheets guaranteed for printing is displayed in terms of areas in the shape of a gauge, a user can quickly check visually usage conditions in a rough manner.

After the number of sheets remaining information display screen 80 has been displayed on the display unit 62 at step S160, the CPU 72 judges whether or not the number of sheets remaining N is below a threshold Nend, whether or not the amount of ink remaining L is below a threshold Lend, and whether or not the permissible amount of effluent W is below a threshold Wend (Step S170). These thresholds Nend, Lend, and Wend are thresholds that have been established in order to notify a user that printing is not possible with the ink cartridge 50. The threshold Nend is defined as a value of the number of sheets remaining N when all of sheets guaranteed for printing Nmax have been printed, i.e., a value of 0. The threshold Lend is defined as a value of all the maximum amount of ink Lmax being ejected, plus a predetermined margin. The threshold Wend is defined as a value of the permissible amount of effluent W when ink of the entire maximum amounts of effluent Wmax has been absorbed, i.e., a value of 0. Further, the judgment as to whether or not the amount of ink remaining L is below the threshold Lend needs to be made on the basis of amounts of inks of various colors remaining L, by using thresholds L1end to L6end provided for every color. If a judgment is made to the effect that at least one of the conditions is below the threshold, Nend relating to the number of sheets remaining N, Lend relating to the amount of ink remaining L or Wend relating to the permissible amount of effluent W, the CPU 72 deems that printing is no longer possible with the ink cartridge 50 that has been mounted, and, as shown in FIG. 7, displays a warning message to this effect on the message display unit 80c of the number of sheets remaining information display screen 80 (Step S240).

If, on the one hand, a judgment is made at step S170 to the effect that none of the above conditions is below the appropriate threshold Nend relating to the number of sheets remaining, Lend relating to the amount of ink remaining L or Wend relating to the permissible amount of effluent W, the CPU 72 then judges whether or not the number of sheets remaining N is lower than a threshold Nlow, whether or not the amount of ink remaining is less than a threshold Llow, and whether or not the permissible amount of effluent is less than a threshold Wlow (step S180). These thresholds Nlow, Llow and Wlow are thresholds that are established in order to notify a user that the number of sheets that can be printed with the ink cartridge 50 is decreasing, and the thresholds may be defined as arbitrary values. In this context, the threshold Nlow is defined as a value of 20% of the number of sheets guaranteed for printing Nmax. The threshold Llow is defined as a value of 20% of the maximum amount of ink Lmax. The threshold Wlow is defined as a value of 20% of the maximum amount of effluent. Further, the judgment as to whether or not the amount of ink remaining is lower than Llow should be made for the amounts of ink remaining L in respect of each kind of ink, by using thresholds L1low to L6low provided for each color. If a judgment is made that at least one of the conditions is lower than the appropriate threshold, Nlow relating to the number of sheets remaining N, Llow relating to the amount of ink remaining L, and Wlow relating to the permissible amount of effluent W, the CPU 72, as shown in FIG. 6, displays a cautionary message on the message display unit 80 of the number of sheets remaining information display screen 80 (step S190) to the effect that the number of sheets that can be printed with the ink cartridge 50 has decreased.

After a judgment has been made at step S180 to the effect that any of the conditions is lower than the threshold, Nlow relating to the number of sheets remaining N, Llow relating to the amount of ink remaining L, and Wlow relating to the permissible amount of effluent W, or after a warning message has been displayed on the message display unit 80c at step S190, the CPU 72 executes the process of printing print data for which printing instructions have been given (step S200). More specifically, the CPU 72 takes action such as driving the driving motor 33 and rotating the paper feed roller 35, and transports a recording sheet S to the area on the platen 40 where printing is possible. Then, the CPU 72 develops into a bitmap image the print data within the print buffer, and controls voltage to the print head 24 so that the data that has been developed is printed on a recording sheet S. Then, the CPU 72 drives the carriage motor 34a, moves the carriage 22 in the carriage movement direction, and by means of for instance moving the carriage 22 to the capping device 41 in stages, performs a flushing or cleaning process.

Thus, when the process of printing one page is completed, the CPU 72 calculates the amount of ink of each color that has been used in the course of printing on this occasion, and updates carriage information such as the number of sheets remaining N, the amount of ink remaining L, and the permissible amount of effluent W (Step S210). In the course of this process, the CPU 72 updates the cartridge information 54a stored in the memory element 54 and the cartridge information stored in the flash memory 75. The CPU 72 updates the number of sheets remaining N by subtracting a value of 1 from the previous number of sheets remaining. In addition, the CPU 72 updates the amount of ink remaining L by subtracting from the previous amount of ink remaining the amounts of ink required and consumed during the printing and flushing processes, amounts calculated by multiplying the number of dots in the ink ejected onto the recording sheet S in the course of the printing or flushing process by the amount of ink that corresponds to that number of dots, and the amount of ink required and consumed during the instances of cleaning, an amount calculated by multiplying the number of steps for which the suction pump 42 was driven by the amount of ink corresponding to that number of steps. Further, the CPU 72 updates the permissible amount of effluent W by calculating the amount of effluent absorbed into the effluent pad 53 on this occasion in the course of the instance of flushing or instance of cleaning, an amount calculated in a similar fashion to the manner described above, and according to which the amount of effluent on this occasion is subtracted from the permissible amount of effluent W.

Next, the CPU 72 judges whether or not all of the processes of printing print data have been completed (step S220). If it is judged that the printing processes have not yet been terminated, the CPU 72 executes the processes of steps S160 to S220. If, on the one hand, it is judged at step S220 that the printing processes have been completed, or after a warning message has been displayed on the message display unit 80c at step S240, the CPU 72 judges whether or not the power has been turned OFF (step S230). If the power has not been turned OFF, the CPU 72 executes the process of steps S100 to S231, and if the power has been turned OFF, the CPU 72 terminates this routine. In this manner, if a judgment is made at step S140 to the effect that a state does not exist in which printing is possible, or if the number of sheets remaining N has fallen below the threshold Nend at step S170, the CPU 72 avoids performing the printing operation with the ink cartridge 50.

Although the number of sheets guaranteed for printing should be guaranteed by containing in an ink cartridge 50 an amount of ink that includes amounts to be consumed during the course of the printing, cleaning and flushing processes of the number of sheets guaranteed for printing, if for any reason the amount of ink remaining is lower than the threshold Lend or the effluent pad 53 becomes full, and in consequence printing of the number of sheets guaranteed for printing becomes impossible and the ink cartridge 50 can no longer be used, a user may mail, or take the ink cartridge 50 into a service center. There, at the service center, the cartridge information 54*a* stored in the memory element 54 can be read out, and a fee corresponding to the number of sheets that were not able to be printed will be refunded to the user. In this way, a guarantee of the number of sheets that can be printed can be secured.

In this context, a clarification will be made of the relationship between components of this embodiment and those of the present invention. The display unit 62 of this embodiment corresponds to a display module of the present invention, the printer mechanism 21 corresponds to the printing module, the controller 70 corresponds to the control module and to the acquisition module, and the memory element 54 and the flash memory 75 correspond to the storage module. Further, ink of this embodiment corresponds to a colorant of the present invention, the recording sheet S corresponds to the print medium, the threshold Llow corresponds to the first amount remaining, the threshold Nlow corresponds to the first number of sheets remaining, the threshold Lend corresponds to the second amount remaining, and the threshold Nend corresponds to the second number of sheets remaining. Further, in this embodiment, one example of a printing notification method of the present invention will also be clarified by means of a description of the operations of the ink jet printer 20.

According to the ink jet printer 20 of this embodiment described above, when the number of sheets printed reaches the number of sheets guaranteed for printing, a number that is an upper limit of the number of sheets that can be printed, printing is not performed with an ink cartridge 50 for which a number of sheets guaranteed for printing has been set. When the number of sheets printed does not reach the number of sheets guaranteed for printing, printing of an image onto a recording sheet S is performed by use of the ink cartridge 50, the number of sheets remaining N is determined on the basis of the number of sheets printed, and information on the number of sheets remaining N thus determined is displayed on the display unit 62. In this way, by use of an ink cartridge 50 for which a number of sheets guaranteed for printing has been set, printing is performed until the number of sheets printed has reached the number of sheets guaranteed for printing; information on the number of sheets remaining N is determined from the number of sheets guaranteed for printing; and the number of sheets printed with this ink cartridge 50 is displayed. Thus, by means of the ink cartridge 50, it becomes possible to notify a user of the number of sheets remaining for printing N with a degree of certainty. Further, as the number of sheets remaining information display screen 80 appears on the display unit 62, it is possible to use visual means to make a user aware of the number of sheets remaining, by means of images.

Furthermore, when information on the number of sheets remaining N is displayed, a relationship between the number of sheets guaranteed for printing and the number of sheets remaining N is displayed on the display unit 62 in a visible mode, by displaying in different colors, from among a plurality of blocks that are composed of areas delimited by a predetermined number of sheets guaranteed for printing, blocks corresponding to the number of sheets remaining N and blocks corresponding to the number of sheets printed. Thus, a user can easily check in a visible mode against the upper sheet limit defined for the ink cartridge 50, the number of sheets currently remaining for printing. Further, since the number of sheets remaining and the number of sheets printed are displayed in areas in different modes, in comparison with cases in which a user reads characters, a user can check relatively quickly a relationship between the number of sheets guaranteed for printing and the number of sheets remaining N. In addition, as the number of sheets remaining and the number of sheets printed are displayed in areas in different colors, a user can check visually and more easily areas corresponding to the number of sheets remaining and areas corresponding to the number of sheets printed. Furthermore, since the relationship between the number of sheets guaranteed for printing and the number of sheets remaining is displayed in areas in the shape of a gauge by using blocks, it is easy to separate and display areas corresponding to the number of sheets remaining and those corresponding to the number of sheets printed.

Furthermore, as the number of sheets remaining N is stored in the memory element 54 or the flash memory 75, information on the number of sheets remaining can be managed relatively easily. In addition, as the cartridge information (such as the number of sheets remaining N) is stored in the memory element 54 provided in the ink cartridge 50, the ink cartridge 50 can be reliably linked with the number of sheets remaining in the ink cartridge 50. Furthermore, the display unit 62 is such that when the number of sheets printed increases, from among areas where the number of sheets guaranteed for printing is displayed, the number of blocks corresponding to the number of sheets remaining N decreases. Thus, with the use of the ink cartridge 50 a user can easily keep track of how the number of sheets remaining N is decreasing.

In addition, when the amount of ink remaining L falls below the threshold Llow, or the number of sheets remaining N falls below the threshold Nlow, the display unit 62 displays a message to the effect that the number of sheets that can be printed with the ink cartridge 50 has decreased. When the amount of ink remaining L reaches the threshold Lend, or after the number of sheets remaining N reaches the threshold Nend, the display unit 62 not only displays a message to the effect that printing is no longer possible with the ink cartridge 50, but also prevents the printer mechanism 21 from printing with the ink cartridge 50. Thus, by means of messages a user can keep track of any reduction in the number of sheets remaining N, or in the amount of ink remaining L. After the amount of ink remaining L reaches the threshold Lend, by not printing with that ink cartridge 50, any damage to the print head 24 caused by the practice of use while the amount of ink is low can be prevented. After the number of sheets remaining N reaches the threshold Nend, by not printing with the ink cartridge 50, it is possible to ensure with certainty that the number of sheets guaranteed for printing is printed. In addition, as photograph images are printed on recording sheets S by use of the ink cartridge 50, in comparison with cases in which the printing of characters and that of photographs are mixed together, fluctuations in amounts of ink consumed during the printing of images will be less extreme, and a relatively appropriate amount of ink can be contained in advance in a cartridge 50. In addition, ink can be used to print photographs, and this facilitates clean printing.

It goes without saying that, the present invention is not limited to the embodiments described above, and that it can be carried out in a variety of embodiments, as long as they remain confined to the technical range of this invention.

Figure 8:
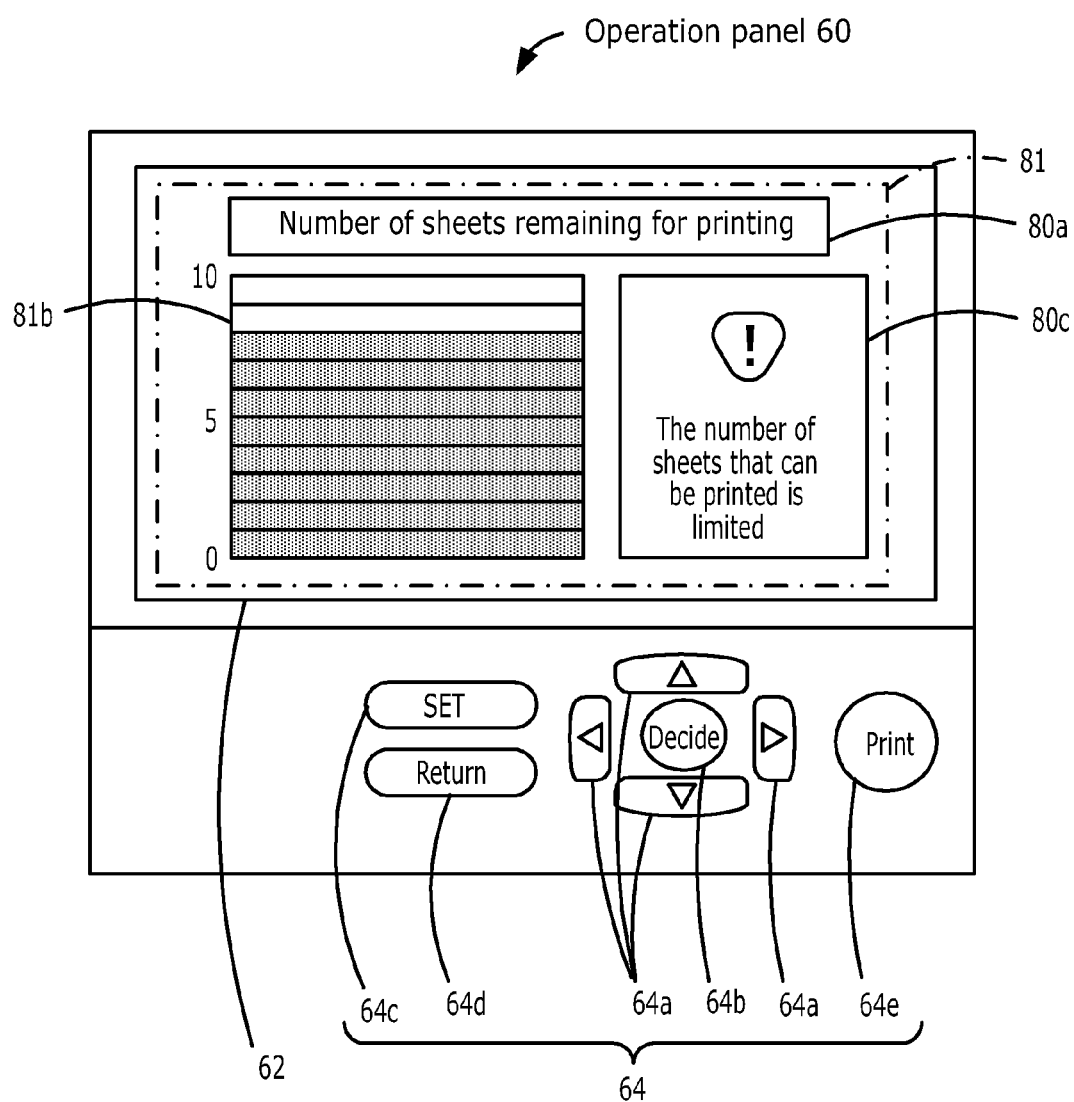
FIG. 8 is an illustration of a display screen 81 of the first embodiment on which information about the number of sheets remaining is displayed.

For instance, in the embodiment described above is displayed the number of sheets remaining information screen 80 that incorporates the number of sheets remaining display unit 80*b* on which are vertically arranged rectangular blocks for which a predetermined percentage of the number of sheets guaranteed for printing remains unchanged until printing of the number of sheets guaranteed for printing. However, as shown in FIG. 8, when the number of sheets remaining N falls short of a predetermined percentage (10% in this case) of the number of sheets guaranteed for printing (in this case, when it falls short of 10 sheets), it may be possible to switch to, and display, the number of sheets remaining information display unit 81b on which 10% of the number of sheets guaranteed for printing is considered full scale, and thus rectangular blocks, each block representing one sheet, are vertically arranged. In this way, the number of sheets remaining N immediately before shut-off can be visually checked.

Figure 9:
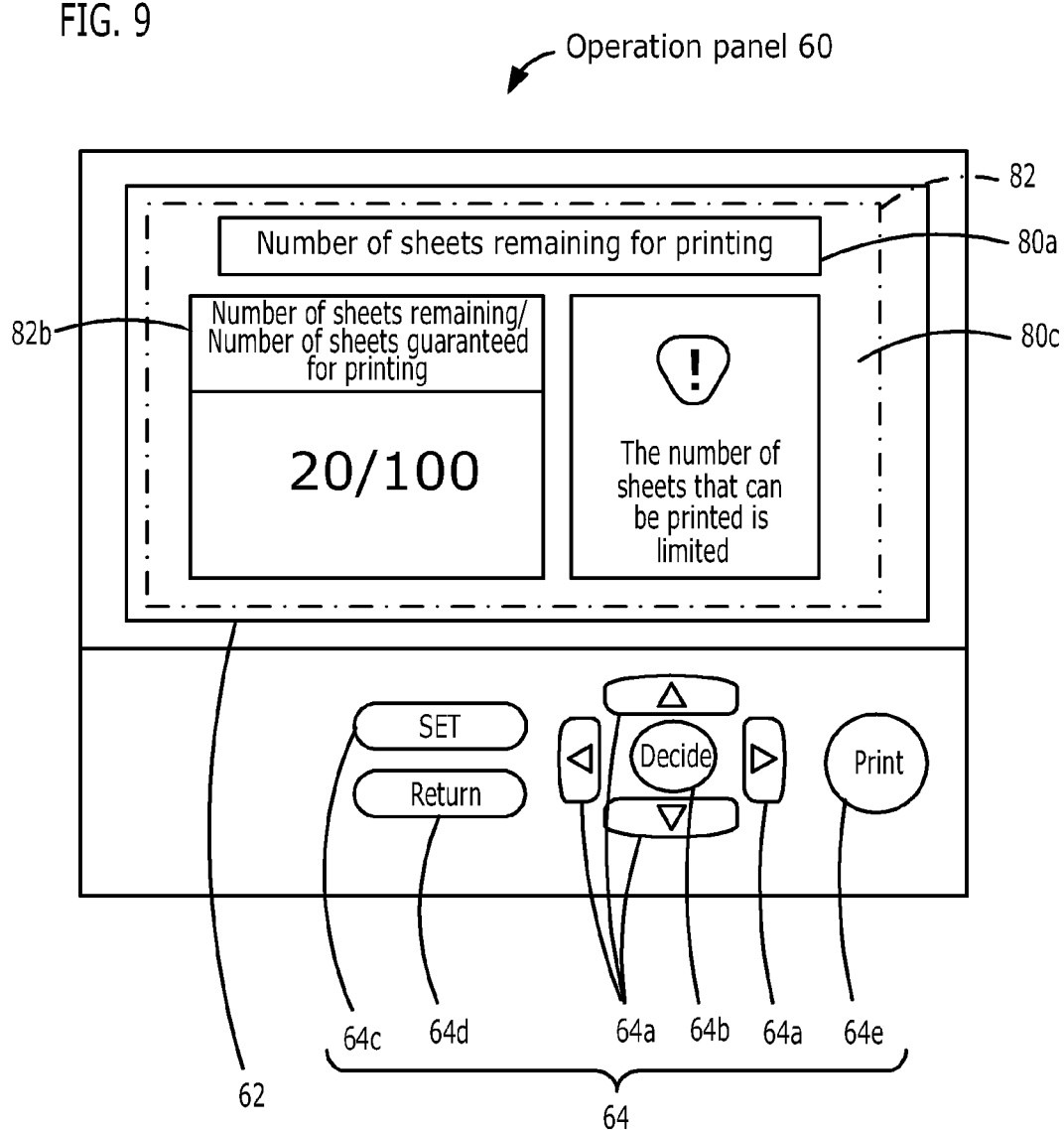
FIG. 9 is an illustration of a display screen 82 of the first embodiment on which information about the number of sheets remaining is displayed.

In the embodiment described above has been described a number of sheets remaining information display screen 80 incorporating a number of sheets remaining display unit 80 b on which are vertically arranged rectangular blocks corresponding to a predetermined percentage of the number of sheets guaranteed for printing. However, as shown in FIG. 9, a number of sheets remaining information display screen 82 may be displayed incorporating the number of sheets remaining display unit 82b that displays numeric characters expressing the number of sheets guaranteed for printing as a denominator, and the number of sheets remaining N as a numerator. In this way, a user can recognize in detail the number of sheets guaranteed for printing and the number of sheets remaining N. Otherwise, as information relating to the number of sheets remaining N, the number of sheets remaining N at a time when the number of sheets guaranteed for printing is set as 100% may be displayed in areas as a percentage, or in characters as a percentage. Even in these circumstances, a user can still check visually, against the maximum level of sheets that can be printed, the number of sheets remaining for printing.

Figure 10:
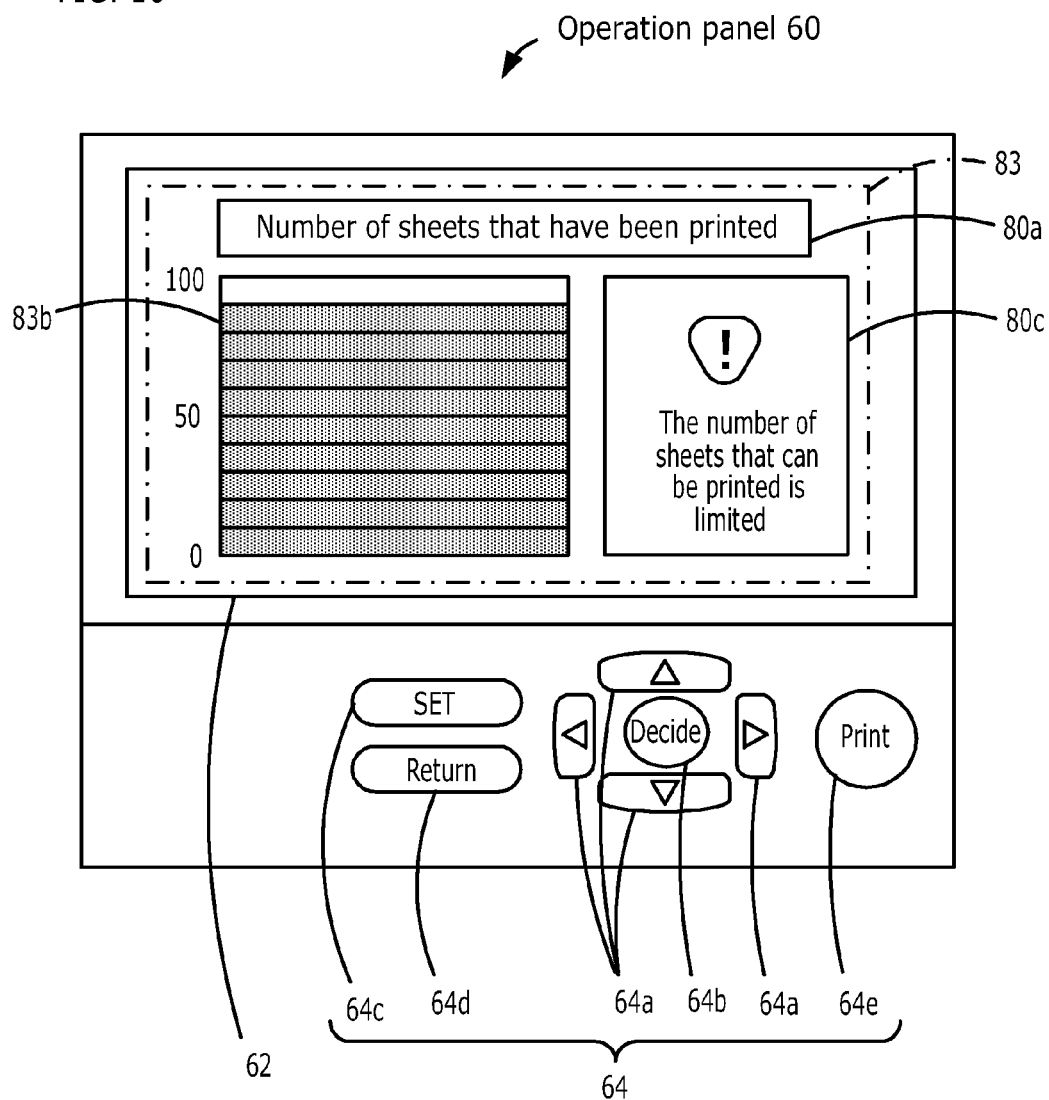
FIG. 10 is an illustration of a display screen 83 of the first embodiment on which information about the number of sheets remaining is displayed.

In the embodiment described above has been described a number of sheets remaining information display screen 80 incorporating a number of sheets remaining display unit 80b on which when the number of sheets printed increases, the number of colored blocks corresponding to the number of sheets remaining N decreases. However, as shown in FIG. 10, the number of sheets remaining information display screen 80 may incorporate a number of sheets printed display unit 83b in which an upper limit is set to the number of blocks corresponding to the number of sheets guaranteed for printing, and when the number of sheets printed increases, the number of colored blocks corresponding to the increase in the number of sheets printed may be displayed. Even in these circumstances, as uncolored blocks correspond to the number of sheets remaining N, and the number of sheets remaining N can be visually checked indirectly from the number of uncolored blocks, a user can easily check visually against the maximum level of sheets that can be printed, as defined for the ink cartridge 50, the number of sheets currently remaining for printing. Alternatively, the number of sheets remaining information display screen 80 may incorporate a number of sheets printed display unit 83b that displays as a denominator a numeric character expressing the number of sheets guaranteed for printing and the number of sheets printed as a numerator.

In the embodiment described above has been described a number of sheets remaining information display screen 80 on which the number of sheets guaranteed for printing and the number of sheets remaining N can be visually checked. However, the number of sheets remaining information display screen 80 may also display only the number of sheets remaining N. In these circumstances, the number of sheets remaining N may be displayed as a numeric character. In this way, by means of the cartridge it is possible for a user to be notified with certainty of the number of sheets remaining N for printing.

In the embodiment described above, a user is notified on the display unit 62 of information relating to the number of sheets remaining N. However, the ink jet printer 20 may also comprise a speaker (not shown), convert into sound any information on the number of sheets remaining N, and notify users by outputting the converted sound from this speaker. In this way, it becomes possible to notify a user aurally of the number of sheets remaining, by means of sound.

In the embodiment described above, the memory element 54 stores cartridge information 54a such as the number of sheets guaranteed for printing, the number of sheets printed, the number of sheets remaining, the maximum amount of ink, the amount of ink consumed, the amount of ink remaining, the maximum amount of effluent, the amount of effluent, and the permissible amount of effluent. However, the memory element 54 may also store the cartridge information that contains either the number of sheets printed or the number of sheets remaining, either the amount of ink consumed or the amount of ink remaining, or either the amount of effluent or the permissible amount of effluent. For instance, if a user knows either one of the number of sheets printed or the number of sheets remaining, the user can calculate the other one of these figures by calculating a difference from the number of sheets guaranteed for printing. In this way, simplification of the cartridge information 54a can be achieved.

In the embodiment described above, both the memory element 54 and the flash memory 75 store the cartridge information 54a. However, either one of these items may be omitted, and thereby the degree of consumption on the part of the memory can be reduced. In these circumstances, considering the fact that the ink cartridge 50 is linked with the cartridge information 54a, it is preferable to eliminate the saving of the cartridge information within the flash memory 75.

In the embodiment described above, after a printing instruction is given at step S150, the display unit 62 displays the number of sheets remaining display unit 80b. For instance, when a display instruction from a user corresponding to depression of the set key 64c is obtained, the display unit 62 may display the number of sheets remaining display unit 80b. In this way, a user is able to check the number of sheets remaining N whenever the user so wishes.

In the embodiment described above, the amount of ink remaining L is kept track of and display of the message, or shut-off is performed on the basis of the amount of ink remaining L. However, cognition of the amount of ink remaining L, or the execution of a display of a message, or shut-off, on the basis of the amount of ink remaining L, may be eliminated. In this way, simplified processing can be achieved.

In the embodiment described above, the ink cartridge 50 incorporates the effluent pad 53, and the main body is cleaned by using the effluent pad 53 to absorb waste ink. However, an effluent tank may be provided on the main body, and the ink cartridge 50 need not necessarily incorporate the effluent pad 53. At that time, in the embodiment described above, the permissible amount of effluent W is kept track of, and display of the message, or shut-off is performed on the basis of the permissible amount of effluent W. However, cognition of the permissible amount of effluent W, and execution of a display of the message, or shut-off, on the basis of the permissible amount of effluent W, may be eliminated. In this way, simplified processing can be achieved.

In the embodiment described above, the number of sheets remaining information display screen 80 incorporating the number of sheets remaining display unit 80b is displayed on the display unit 62. However, the number of sheets remaining information display screen 80 may also be displayed on the display unit of the user PC 90.

In the embodiment described above, the printer mechanism 21 is of the off-carriage type in which an ink cartridge 50 is mounted on the main body. However, the printer mechanism 21 may also be a printer mechanism of an on-carriage type in which an ink cartridge 50 is mounted on the carriage 22. In such circumstances, at step S100, when the Replace Cartridge button (not shown) is pressed, a judgment may be made to the effect that the ink cartridge 50 may possibly have been replaced.

In the embodiment described above, normal printing was described. However, for instance, if a printing process is performed with the ink cartridge 50 for a printer maintenance operation such as a nozzle check printing process, in which the conditions of the ejection of ink from the nozzles are checked, or a gap adjustment printing process, in which a distance from the print head 24 to the platen 40 is adjusted, the number of sheets remaining N at step S210 may not need to be updated. This is because printing for purposes of a printer maintenance process is not scheduled by a user, but is done for reasons relating to the printer itself. In this way, for printing scheduled by a user, printing can be ensured of the number of sheets guaranteed.

Second Embodiment

As an ink jet printer 20 of this embodiment has the same configuration as that of the first embodiment, a description thereof is omitted. The ink jet printer 20 of this embodiment uses as an image for printing, images of photographs taken by, for instance, a digital camera, and is configured as a so-called printer used exclusively for printing photographs, a printer that can print as sheets S plural sheets such as recording sheets of photograph size (L version) or of postcard size. It is possible to attach thereto an ink cartridge 50 with which printing of a number of sheets guaranteed for printing is guaranteed (also referred to a guaranteed range of sheets), a number that has been set in accordance with the amount of ink contained in the ink cartridge. In this context, as the total number of sheets printed with an ink cartridge 50, a range between a figure of no fewer than the highest number of sheets that can be printed when printing is confined to sheets of postcard size, and a figure of not more than the highest number of sheets that can be printed when printing is confined to sheets of L version size (which shall be referred to as an upper printing limit) is defined as the guaranteed range of sheets. In other words, in order to ensure printing within the guaranteed range of sheets, the ink jet printer 20 is configured so as to finish printing with this ink cartridge 50 even if some ink is in practice remaining after the highest number of sheets in the guaranteed range of sheets has been printed, and as a matter of form the amount of ink is deemed in mathematical terms to have been consumed.

Figure 11:
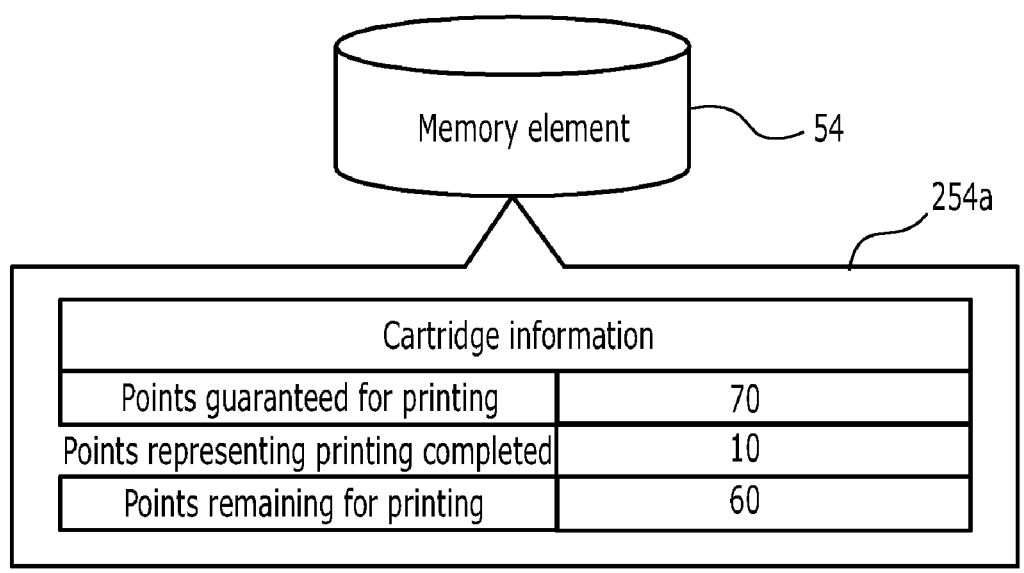
FIG. 11 is an illustration of information 254a stored in a memory element 54 of a second embodiment.
Figure 12:
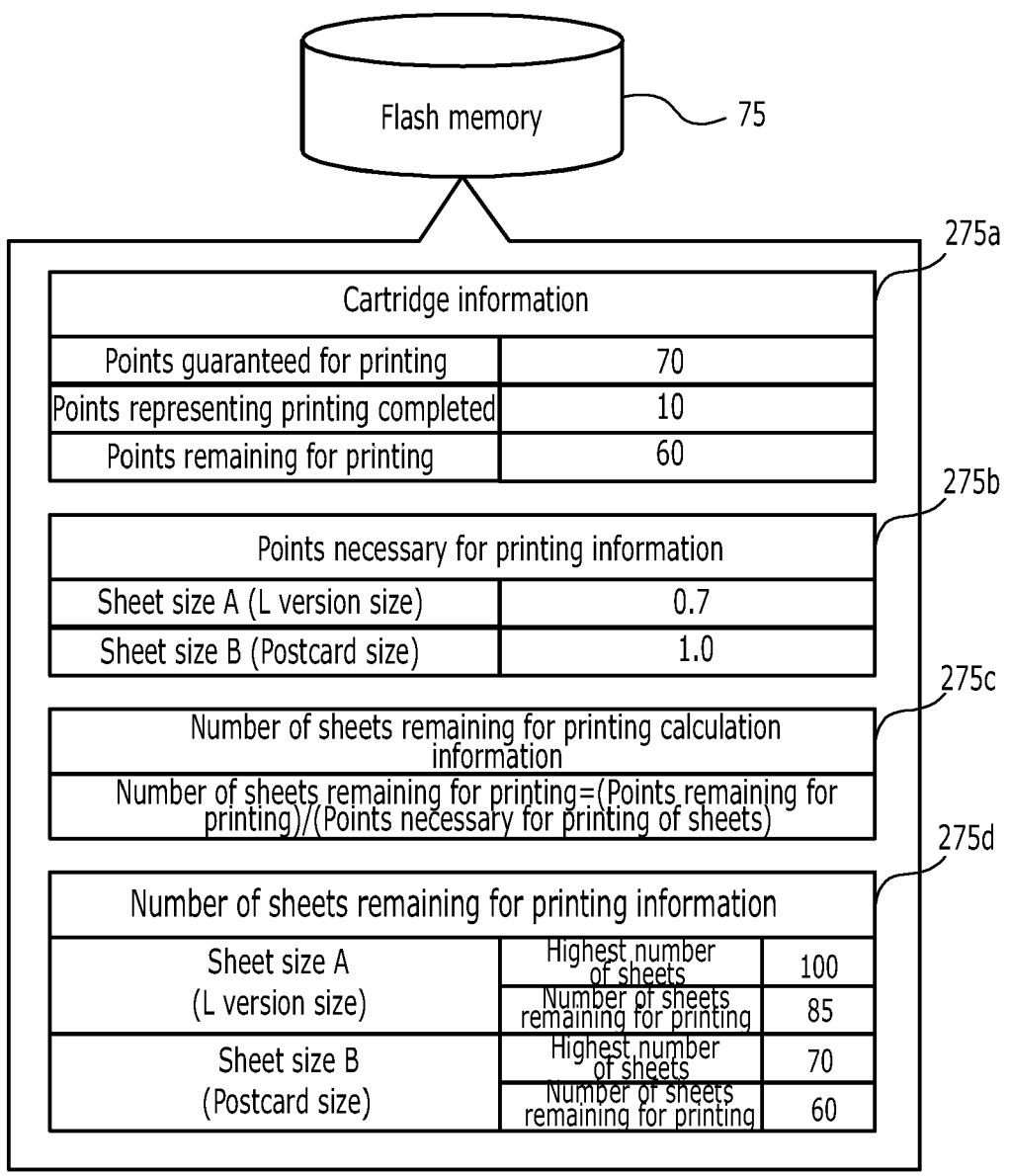
FIG. 12 is an illustration of the information stored in a flash memory 75 of the second embodiment.

In this embodiment, as information stored in the memory element 54, or information stored in the flash memory 75 differs from that in the first embodiment, a description thereof follows. FIG. 11 is an illustration of cartridge information 254*a* stored in the memory element 54. FIG. 12 is an illustration of cartridge information 275*a*, points necessary for printing information 275*b*, the number of sheets remaining for printing calculation information 275*c* and the number of sheets remaining for printing information 275*d*, stored in the flash memory 75.

As illustrated in FIG. 11, the cartridge information 254*a* that constitutes information about the ink cartridge 50 is stored in the memory element 54. The cartridge information 254*a* contains inter alia points guaranteed for printing representing, in terms of points, amounts of ink with which the upper limit of sheets for printing, in other words the upper limit of sheets that can be printed with the cartridge, can be printed; points representing printing that has been completed, representing amounts of ink already used in printing with that cartridge, and points remaining for printing, constituting a difference value between the points guaranteed for printing and the points representing printing that has been completed, and that represents the amount of ink remaining in that cartridge with which printing is still possible. In this embodiment, the upper limit of sheets for printing is set to 100 sheets, representing the number of sheets when printing is confined to sheets S of L version size, and individual ink containers 52*a* to 52*f* contain at least amounts of ink such that ink sufficient for the upper limit of sheets for printing can be ejected over the entire number of sheets of the L version size. Therefore, whatever kind of printing is performed, printing of the upper limit of sheets for printing can be guaranteed with certainty (100 sheets of L version size). In addition, as the configuration is such that points representing printing that has been completed is calculated in such a way that in the course of one sheet being printed, ink of all the colors could be ejected onto all the surfaces, points guaranteed for printing thus relate to the entire ink cartridge 50, and not to individual colors of ink. In this context, the points guaranteed for printing are defined as 70 points. Although they are not reflected in the points guaranteed for printing, provision for amounts of ink used for printer maintenance, such as cleaning processes necessary for the printing of the upper limit of sheets for printing, has been made in the individual ink containers 52*a* to 52*f*.

As illustrated in FIG. 12, in addition to the cartridge information 275*a* that includes contents identical to the cartridge information 254*a* described above, the flash memory 75 stores points necessary for printing information 275*b* that includes points necessary for printing representing an amount of ink necessary for printing one sheet; the number of sheets remaining for printing calculation information 275*c* that is used for calculating the number of sheets remaining for printing, specifically the number of sheets remaining that can be printed with that cartridge; and the number of sheets remaining for printing information 275*d* that includes the number of sheets remaining for printing, corresponding to each sheet for printing with that cartridge. The cartridge information 275*a* is read out of the ink cartridge 50 mounted at that time and stored in preparation for purposes such as the retrieval or re-mounting of the ink cartridge 50. The points necessary for printing information 275*b* includes the points necessary for printing (0.7 points) the entire surface of one sheet of paper of L version size and the points necessary for printing (1.0 point) the entire surface of one sheet of postcard size. The number of sheets remaining for printing calculation information 275*c* includes, as a calculation formula, a calculation formula for dividing by the points necessary for printing each size of sheet the points remaining for printing, corresponding to the amount of ink for printing. The number of sheets remaining for printing information 275*d* includes the highest number of sheets that can be printed with the sheet S size of paper and the current number of sheets remaining for printing in each size of sheet. In this context, the highest number of sheets of L version size is 100 sheets, while the highest number of sheets of postcard size is 70 sheets. For this reason, when a user prints with the ink cartridge 50 using only sheets of L version size, the printing of 100 sheets is ensured. When a user prints only sheets of postcard size, the printing of 70 sheets is ensured. If a user prints both sizes of sheets, printing within a range of from 70 to 100 sheets can in general be guaranteed.

Figure 13:
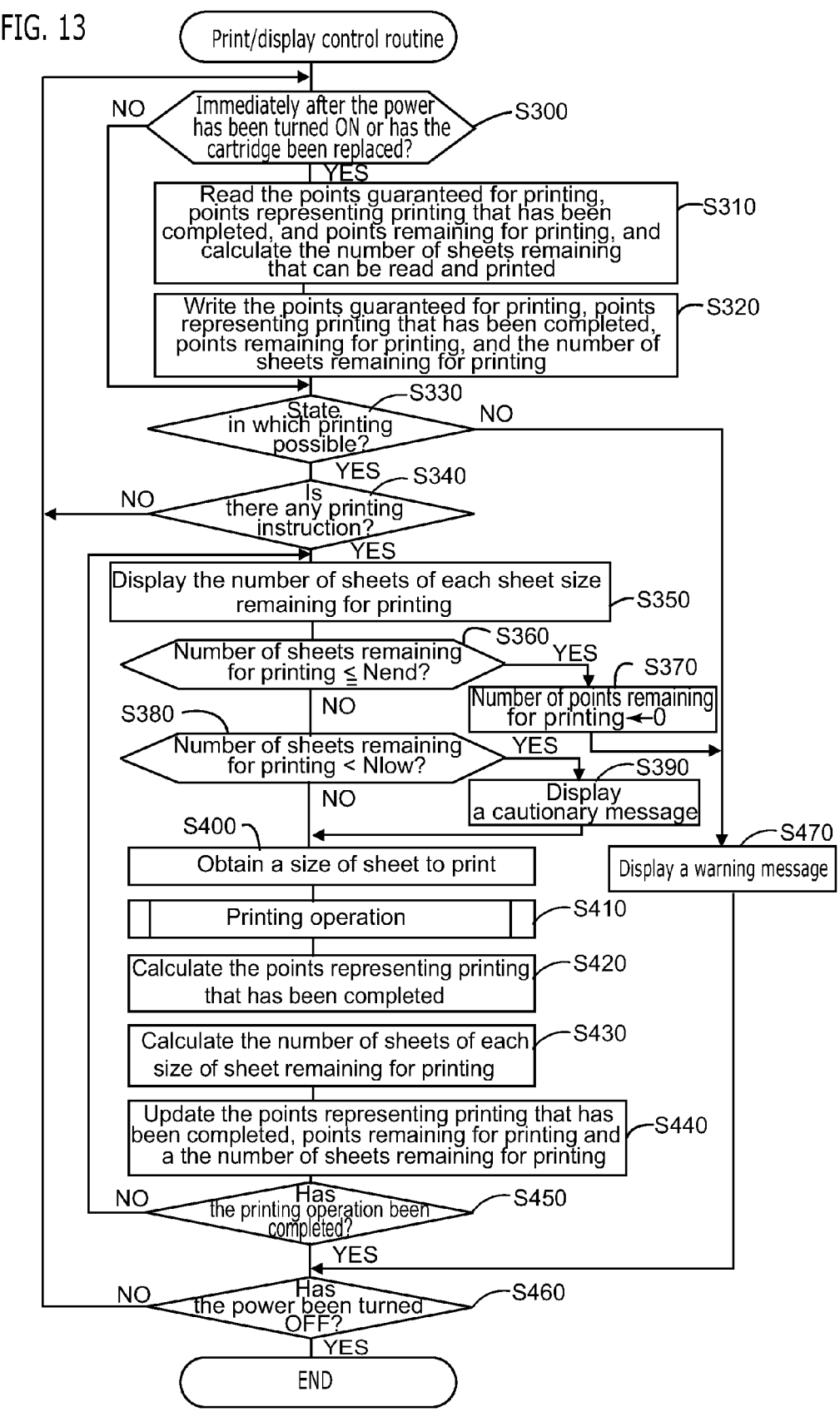
FIG. 13 is a flow chart illustrating one example of a printing and display control routine of the second embodiment.

In the following, a description will be given of an operation of the ink jet printer 20 of the embodiment that has been thus configured. FIG. 13 is a flow chart illustrating one example of a printing/display control routine executed by the CPU 72 of the controller 70. The routine is stored in the ROM 73 and executed by the CPU 72 after the power of the ink jet printer 20 has been turned ON. When this routine has been commenced, the CPU 72 judges first of all whether or not the routine started immediately after the power of the ink jet printer 20 had been turned ON, or whether or not the ink cartridge 50 has been replaced (step S300). This judgment is made to ensure that the contents of the cartridge information 275a are made identical to those of the ink cartridge 50 mounted onto the printer mechanism 21. The judgment as to whether or not the ink cartridge 50 has been replaced can be made, for instance, on the basis of whether or not the contents of the cartridge information 254a differ from those of the cartridge information 275a.

If at least one of these two conditions is met, in other words, either that the routine started immediately after the power of the ink jet printer 20 had been turned ON, or that the ink cartridge 50 had been replaced, the CPU 72 not only reads the cartridge information 254a stored in the memory element 54 of the ink cartridge 50 but also calculates the number of sheets remaining for printing (step S310). Then, the CPU 72 not only writes the content of the cartridge information 254a into the cartridge information 275a, but also writes into the number of sheets remaining for printing information 275d the number of sheets remaining for printing thus calculated (Step S320). The number of sheets remaining for printing is set in such a way that a calculation is made for each of the individual sizes of sheet, and by use of the calculation formula included in the number of sheets remaining for printing calculation information 275c, the points remaining for printing, in other words the difference between the points representing printing that has been completed, corresponding to the total amount of ink in the ink cartridge 50 used for the printings, and the points guaranteed for printing, corresponding to the amount of ink with which the upper limit of sheets for printing can be printed, by means of dividing this figure by the points necessary for printing that are contained in the points necessary for printing information 275b, and that correspond to the amount of ink necessary for the printing of one sheet. In addition, the highest number of sheets corresponding to each size of sheets contained in the number of sheets remaining for printing 275d is also calculated by using the points guaranteed for printing, in place of the points remaining for printing, included in the number of sheets remaining for printing calculation information 275c. Then, the number of sheets remaining for printing, thus calculated, and the highest number of sheets corresponding to each size of sheet are written into the number of sheets remaining for printing information 275d. Further, since the number of prints is treated as an integer, any numeric value after the decimal point calculated in accordance with the calculation formula of the number of sheets remaining for printing calculation information 275c can be rounded down.

After step S320, or after at step S 300 it is judged that the routine did not start immediately after the power of the ink jet printer 20 had been turned ON, nor that the ink cartridge was replaced, the CPU 72 judges whether or not the ink cartridge 50 is in a state in which printing is possible (step S330). The judgment as to whether or not the ink cartridge 50 is in a state in which printing is possible can be made by means of judging, for instance, whether or not the number of sheets remaining for printing with the ink cartridge 50, a number that is included in the number of sheets remaining for printing information 275d and that is stored in the flash memory 75, is a value of 0. If it is judged that the ink cartridge 50 is not in a state in which printing is possible, the CPU 72 displays a warning message on the display unit 82 to the effect that printing is not possible with this ink cartridge 50 (step S470).

Figure 14:
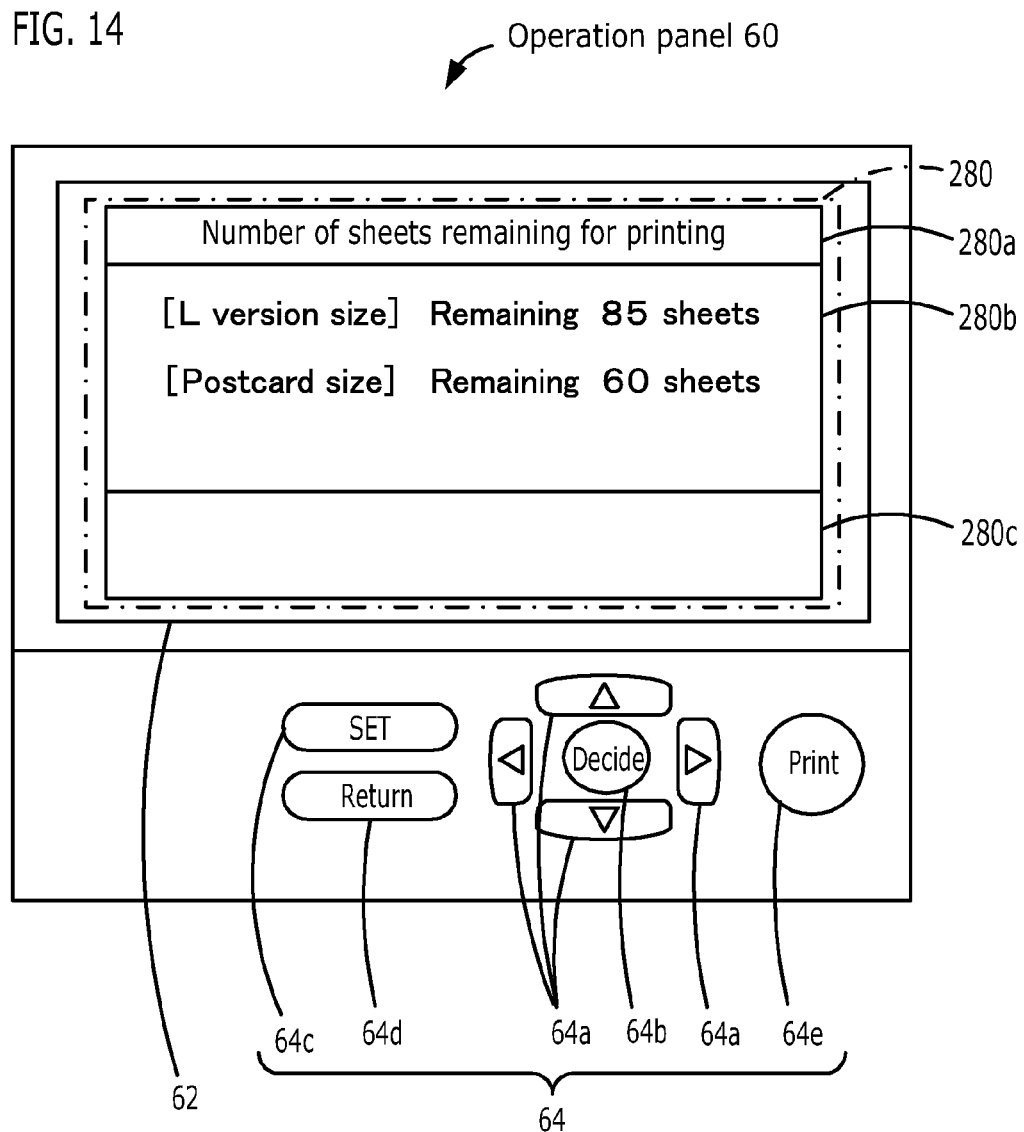
FIG. 14 is an illustration of a display screen 280 of the second embodiment on which the number of sheets remaining for printing is shown.
Figure 15:
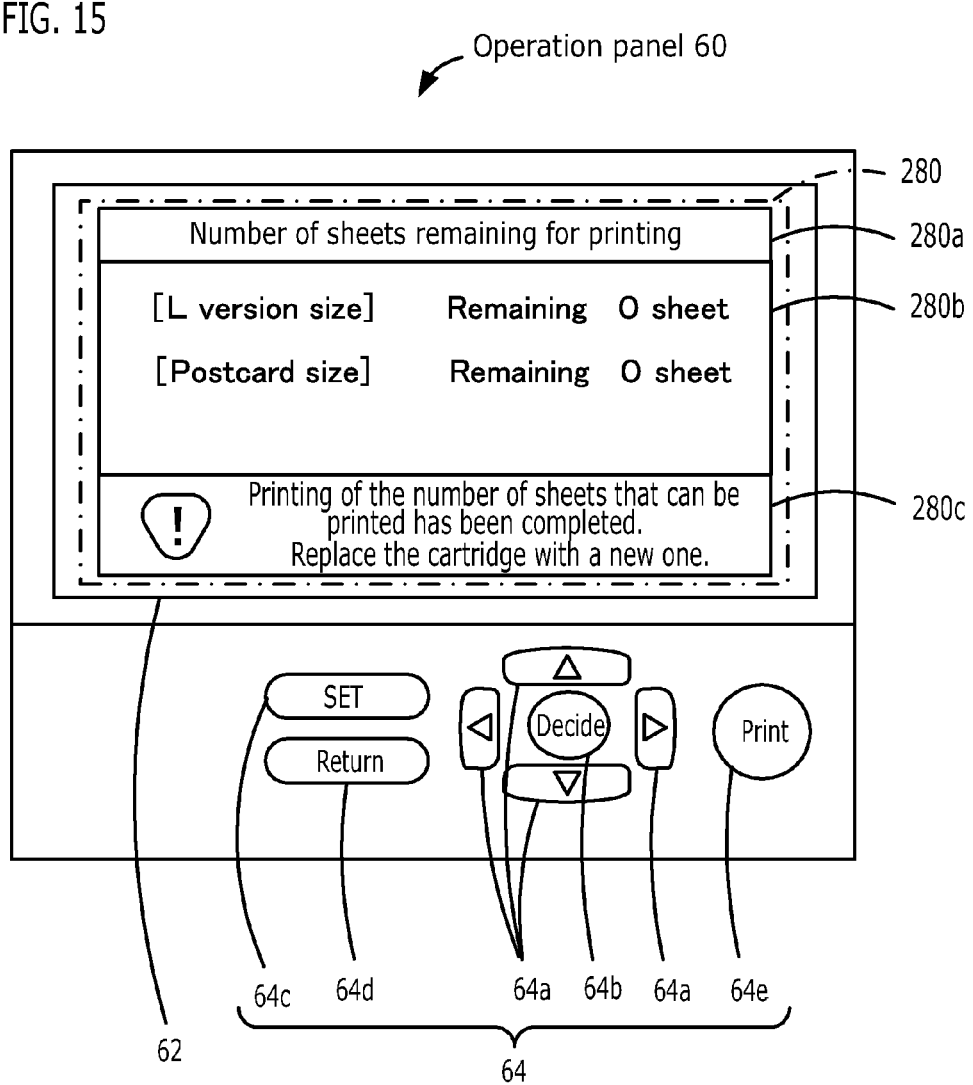
FIG. 15 is an illustration of a display screen 280 of the second embodiment on which the number of sheets remaining for printing is shown.
Figure 16:
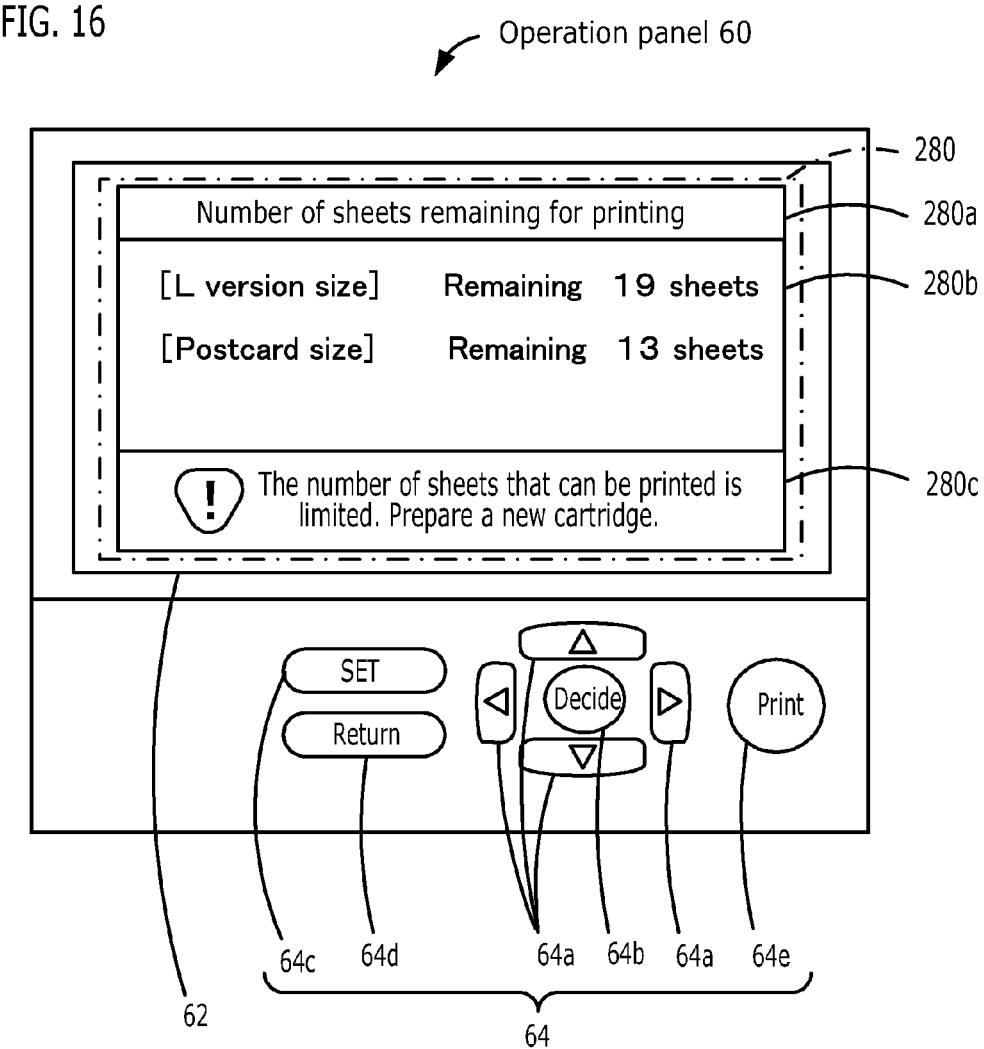
FIG. 16 is an illustration of a display screen 280 of the second embodiment on which the number of sheets remaining for printing is shown.

On the other hand, if at step S330 it is judged that the ink cartridge 50 is in a state in which printing is possible, the CPU 72 judges whether any printing instruction exists (step S340). The judgment as to whether or not any printing instruction exists is made on the basis of whether or not print data was received from the user PC 90, or whether or not the print execution key 64e was pressed. If it is judged that no printing instruction exists, the CPU 72 performs the processes after step S300 described above. If it is judged that a printing instruction does exist, the CPU 72 displays on the display unit 62 the number of sheets remaining for printing display screen 280 in order to notify a user of the number of sheets that can be printed with the ink cartridge 50, as shown in FIG. 14, FIG. 15, and FIG. 16 (step S350). On the number of sheets remaining for printing display screen 280 are provided the title display unit 280a that displays a title of the screen; the number of sheets remaining for printing display unit 280b that displays, in numeric characters, the respective numbers of sheets remaining for printing and corresponding to a name of sheet and a size of sheet for each sheet; and the message display unit 280c that displays items such as messages to a user. The number of sheets remaining for printing corresponding to each size of sheet, a number displayed in the number of sheets remaining for printing display unit 280b, is set so as to use instructions read from the number of sheets remaining for printing information 275d.

If the number of sheets remaining for printing display screen 280 is displayed on the display unit 62, the CPU 72 judges whether or not the number of sheets remaining for printing is lower than the threshold Nend (step S360). The threshold Nend is a threshold intended to judge that printing is not possible with the ink cartridge 50, and is set to the value of the number of sheets remaining for printing at a time when all of the sheets that can be printed have been printed, i.e., a value of 0. If it is judged that the number of sheets remaining for printing is lower than the threshold Nend, the CPU 72 determines that printing is no longer possible with the mounted ink cartridge 50, and sets 0 to the points remaining for printing in the cartridge information 275a stored in the flash memory 75 and in the cartridge information 254a stored in the memory element 54 (step S370). Thus, if, when the points remaining for printing is divided by the points necessary for printing, the number of sheets remaining for printing is a value after the decimal point (in other words, the number of sheets remaining for printing is less than one sheet), the CPU 72 sets a value of 0 to the points remaining for printing, and deems that the points printed have reached the points guaranteed for printing. Then, as shown in FIG. 15, the CPU 72 displays on the message display unit 280c of the number of sheets remaining for printing display screen 280 (step S470) a warning message to the effect that printing is not possible with this ink cartridge 50.

On the other hand, if at step S360 it is judged that the number of sheets remaining for printing is not lower than the threshold Nend, the CPU 72 judges for each size of sheet whether or not the number of sheet S sheets remaining for printing is lower than the threshold Nend (step S380). The threshold Nlow is a threshold intended to notify a user that the number of sheets that can be printed with the ink cartridge 50 is low, and may be defined to any value. In this case, the threshold Nlow is defined to be a value of 20% of the highest number of sheets S of postcard size that can be printed. If it is judged that the number of sheets remaining for printing is lower than the threshold Nlow, as shown in FIG. 16, the CPU 72 displays on the message display unit 280c of the number of sheets remaining for printing display screen 280 (step S390) a cautionary message to the effect that the number of sheets that can be printed with the ink cartridge 50 has decreased.

If at step S380 it is judged that the number of sheets remaining for printing is higher than the threshold Nlow, or after the cautionary message has been displayed at step S390, on the basis of information contained in the print data stored in the RAM 74 (step S400), the CPU 72 obtains the size of sheet of the print data for which a printing instruction has been issued and performs a process of printing the print data for which the printing instruction has been issued (step S410). More specifically, during the printing process, the CPU 72 performs functions such as driving the drive motor 33 and rotating the paper feed roller 35, and transports the sheet S to the area on the platen 40 where printing is possible. Then, the CPU 72 develops into bitmap images the print data within the print data buffer of the RAM 74, and controls voltage to the print head 24 so that the data that has been developed is printed on the sheet S. Then, the CPU 72 drives the carriage motor 34a, moves the carriage 22 in the carriage moving direction, and performs an instance of either flushing or cleaning by means of, for instance, moving the carriage 22 to the capping device 41 in stages.

In such a manner, when the process of printing one page is completed, the CPU 72 calculates the points representing printing that has so far been completed (step S420). The points representing printing that has been completed are calculated by means of reading from the points necessary for printing information 275b the points necessary for printing that correspond to the printing points used in printing on this occasion and conform with the size of sheet obtained in step S400; and by adding the points necessary for printing that have been read to the points representing printing that has been completed on the last occasion. On the basis of points representing printing that has been completed (Step S430), the CPU 72 calculates the number of sheets remaining for printing corresponding to each size of sheet. The calculation of the number of sheets remaining for printing needs to be done in a manner similar to that of Step S310 described above. In this context, as during the printing process, it is rare that ink of each color be ejected onto the entire surface of the sheet S, the amount of ink actually consumed during printing is less than the amount of ink corresponding to the printing points that constitute a calculation of the number of sheets remaining for printing. In other words, by continuing to print in a situation in which more printed points are estimated than the amounts of ink actually used, ink of an amount that can print the number of sheets remaining for printing can be ensured with certainty. Thus, if in the ink jet printer 20, all ink contained in the ink cartridge 50 is used up, and printing is performed of as many sheets as possible, priority is given to ensuring printing of the number of sheets guaranteed for printing rather than allowing the number of sheets being printed to become unstable. After calculating the number of sheets remaining for printing, the CPU 72 updates the cartridge information 254a stored in the memory element 54, and both the cartridge information 275a and the number of sheets remaining for printing information 275d stored in the flash memory 75 (Step S440).

Next, the CPU 72 judges whether or not all of the printing processes of the print data have been terminated (step S450). If the CPU 72 judges that the printing processes have not been terminated, the CPU 72 performs the processes after step S350. On the other hand, if at step S450 it is judged that the printing process has been terminated, or after a warning message has been displayed in the display unit 62 at step S470, the CPU 72 judges whether or not the power has been turned OFF (step S460). If the power has not been turned OFF, the CPU 72 performs the processes after step S300 described above. If the power has been turned OFF, the CPU 72 terminates this routine. Thus, if at step S330 it is judged that a state does not exist in which printing is possible, or when the number of sheets remaining for printing falls below the threshold Nend at step S360, the CPU 72 ensures that the process of printing is not undertaken with the ink cartridge 50, and every time that printing is performed with the ink cartridge 50 updates the number of sheets remaining for printing.

In this context, the relationship between components of this embodiment and those of the present invention will now be clarified. The display unit 62 of this embodiment corresponds to the notification module and display module of the present invention. The printer mechanism 21 corresponds to the printing module, the controller 70 corresponds to the control module and the acquisition module, and the memory element 54 and the flash memory 75 correspond to the storage module. In addition, ink of this embodiment corresponds to the colorant of the present invention and the sheet S corresponds to the print medium. The points guaranteed for printing correspond to the amount of colorant guaranteed for printing, the points necessary for printing correspond to the amount of colorant necessary, the points representing printing that has been completed correspond to the amount of colorant printed, the number of sheets remaining for printing corresponds to the number of sheets remaining, and the points remaining for printing correspond to the amount of colorant remaining. In this embodiment, one example of a printing notification method of the present invention is also clarified by means of description of operations of the ink jet printer 20.

According to the ink jet printer 20 of this embodiment that has been described in detail above, when the points representing printing that has been completed reach the points guaranteed for printing, printing is disabled by means of the ink cartridge 50 that contains at least ink for the points guaranteed for printing. When the points representing printing that has been completed do not reach the points guaranteed for printing, an image is printed on a sheet S with this ink cartridge 50. On the basis of the points necessary for printing information 275b including the points representing printing that has been completed, the points guaranteed for printing, and the points necessary for printing relative to multiple types of sheets S, the number of sheets remaining for printing is determined for each of the multiple types of sheets S, and the number of sheets remaining for printing thus determined is displayed on the display unit 62. In other words, the number of sheets remaining for printing for each of the multiple types of sheets S while printing is taking place with the use of the ink cartridge 50 up to the upper limit of sheets for printing, a number that constitutes the upper limit of sheets that can be printed, is determined by dividing the points remaining for printing, which is a difference value between the points guaranteed for printing, corresponding to the upper limit for printing and the points representing printing that has been completed, in other words used during printing, by the points necessary for printing of a predetermined sheet. Thus, when the upper limit of sheets for printing is reached, printing with that cartridge does not take place, and during the course of using the cartridge no case arises in which the necessary printing points fluctuate and printing cannot be done until printing of the notified number of sheets remaining for printing has been completed. Thus, in comparison with cases where there is no upper limit to the number of sheets that can be printed with the ink cartridge, and, in consequence, the number of sheets S of each type remaining for printing is determined on the basis of the amount of ink used in printing in the past, and notified, the number of sheets remaining for printing can be notified to a user with a greater degree of certainty, in conformance with the multiple type of sheet S. Thus, there is no need for a user to become confused because the notified number of sheets remaining for printing differs from the number of sheets actually printed. In addition, as the determined number of sheets remaining for printing is displayed on the display unit 62, a user can visually recognize the number of sheets remaining for printing, by means of images.

In addition, since, when the ink cartridge 50 is used to print an image on a sheet S, the points representing printing that has been completed, to which printing points used during printing on this occasion has been added, is stored in the flash memory 75, or in the memory element 54, it is relatively easy to manage the points representing printing that has been completed. In addition, when the ink cartridge 50 is used to print an image on a sheet S, points representing printing that has been completed, are determined on a basis of printing points used during printing on this occasion having been added. Then, on the basis of points representing printing that has been completed, thus determined, the points guaranteed for printing, and the points necessary for printing information 275b, the number of sheets remaining for printing can be determined in respect of each of the multiple types of sheet S. As the number of sheets remaining for printing thus determined is stored in the flash memory 75, or in the memory element 54, the number of sheets remaining for printing can be notified more quickly than in a case in which, for instance, the number of sheets remaining for printing is determined after the notification command of the number of sheets remaining.

In addition, since information about the ink cartridge 50 (items such as points representing printing that has been completed or points remaining for printing) is stored in the memory element 54 provided in the ink cartridge 50, the ink cartridge 50 can be linked with certainty with information about the ink cartridge 50. Furthermore, when the notification command to display on the display unit 62 the number of sheets remaining for printing is obtained by means of the receipt of a printing command, the number of sheets remaining for printing may be displayed when an image is printed (when a user needs it) so as to display on the display unit 62 the number of sheets remaining for printing, thus determined. Moreover, if a value after a decimal point results when the points remaining for printing are divided by the points necessary for printing, i.e., when the number of sheets remaining for printing thus determined is less than 1, in consideration of the fact that the points representing printing that has taken place have reached the level of points guaranteed for printing, a value of 0 is set to the points remaining for printing and shut-off takes place, thereby preventing printing in excess of the points guaranteed for printing. Further, as the ink cartridge 50 is used to print an image of a photograph, clean printings with ink become possible.

It goes without saying that, the present invention is not limited to the embodiments described above, and that it can be carried out in a variety of embodiments, as long as they remain confined to the technical range of this invention.

Figure 17:
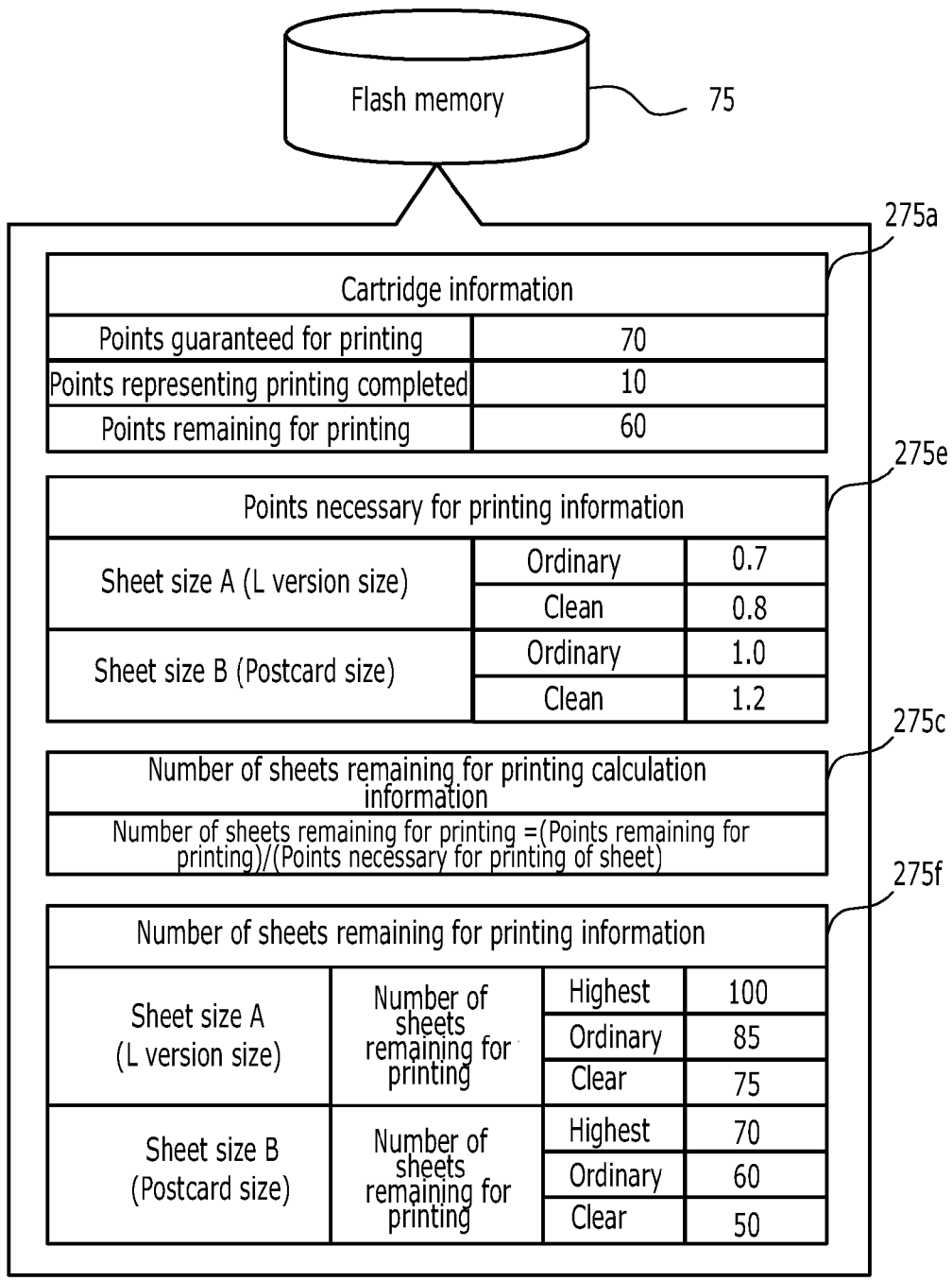
FIG. 17 is an illustration of other information stored in the flash memory 75 of the second embodiment.

For instance, in the embodiment described above, as the size of sheet, the points necessary for printing information 275b including the points necessary for printing of the L version size and the points necessary for printing for the postcard size are used. However, as shown in FIG. 17, a points necessary for printing information 275 e in which the points necessary for printing are defined on the basis of printing conditions of more than one printing quality, such as normal picture quality (ordinary) printing or high quality picture (clean) printing, may be used. At this time, on the basis of this points necessary for printing information 275e, the number of sheets remaining for printing information 275f, which is determined for each printing condition of each of the multiple types of sheet S, may be stored in the flash memory 75. In this way, a user can be notified of the number of sheets remaining for printing according to the printing conditions applicable for the printing quality of each of the multiple types of size of sheet, and the user can obtain more detailed information on the number of sheets remaining for printing. Alternatively, in addition to, or in place of, the printing conditions on this picture quality for each size of sheet, a points necessary for printing may be used in which the points necessary for printing are defined on the basis of printing conditions relating to the ink ejection range, including bordered or borderless printing. Even with this, a user can obtain more detailed information on the number of sheets remaining for printing.

In the embodiment described above, the points necessary for printing are defined for sizes of sheet as multiple types. However, in addition to, or in place of this, points necessary for printing may be defined as multiple types in terms of paper quality, such as gross paper or plain paper, film sheet or cardboard. Even when this is done, a user can still be notified of a more reliable number of sheets remaining for printing broken down into the multiple types of sheet S. Although in the embodiment described above, the sizes of sheet are set to two types, namely, an L-version size and a postcard size, more than two types may also be set.

In the embodiment described above, a user is notified by means of display of the number of sheets remaining for printing on the display unit 62. However, a user may be notified by having the ink jet printer 20 incorporate a speaker (not shown), by converting into sound the number of sheets remaining for printing, and by outputting the converted sounds from this speaker. In this way, by means of sound a user can be aurally notified of the number of sheets remaining for printing.

In the embodiment described above, the cartridge information 254a including the points representing printing that has been completed and points remaining for printing is stored in the memory element 54. However, either of these items may be omitted. The reason for this is that as long as either one of these two items, points representing printing that has been completed and points remaining for printing can be kept track of, the other one of the items can be calculated by working out a difference from the points guaranteed for printing. In this way, simplification of the cartridge information 254a can be achieved. Further, the same principle also applies to the cartridge information 275a stored in the flash memory 75. Moreover, the number of sheets remaining for printing may be stored in the memory element 54. If this is done, the number of sheets remaining for printing, in other words information relating to the ink cartridge 50, can be obtained by simply reading it from the memory element 54.

In the embodiment described above, every time that one sheet of print data is printed for which a printing instruction has been issued, the points representing printing that has been completed, the points remaining for printing, and the number of sheets remaining for printing are calculated and updated. However, the size of sheet and the number of sheets that are incorporated in the print data are obtained, and on the basis of the information obtained, the points representing printing that has been completed, the points remaining for printing, and the number of sheets remaining for printing, are calculated together before printing of this print data starts or after the printing ends, and the cartridge information 254a, the cartridge information 275a, and the number of sheets remaining for printing information 275d may thereby be updated. In this way, simplification of processing can be achieved. At this time, if the number of sheets that have been printed is greater than the number of sheets remaining for printing, the processes of steps S370 and S470 may be executed when the number of sheets remaining for printing becomes 0 (zero).

In the embodiment described above, the number of sheets remaining for printing is stored in the flash memory 75. However, instead of this, the number of sheets that have been printed, a figure with which the number of sheets remaining for printing can be calculated by means of subtraction from the upper limit of sheets for printing, may be stored in the flash memory 75. The reason for this is that the number of sheets remaining for printing can be calculated from a difference between the upper limit of sheets for printing and the sheets that have been printed.

In the embodiment described above, the cartridge information 275a, in other words the information relating to the ink cartridge 50, is always saved. However, rather than storing the cartridge information 275a in the flash memory 75, whenever necessary the cartridge information 254a of the memory element 75 may be read from the RAM 74. In this manner, memory consumption on the part of the flash memory 75 can be controlled.

In the embodiment described above, assumptions were made that a command to display the number of sheets remaining for printing was issued whenever a printing instruction was issued at step S340, and that the number of sheets remaining for printing was displayed on the display unit 62. However, screen display keys (not shown) may be provided in the operating unit 64, and whenever an instruction from a user associated with depression of the screen keys is obtained, the number of sheets remaining for printing may be displayed on the display unit 62. In this manner, a user is able to check the number of sheets remaining for printing whenever the user so wishes. At that time, since as described above, the ink jet printer 20 calculates the number of sheets remaining for printing and stores it in the flash memory 75 immediately after startup, or after the replacement of a cartridge, the number of sheets remaining for printing can be displayed on the display unit 62 more quickly than in a case in which the number of sheets remaining for printing is calculated after a display command has been received.

In the embodiment described above, the size of sheet of print data for which a printing instruction has been issued is obtained on the basis of information contained in the print data. However, an optical sensor capable of detecting an end of a sheet is provided in the carriage 22, and by scanning the carriage 22 at the time that the sheet S is transported to the area where printing is possible, the size of the sheet may be detected by detecting the right and left ends of a sheet S on the basis of output values of light that are illuminated from the sensor and reflected by the sheet S.

In the embodiment described above, the number of sheets remaining for printing display screen 280 is displayed on the display unit 62. However, the number of sheets remaining for printing display screen 280 may be displayed in a display of the user PC 90.

In the embodiment described above, whatever types of printing takes place, printing of the number of the upper limit of sheets for printing can be ensured, because for the upper limit of sheets an amount of ink that permits ejection of ink onto the entire surfaces of sizes of sheet corresponding to the upper limit of sheets for printing is contained in at least each of the type ink containers 52a to 52f. However, an amount of ink necessary for printing of a standard photographic image plus an amount of ink allowing for a predetermined safety margin is contained in each of the ink containers 52a to 52f, and points may be set such as points guaranteed for printing, and points necessary for printing, points that correspond to such amounts of ink. In this manner, the amount of residual ink that is superfluous at times of shut-off can be reduced.

In the embodiment described above, an amount of ink consumed in printer maintenance operations such as an instance of cleaning and an instance of flushing is not deemed to be printing points. However, printing points may be managed even when they take account of amounts of ink to be consumed during printer maintenance operations.

In the embodiment described above, the printer mechanism 21 is of an off-carriage type in which an ink cartridge is mounted on the main body. However, the printer mechanism 21 may be of an on-carriage type in which an ink cartridge 50 is mounted onto the carriage 22. Moreover, although the printer mechanism 21 was described in the embodiment as a color ink jet printer 20 in which ink is used as a colorant, the printer mechanism 21 may be a color laser printer in which toner is used as a colorant, or a monochrome printer. Alternatively, although in the embodiment described above, the printing mechanism 21 was a printer used exclusively for printing photographs, it does not need to be limited in this way but may be a printer that is capable of printing document data. Alternatively, it may be a hybrid printer unit such as a FAX machine or a copier.

Furthermore, for ease of explanation, cartridge information 254a, cartridge information 275a, points necessary for printing 275b and the number of sheets remaining for printing information 275d have been described in this embodiment with the use of specific values. However, it goes without saying that any arbitrary value may be used as appropriate within the range described above.

Third Embodiment

Figure 18:
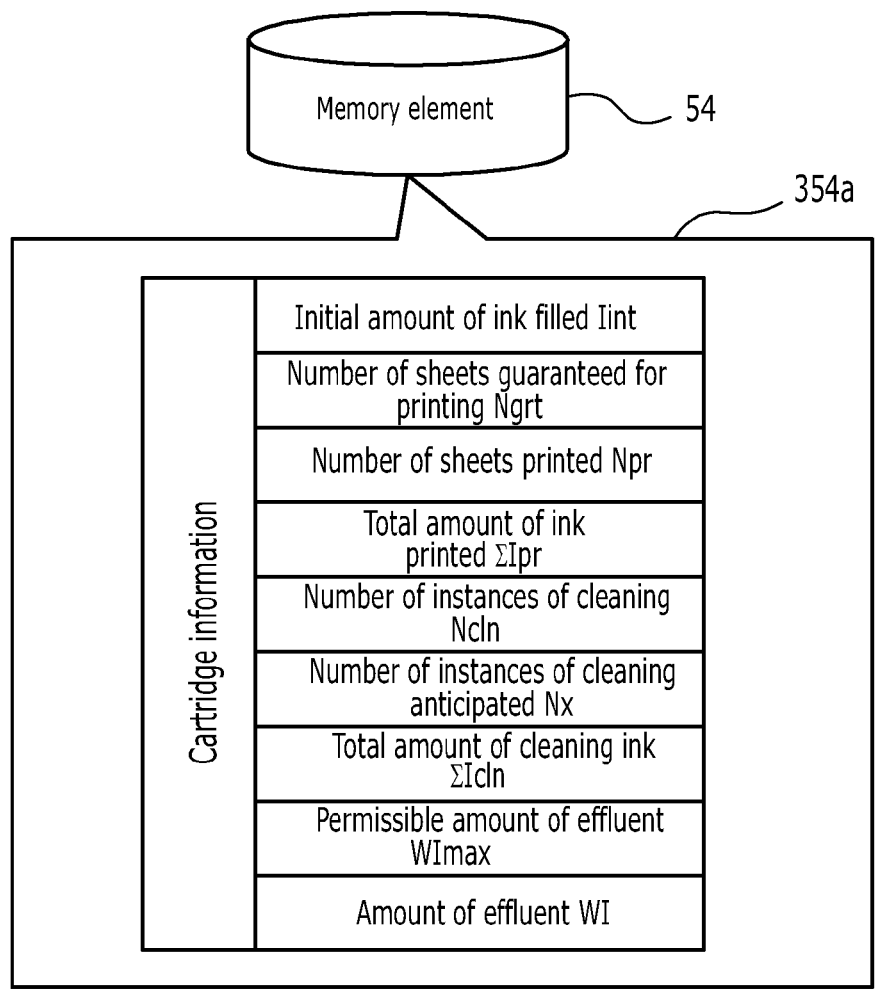
FIG. 18 is an illustration of information 354a stored in the memory element 54 of the third embodiment.
Figure 19:
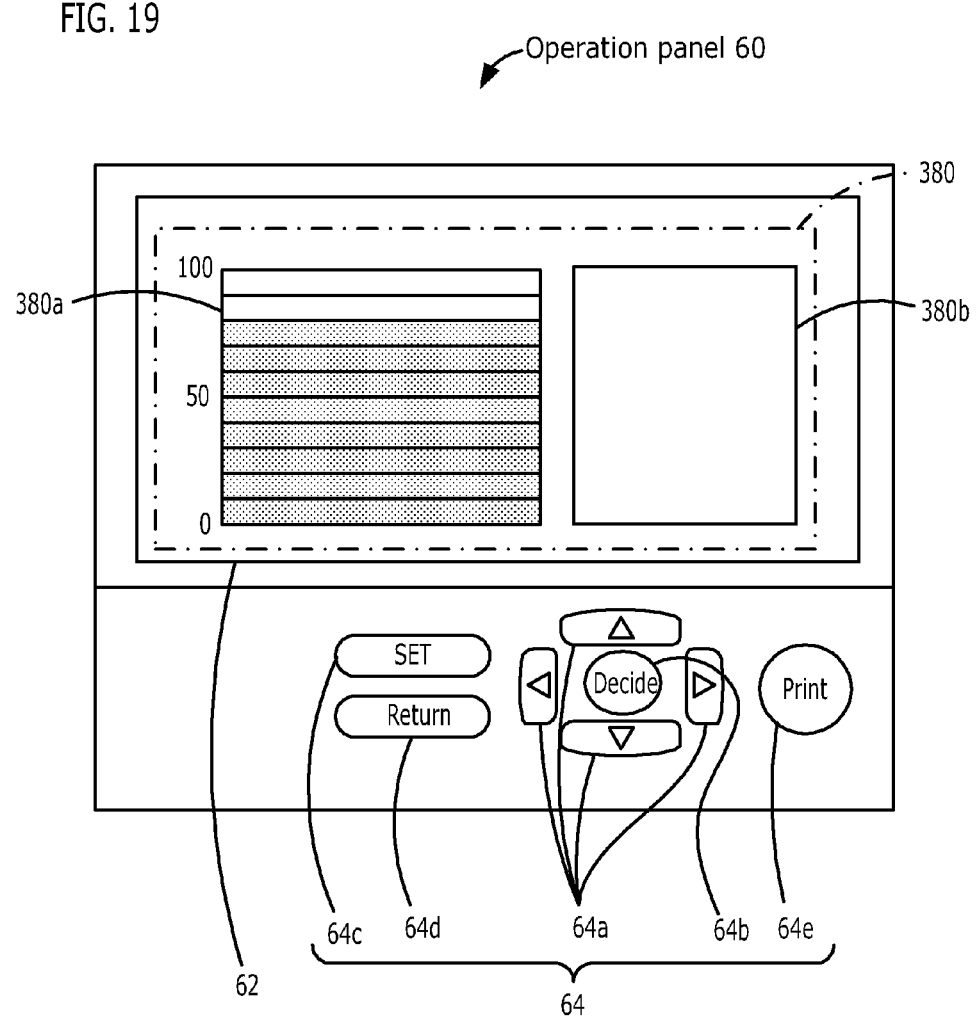
FIG. 19 is an illustration of information display screen 380 of the third embodiment.

As the ink jet printer 20 of this embodiment has the same configuration as that of the first embodiment, a description thereof is omitted. However, since in this embodiment, information stored in the memory element 54, or the display contents on the display unit 62 of the operation panel 60, differ from those of the first embodiment, a description there follows. FIG. 18 is an illustration of cartridge information 354a stored in the memory element 54. FIG. 19 is an illustration of an information display screen 380 on the operation panel 60.

As shown in FIG. 18, the cartridge information 354a includes information such as an initial amount of ink filled lint corresponding to individual ink containers 52a to 52f (C, M, Y, R, B, K) of an ink cartridge 50 that is attached at the time; the number of sheets guaranteed for printing Ngrt set as an upper limit of the number of sheets that can be printed with the ink cartridge 50 attached at the time; the number of sheets printed Npr that represents the number of sheets printed while the ink cartridge 50 in use at the time is attached; the total amount of ink printed ΣIpr that represents the total amount of ink consumed during printing performed while the ink cartridge 50 in question is attached; the number of instances of cleaning actually performed Ncln while the ink cartridge 50 at the time is attached; a number of instances of cleaning anticipated Nx that is set when the ink cartridge 50 in question is attached; the total amount of cleaning ink ΣIcln that represents the total amount of ink consumed during instances of cleaning performed while the ink cartridge 50 in question is attached; the permissible amount of effluent Wimax that is the maximum amount that can be absorbed by the effluent pad 53;

and the amount of effluent WI that is the amount that up to that time has been absorbed by the effluent pad 53.

As illustrated in FIG. 19, on the information display screen 380 displayed on the display unit 62 of the operation unit 60 is provided a count display unit 380a on which are displayed in visible mode a relationship among the number of sheets guaranteed for printing Ngrt, the number of sheets printed Npr, and the number of sheets that can be printed, and a message display unit 380b that notifies a user by means of characters of factors such as the latest situation. On the count display unit 380a, rectangular blocks corresponding to a predetermined percentage (10% in this case) of the number of sheets guaranteed for printing Ngrt are vertically arranged; blocks corresponding to the number of sheets that can be printed will be colored from the bottom, while blocks corresponding to the number of sheets that have been printed Npr are displayed in white above the blocks corresponding to the number of sheets that can be printed. In FIG. 19, the number of sheets printed Npr accounts for 20% of the total number of sheets, while the number of sheets that can be printed accounts for 80% of the total number of sheets. Alternatively, at this time, the message display unit 380b may display in numeric characters the number of sheets that can be printed. In addition, the number of sheets that can be printed can be calculated by subtracting the number of sheets printed Npr from the number of sheets guaranteed for printing Ngrt.

Figure 20:
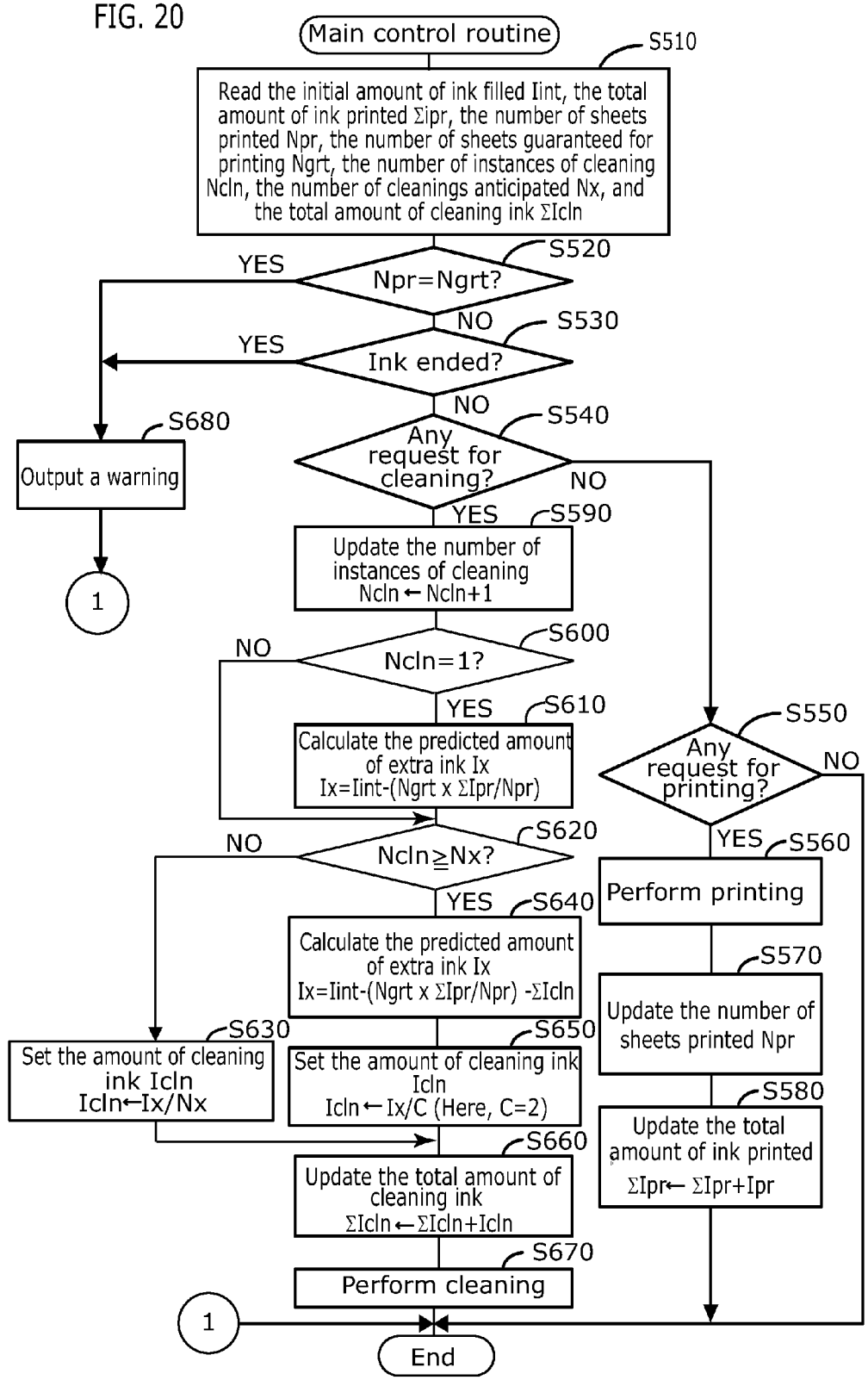
FIG. 20 is a flow chart illustrating one example of a main control routine of the third embodiment.

Next will be described an operation of the ink jet printer 20 of this embodiment that has thus been configured. In the following description, the number of sheets guaranteed for printing is referred to as the number of sheets guaranteed for printing Ngrt. FIG. 20 is a flow chart illustrating one example of a main control routine executed by the CPU 72 of the controller 70. The routine is stored in the ROM 73 and executed by the CPU 72 at predetermined intervals after the power of the ink jet printer 20 has been turned ON. When the routine is started, the CPU 72 first enters data such as the initial amount of ink filled Iint corresponding to individual ink containers 52a to 52f (C, M, Y, R, B, K) of an ink cartridge 50 that is attached at the time; the number of sheets guaranteed for printing Ngrt set as an upper limit of the number of sheets that can be printed with the ink cartridge 50 at the time; the number of sheets printed Npr that represents the number of sheets printed while the ink cartridge 50 in question is attached; the total amount of ink printed ΣIpr that represents the total amount of ink consumed during printing performed while the ink cartridge 50 in question is attached; the number of instances of cleaning Ncln actually performed while the ink cartridge 50 in question is attached; the number of instances of cleaning anticipated Nx that is set when the ink cartridge 50 in question is attached; and the total amount of cleaning ink ΣIcln that represents the total amount of ink consumed during instances of cleaning performed while the ink cartridge 50 in question is attached (Step S510). Although the data has been stored in both the memory element 54 attached to the ink cartridge 50 and the flash memory 75 of the controller 70, in this embodiment, the data is read from the flash memory 75 and entered. In addition, when a cartridge cover (not shown), which is opened and closed whenever the ink cartridge 50 is replaced, is opened or closed, the CPU 72 judges whether or not data stored in the memory element 54 attached to the ink cartridge 50 matches data stored in the flash memory 75. If both sets of data do match, the CPU 72 judges that the cartridge has not been replaced, and therefore does not update the data. However, if both sets of data do not match, the CPU 72 judges that the ink cartridge 50 has been replaced with a new one. In these circumstances, the CPU 72 not only sets to the number of anticipated cleanings Nx that are expected to be performed while the new ink cartridge 50 after replacement is attached the number of cleanings Ncln that have been performed while the ink cartridge 50 used prior to replacement was attached, but it also updates data, such as resetting the number of sheets printed Npr, the total amount of ink printed ΣIpr, the number of instances of cleaning Ncln, and the total amount of cleaning ink ΣIcln.

Then, the CPU 72 judges whether or not the number of sheets printed Npr has reached the number of sheets guaranteed for printing Ngrt (step S520), and whether or not the amount of ink remaining in any of the ink containers 52a to 52f has fallen under a judgment value (step S530). In this context, the ink runout judgment value is set so as to slightly higher than zero so that ink will not run out during printing onto sheets for printing. In addition, the initial amount of ink filled Iinit in respect of the individual ink containers 52a to 52f is normally set so that ink runout will not occur before the number of sheets printed Npr reaches the number of sheets guaranteed for printing Ngrt. However, as the possibility of ink runout occurring for some unexpected reason cannot be denied, in anticipation of such circumstance, the process of step S530 should be performed. The amount of ink remaining and the ink runout judgment value are expressed in terms of weight. Thus, if at step S520 the number of sheets printed Npr has not reached the number of sheets guaranteed for printing Ngrt, and if the amount of ink remaining in any of the ink containers 52a to 52f does not fall under the ink runout judgment value, the CPU 72 judges whether or not any request for the cleaning of nozzles 23 exists (step S540). A request for the cleaning of nozzles 23 may be made by means of an instruction from a user from the operation panel 60, or an instruction from a user from a printer driver installed on the user PC 90. In addition, requests are made automatically by the CPU 72 at predetermined intervals.

If at step S540 no request for cleaning exists, the CPU 72 continues to judge whether or not any request for printing exists (step S550). The request for printing may be made by means of an instruction from a user from the operation panel 60, or by means of an instruction from a user from a printer driver installed on the user PC 90. If no request for printing exists at step S550, the CPU 72 directly terminates the routine. On the other hand, if a request for printing does exist, the CPU 72 reads out print data on the basis of a photographic image that constitutes the object of the request for printing, and controls in such away that the printer mechanism 21 prints the print data (step S560). More specifically, the CPU 72 performs operations such as driving the drive motor 33 of the printer mechanism 21 and rotating the paper feed roller 35, and transports a recording sheet S to the area on the platen 40 on which printing is possible. Then, the CPU 72 develops into a bitmap image print data in the print buffer in RAM 74, and controls voltage to the print head 24 so that the data developed is printed on the recording sheet S. Thus, after the printer mechanism 21 has finished printing, the CPU adds to the number of sheets printed NPr the number of sheets printed on this occasion, and calculates a new value that takes into account a revised number of sheets printed Npr that reflect these additions Npr (Step S570). Then, the CPU 72 adds to the total amount of ink printed ΣIpr the amount of ink printed Ipr used during printing on this occasion and calculates a new value that takes into account a revised total amount of ink printed ΣIpr (Step S580). Then, the CPU 72 terminates the routine. The total amount of ink printed ΣIpr is calculated for each color. More specifically, dots are divided into three sizes, namely, large dots, medium dots, and small dots, and ink weight is determined in respect of each single dot of each size in each color. Thus, every time that one printing pass is completed, on the basis of information relating to what size of dot has been used for each color, how many times has each size of dot been used for each color, and the ink weight of each single dot, ink usage is calculated for each color (Unit: weight). When the printing of one sheet for printing has been completed, ink usage of every printing pass for each color is added up so as to calculate an amount of ink of each color Ipr. Then, the total amount of ink printed is calculated by adding up the amounts of ink of each color printed Ipr.

When, on the other hand, a request for an instance of cleaning has been made at step S540, the CPU 72 first adds a value of 1 to the number of instances of cleaning Ncln and calculates a new value that takes into account the revised number of instances of cleaning Ncln (step S590). The CPU 72 then judges whether or not the number of instances of cleaning Ncln after updating has taken place is the value 1 (step S600). If the number of instances of cleaning Ncln is the value 1, i.e., when a cleaning is performed for the first time after an existing ink cartridge 50 has been mounted, the CPU 72 calculates the predicted amount of residual ink Ix (step S610). The predicted amount of residual ink Ix is the amount of ink that, on the assumption that the number of sheets printed Npr has reached the number of sheets guaranteed for printing Ngrt, is anticipated to remain residual in the ink cartridge 50, and is calculated for every color. More specifically, by dividing the total amount of ink of a certain color printed ΣIpr by the number of sheets printed Npr, an average amount of ink printed per one sheet of that color can be determined. By multiplying the average value by the number of sheets guaranteed for printing Ngrt, on the assumption that the number of sheets printed Npr has reached the number of sheets guaranteed for printing Ngrt, a predicted value of the total amount of print ink of that color can be obtained (Ngrt×ΣIpr/Npr). Then, by subtracting the predicted value of the total amount of ink printed from the initial amount of ink filled Iint into the ink cartridge 50 attached at that time (Ngrt×ΣIpr/Npr), a predicted value of the amount of residual ink of that color can be calculated (refer to the formula (1)). If any other operation in which ink is consumed (such as flushing), is performed at this point in time, in the calculation of the predicted amount of residual ink Ix, this factor should be taken into account.

$$Ix=Iint-(Ngrt\times\Sigma Ipr/Npr)$$

Then, if, after step S610 or at step S600, the number of instances of cleaning Ncln is not the value 1, the CPU judges whether or not the number of instances of cleaning Ncln exceeds the anticipated number of instances of cleaning Nx (step S620). Then, if the CPU 72 judges that the number of instances of cleaning Ncln is less than the anticipated number of instances of cleaning Nx, it sets the amount of cleaning ink Icln to a value obtained by dividing by the anticipated number of instances of cleaning Nx the smallest value among the predicted amounts of residual ink Ix of respective colors determined at step S610 (step S630). Furthermore, the CPU 72 adds to the total amount of cleaning ink ΣIcln the amount of cleaning ink Icln on this occasion and sets a new value that reflects the revised total amount of cleaning ink ΣIcln that takes these additions into account (step S660). The CPU 72 then performs instances of cleaning (step S670). In fact, until the instance of cleaning that is performed just before the number of instances of cleaning Ncln reaches the anticipated number of instances of cleaning Nx, cleaning is performed by taking, as the amount of cleaning ink, a value obtained by dividing by the anticipated number of instances of cleaning Nx the smallest value among the predicted amounts of residual ink of respective colors that were calculated when a request for cleaning was made for the first time after the ink cartridge 50 in question had been attached (Ix/Nx). In this context, cleaning is performed according to the following procedure. Specifically, the carriage motor 34a is driven to move the carriage 22 by way of the carriage belt 32, so that the print head 24 is located in a position opposite to the capping device 41. As the carriage 22 moves, the capping device 41 rises toward the print head 24, thereby blocking the nozzles 23. If the suction pump 42 is actuated in this condition, a negative pressure is generated in the internal space of the capping device 41. In these circumstances, due to the negative pressure, ink is forcibly pumped out of the nozzles 23 that have been formed to correspond to each color. The ink pumped out by the suction pump 42, running through the effluent tube 43 and the effluent feed port 53a, is absorbed as waste ink by the effluent pad 53 of the ink cartridge 50. The amount of ink actually consumed during instances of cleaning can be calculated on the basis of rotations of the suction pump 42, and of ink weight corresponding to the rotations. Thus, after cleaning has been performed, the CPU terminates the routine.

If, on the contrary, at step S620 it is judged that the number of instances of cleaning Ncln exceeds the anticipated number of instances of cleaning Nx, the CPU 72 once again calculates the predicted amount of residual ink Ix at this point in time (step S640). The predicted amount of residual ink Ix is calculated for each color according to the following procedure. Specifically, by dividing the total amount of ink printed ΣIpr of a certain color at that point in time by the number of sheets printed Npr, an average amount of ink printed per one sheet of that color can be determined. By multiplying the average value by the number of sheets guaranteed for printing Ngrt, on the assumption that the number of sheets printed Npr has reached the number of sheets guaranteed for printing Ngrt, the predicted total amount of ink of that color printed (Ngrt×ΣIpr/Npr) can be determined. Then, by means of subtracting from the initial amount of ink filled Iint in the ink cartridge 50 attached at that time, the predicted total amount of ink (Ngrt×ΣIpr/Npr) and the total amount of cleaning ink ΣIcln up to that time, the predicted amount of residual ink Ix of that color can be calculated (refer to the formula (2)). If any other operation (such as flushing) in which ink is consumed is performed at this point in time, in the calculation of the predicted amount of residual ink Ix, this factor should be taken into account.

$$Ix=Iint-(Ngrt\times\Sigma Ipr/Npr)-\Sigma Icln$$

Next, the CPU 72 sets the amount of cleaning ink Icln (step S650). The CPU 72 adds to the total amount of cleaning ink ΣIcln the amount of cleaning ink Icln on this occasion and sets a new value that takes into account the revised total amount of cleaning ink ΣIcln (step S660). The CPU 72 then performs the instance of cleaning (step S670). In this context, the amount of cleaning ink Ic is a value obtained by dividing by a fixed value C (C=2 in this embodiment) the smallest value among the predicted amounts of residual ink Ix of the respective colors that were calculated at step S640). In other words, as soon as the number of instances of cleaning Ncln has reached the anticipated number of instances of cleaning Nx, or at a time thereafter, cleaning is performed by using, as the amount of cleaning ink Icln, a value obtained by dividing by the fixed value C the smallest value among the predicted amounts of residual ink Ix of the respective colors that were calculated when the request for cleaning was made (Ix/C). The procedure for cleaning is as has been described above. After performing cleaning in this way, the CPU 72 terminates the routine.

When, on the contrary, the number of sheets printed Npr has reached the number of sheets guaranteed for printing Ngrt, or when the amount of ink remaining in any of the ink containers $52a$ to $52f$ falls below the ink runout judgment value at step S530, the CPU 72 displays on the message display unit 380$b$ of the operation panel 60 a message to the effect that printing is no longer possible (step S680), and terminates the routine. Moreover, the initial amounts of ink filled Iinit into the individual ink containers $52a$ to $52f$ are set so that ink runout will not occur before the number of sheets printed Npr reaches the number of sheets guaranteed for printing Ngrt. However, the possibility of ink runout occurring for some unexpected reason cannot be denied, and in anticipation of such a contingency, the process of step S530 needs to be performed.

Figure 21:
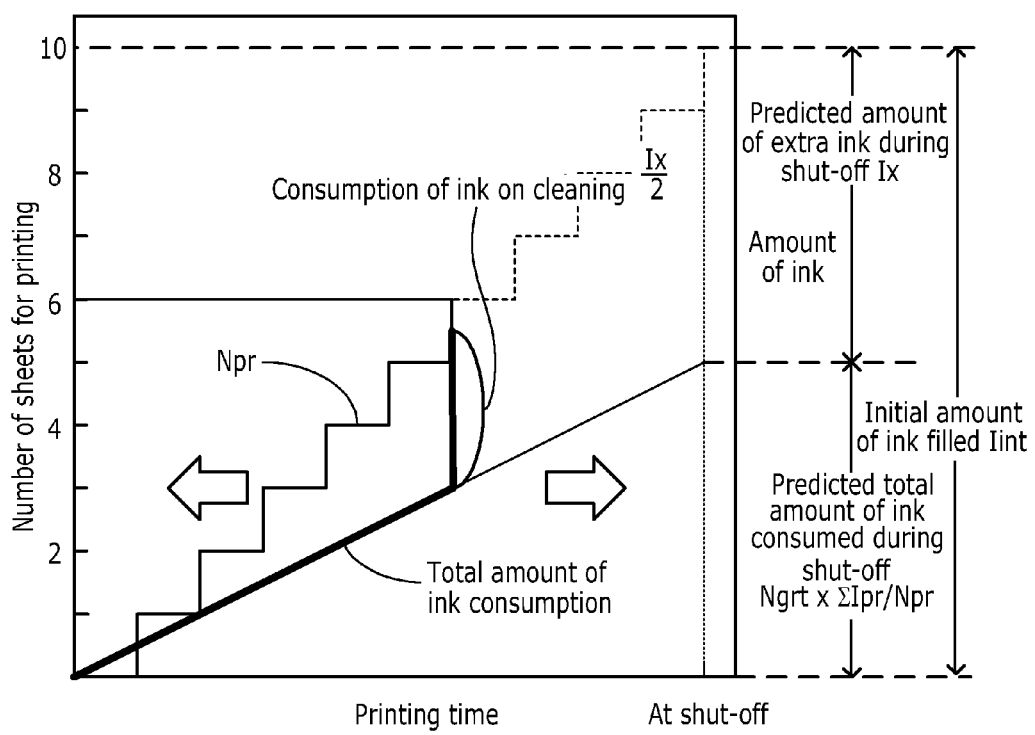
FIG. 21 is an illustration of variations in the number of sheets printed and in the total consumption of ink in the third embodiment.
Figure 22:
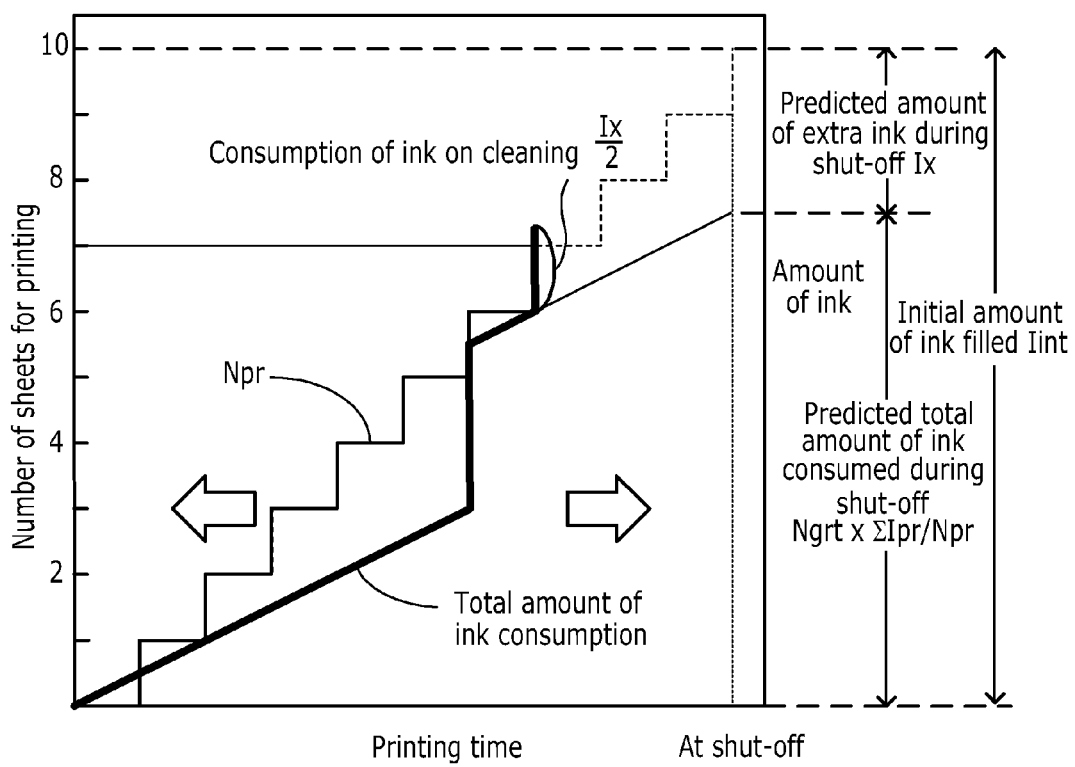
FIG. 22 is an illustration of variations in the number of sheets printed and in the total consumption of ink in the third embodiment.
Figure 23:
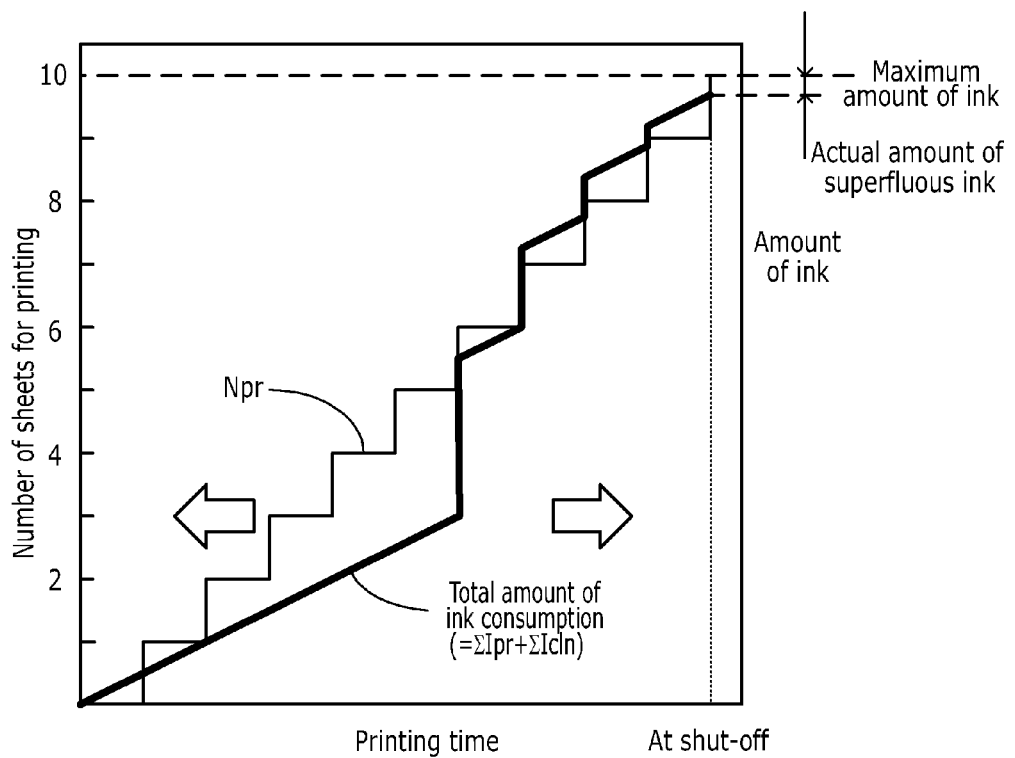
FIG. 23 is an illustration of variations in the number of sheets printed and in the total consumption of the ink in the third embodiment.

Next, on the basis of the timing charts of FIG. 21 to FIG. 23, changes will be described in the number of sheets printed and in the total consumption of ink relative to variations in printing time. In this context, a case will be described in which an ink cartridge 50 is first attached to the ink jet printer 20. For ease of explanation, it should be assumed that the number of sheets guaranteed for printing is 10 sheets, that the amount of ink used for printing any one sheet is identical, and that ink is consumed only during printing and cleaning. Since no data on an ink cartridge 50 before replacement exists when an ink cartridge 50 is attached for the first time, the anticipated number of instances of cleaning is set to zero. As shown in FIG. 21, it can be assumed that a request for cleaning was made for the first time after the attachment of the ink cartridge 50 in question after the sixth instance of printing ended, i.e., when the number of sheets printed Npr was 6. At this time, since the number of instances of cleaning Ncln is 1, an affirmative judgment is made at step S600, and the predicted amount of residual ink Ix is calculated at step S610. Then, since the number of instances of cleaning Ncln is greater than the anticipated number of instances of cleaning Nx (zero), an affirmative judgment is made at step S620, and the predicted amount of residual ink Ix is once again calculated at step S640. However, this will be identical to the predicted amount of residual ink Ix mentioned above. Then, at step S650, the amount of cleaning ink Ic1$n$ should be a value obtained by dividing the predicted amount of residual ink Ix by the fixed value C (=2). The total amount of cleaning ink ΣIcln is updated at step S660, and cleaning is performed at step S670. The total consumption of ink in FIG. 21 is that prevailing at the time that this cleaning was completed. Then, as shown in FIG. 22, after the seventh printing ends, i.e., when the number of sheets printed Npr is 7, an assumption is made that a request for a further instance of cleaning has been made. At this stage, as the number of instances of cleaning Nc1$n$ is 2, a negative judgment is made at step S600. As the number of instances of cleaning Ncln is greater than the anticipated number of instances of cleaning Nx (zero), an affirmative judgment is made at step S620, and the predicted amount of residual ink Ix at this point in time is calculated at step S640. This will be a value that is different from the previously predicted amount of residual ink Ix. Further, the amount of cleaning ink Icln should be a value obtained at step S650 by dividing the predicted amount of residual ink Ix by the fixed value C (=2) (Ix/2). Then, at step S660, the CPU 72 updates the total amount of cleaning ink ΣIcln, and performs an instance of cleaning at step S670. The total consumption of ink in FIG. 22 represents that prevailing when the instance of cleaning was completed. Further, an assumption is made that requests for cleaning were made after both the eighth and the ninth instances of printing were completed. Each request for cleaning was processed in a similar manner to the process carried out after the seventh printing, and finally the tenth printing was terminated. FIG. 23 shows that condition. In this example, the amount of cleaning ink Icln on each occasion can be seen. If an assumption is made that Ix/2 of FIG. 21 is A, the following geometric series can be obtained: Ix/2 for the first time, $A/(2^2)$ for the second time, $A/(2^3)$ for the third time, and $A/(2^4)$ for the fourth time. The total amount of cleaning ink ΣIcln when the number of times reaches infinity will converge at A (This point is the same if the fixed value C exceeds 1). Thus, although the amount of cleaning ink Ic1$n$ gradually decreases as the number of instances of cleaning increases, cleaning can still be performed whatever number of instances of cleaning has taken place. In addition, since theoretically, the sum of the total amount of cleaning ink ΣIcln and the total amount of ink printed ΣIpr can not exceed the initial amount of ink filled Iint, effective shut-off control can be achieved.

Figure 24:
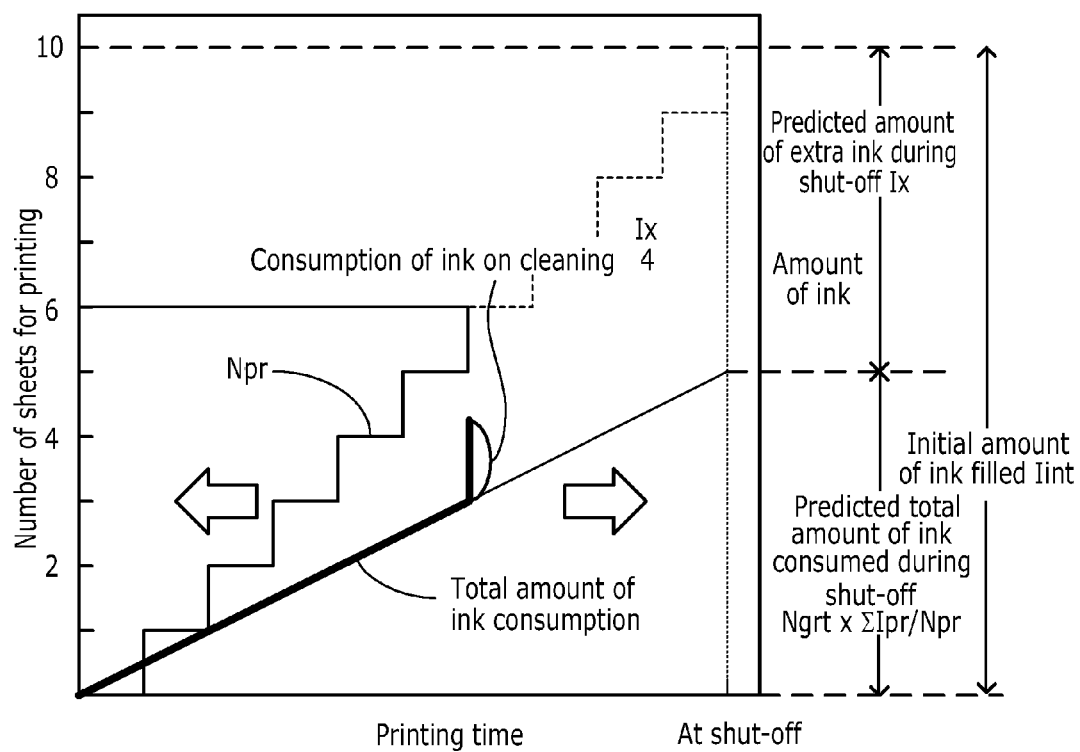
FIG. 24 is an illustration of variations in the number of sheets printed and in the total consumption of ink in the third embodiment.
Figure 25:
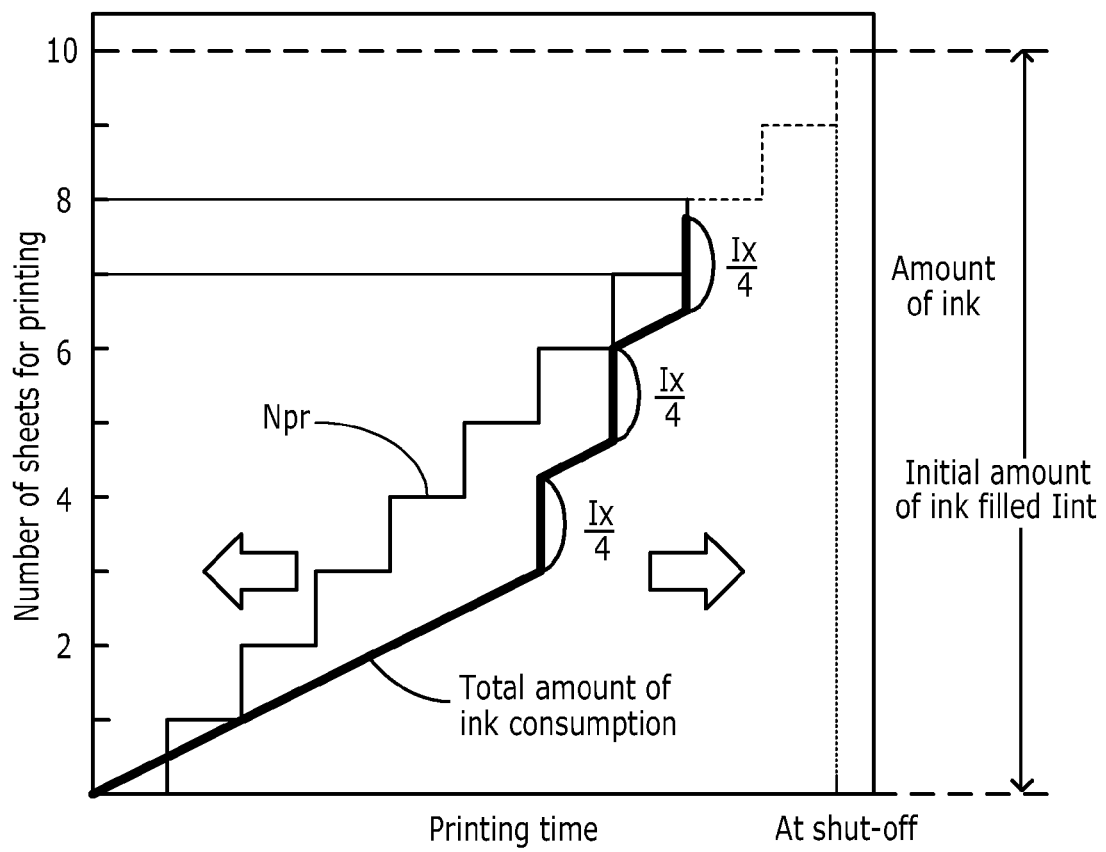
FIG. 25 is an illustration of variations in the number of sheets printed and in the total consumption of the ink in the third embodiment.
Figure 26:
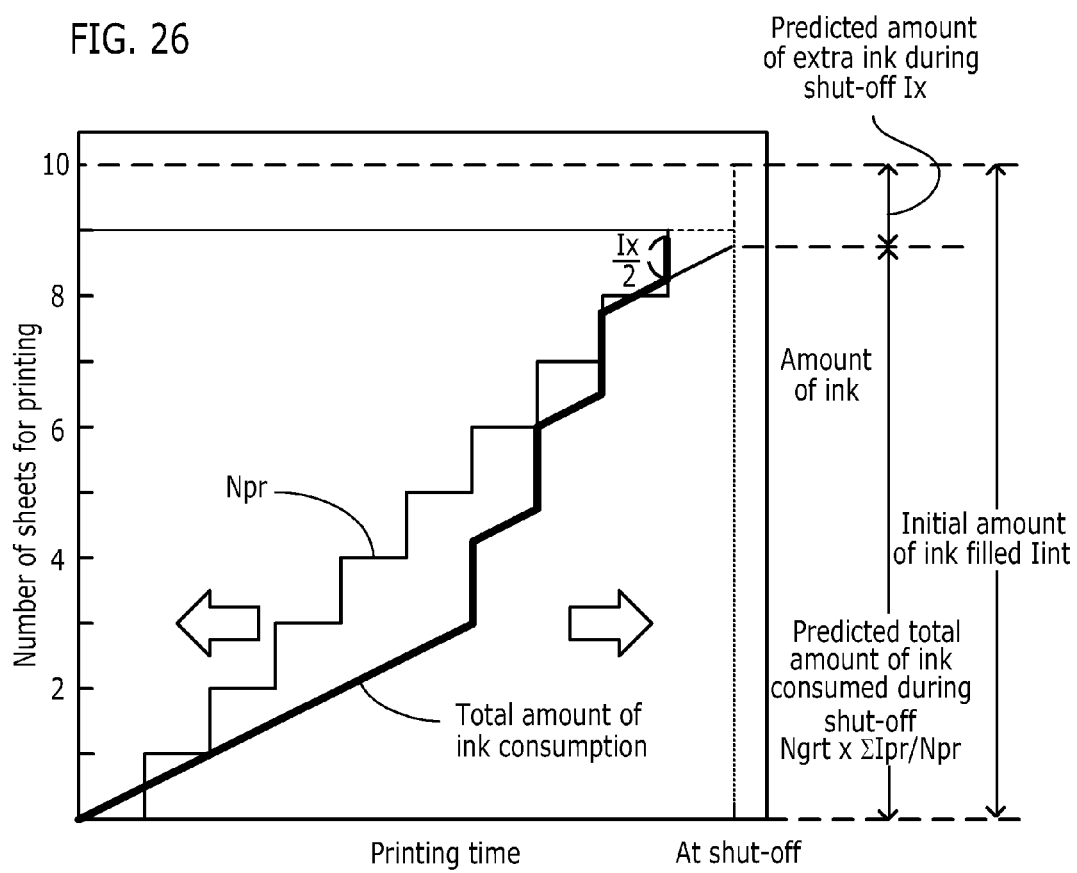
FIG. 26 is an illustration of variations in the number of sheets printed and in the total consumption of the ink in the third embodiment.

Next, on the basis of the timing charts of FIG. 24 to FIG. 26, changes in the number of sheets printed Npr and the total consumption of ink will be described relative to variations in printing time. In this context, a case will be described in which the ink cartridge 50 is replaced with a new one, and, as shown in FIG. 23, a total of instances of 4 cleaning were performed while the ink cartridge 50 used before replacement was attached. For ease of explanation, it should be assumed that the number of sheets guaranteed for printing is 10 sheets, and that the amount of ink used for printing any one sheet is identical. When a new ink cartridge 50 is attached, the anticipated number of instances of cleaning is set to 4 because the number of instances of cleaning of the ink cartridge 50 before replacement was 4. As shown in FIG. 24, it can be assumed that a request for cleaning is made for the first time after the sixth instance of printing ended, i.e., when the number of sheets printed Npr was 6. At this time, as the number of instances of cleaning Ncln is 1, an affirmative judgment is made at step S600, and the predicted amount of residual ink Ix is calculated at step S610. Then, since the number of instances of cleaning Ncln is smaller than the anticipated number of instances of cleaning Nx (=4), a negative judgment is made at step S620. Then, at step S630 the amount of cleaning ink Icln should be a value obtained by dividing the predicted amount of residual ink Ix by the anticipated number of instances of cleaning Nx (Ix/4). Then, at step S660, the CPU 72 updates the total amount of cleaning ink Icln and performs an instance of cleaning at step S670. The total consumption ink in FIG. 24 is that prevailing when this instance of cleaning was completed. FIG. 25 reveals that later a request for cleaning was made after both the seventh and eighth instances of printing had been completed, and that each request for cleaning was processed in a manner similar to the process that took place after the sixth printing. As shown in FIG. 25, while the number of instances of cleaning ranges from 1 to 3, the amount of cleaning ink Icln is the same value Ix/4. (However, Ix is the predicted amount of residual ink when the first request for cleaning was made). Then, as shown in FIG. 26, an assumption is made that after the ninth instance of printing ended, i.e., when the number of sheets printed was 9, a request for cleaning was again made. Then, as the number of instance of cleaning Ncln is 4, and greater than the anticipated number of instances of cleaning Nx (=4), an affirmative judgment is made at step S620. At step S640, the predicted amount of residual ink Ix at this point in time is calculated. Then, at step S650, the amount of cleaning ink Ic1$n$ should be a value obtained by dividing the predicted amount of residual ink Ix by the fixed value C (=2) (Ix/2). At step S660, the CPU 72 updates the total amount of cleaning ink ΣIcln and in step S670 performs an instance of cleaning. The total consumption of ink in FIG. 26 is that which prevailed when this instance of cleaning had been completed. In this example, until the instance of cleaning immediately before the number of instances of cleaning Ncln reaches the anticipated number of instances of cleaning Nx (=4), i.e., while the number of instances of cleaning ranges from 1 to 3, the amount of cleaning ink Icln is the same value Ix/4. (However, Ix is the predicted amount of residual ink when the first request for an instance of cleaning was made). However, after the number of instances of cleaning Ncln has reached four or later, the amount of cleaning ink will be the value obtained by dividing by the fixed value C (=2) the predicted amount of residual ink Ix at the time that the request for cleaning was made (Ir/2). Thus, if it is assumed that the amount of residual ink Ix at this point in time is B, the following geometric series will be obtained: B/2 for the fourth time, B/(22) for the fifth time, A/(23) for the sixth time, etc. The accumulated value of the fourth or later amounts of cleaning ink when the number of instances reaches infinity will converge at B. Thus, although the amount of cleaning ink Icl$n$ gradually decreases after the number of instances of cleaning reaches the anticipated number of instances of cleaning Nx, cleaning can still be performed however many instances of cleaning have already taken place. In addition, since, theoretically, the sum of the total amount of cleaning ink ΣIcln and the total amount of ink printed ΣIpr can not exceed the initial amount of ink filled lint, effective shut-off control can be achieved.

Next, the relationship between components of this embodiment and those of the present invention will be clarified. The printer mechanism 21 of this embodiment corresponds to the printing module of the present invention. The suction pump 42 corresponds to the cleaning module. The CPU 72 and the ROM 73 of the controller 70, the RAM 74, and the flash memory 75 correspond to the printing control module, the amount of cleaning ink setting module, the total amount of printed ink derivation module, the total amount of cleaning ink derivation module, and the amount of cleaning ink setting module. In addition, the memory element 54 (or flashing memory 75) corresponds to the number of instances of cleaning storage means. In addition, in this embodiment, one example of a control method for the printing device of the present invention will also be clarified by means of a description of operations performed by the ink jet printer 20.

According to the ink jet printer 20 of this embodiment as described in detail above, when an ink cartridge 50 is first attached (i.e., when the anticipated number of instances of cleaning Nx is zero), in order to perform cleaning, an amount less than the predicted amount of residual ink Ix (predicted amount of residual ink Ix/fixed value C) is set as the amount of cleaning ink Icln. Thus, ink runout tends not to occur before the number of sheets printed Npr reaches the number of sheets guaranteed for printing Ngrt. Effective shut-off control accordingly becomes possible. In addition, as the amount of cleaning ink Icln is set within the predicted amount of residual ink Ix, when a request for the cleaning of nozzles 23 is made, the cleaning of nozzles 23 can be performed with a degree of certainty.

Furthermore, when the ink cartridge 50 is replaced, the number of instances of cleaning Ncln while the ink cartridge 50 before replacement was attached is the anticipated number of instances of cleaning Nx, a number that it is expected will be performed while the ink cartridge 50 after replacement is attached. As the subsequent amount of cleaning ink Icln is set with the anticipated number of instances of cleaning Nx taken into due consideration, the amount of cleaning ink per instance of cleaning will be appropriate. In addition, after the number of instances of cleaning after conversion to the new ink cartridge 50 has reached the number of cleanings anticipated Nx, cleaning is performed with amounts of ink that are smaller than the predicted amount of residual ink Ix at that point in time. Thus, cleaning can be performed with a degree of certainty, and as almost no runout occurs before the number of sheets printed Npr reaches the number of sheets guaranteed for printing Ngrt, effective shut-off control can be achieved.

It goes without saying that, the present invention is not limited to the embodiments described above, and that it can be carried out in a variety of embodiments, as long as they remain confined to the technical range of this invention.

Figure 27:
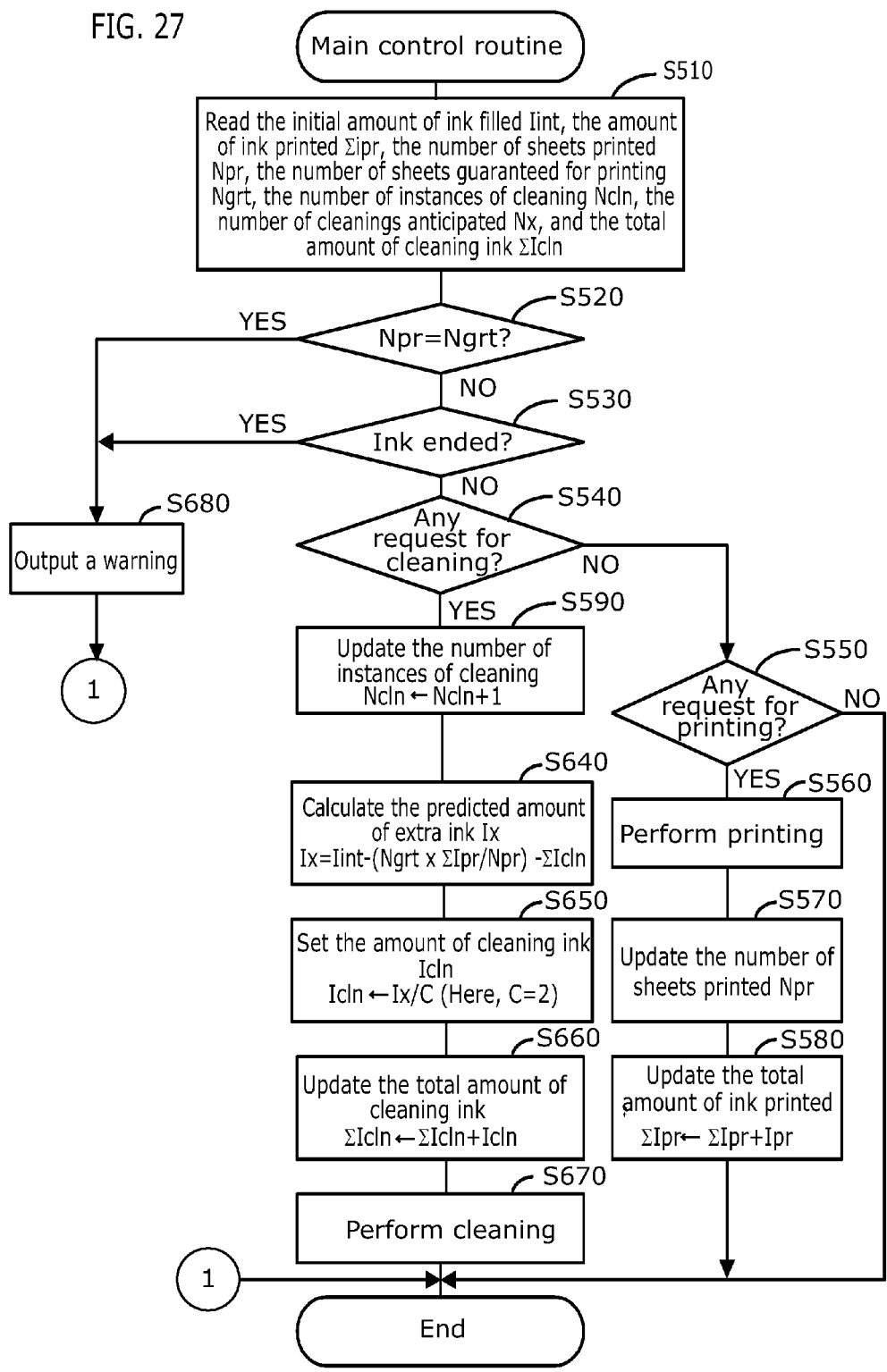
FIG. 27 is a flow chart of a main control routine of another example of the third embodiment.

For instance, in the main control routine of the embodiment described above as illustrated in FIG. 20, after the number of instances of cleaning Ncln is updated at step S590, the CPU 72 may proceed to step S640 where it calculates the predicted amount of residual ink Ix, calculates at step S650 a value as the amount of cleaning ink Icln obtained by dividing the predicted amount of residual ink Ix by the fixed value C, updates the total amount of cleaning ink ΣIcln at step S660, and performs an instance of cleaning at step S670 (Refer to FIG. 27). In these circumstances, since an amount less than the predicted amount of residual ink Ix (the predicted amount of residual ink Ix/fixed value C) is set as the amount of cleaning ink Icln when an instance of cleaning is performed, ink runout tends not to occur before the number of sheets printed Npr reaches the number of sheets guaranteed for printing Ngrt. Thus, effective shut-off control can be achieved. In addition, since the amount of cleaning ink Icln is set within the predicted amount of residual ink Ix, when a request is made for the cleaning of nozzles 23, the cleaning of nozzles 23 can be performed with a degree of certainty.

In the embodiment described above, the total amount of cleaning ink ΣIcln is calculated as an accumulated value of the amount of cleaning ink Icln. However, the amount of ink actually consumed during instances of cleaning may be calculated as an accumulated value of the amount of ink, on the basis of the number of rotations of the suction pump 42, and of ink weight corresponding to the rotations.

In the embodiment described above, the anticipated number of instances of cleaning Nx is zero at the time that an ink cartridge 50 is first attached. However, in such circumstances, the anticipated number of instances of cleaning Nx may be an integer of 1 or higher (for instance, twice). In that case, as well, effects can be achieved that are almost identical to those in the embodiment described above.

In the embodiment described above, adopted as the anticipated number of instances of cleaning Nx, cleanings that are considered likely to be performed while the ink cartridge 50 after replacement is attached, was the number of instances of cleaning Ncln that had been performed while the ink cartridge 50 before replacement was attached. However, if more than one ink cartridge 50 has been replaced in the past, the average value of the number of instances of cleaning Ncln performed with those ink cartridges 50 may be adopted.

In the embodiment described above, the printer mechanism 21 is of an off-carriage type in which the ink cartridge 50 is mounted on the main body. However, the printer mechanism 21 may be of an on-carriage type in which the ink cartridge 50 is mounted on the carriage 22. In such a case, if the cartridge replace button (not shown) is pressed, the CPU 72 judges whether or not data stored in the memory element 54 attached to the ink cartridge 50 matches data stored in the flash memory 75, and may then determine whether or not replacement of the cartridge has occurred.

In the embodiment described above, the ink jet printer 20 is shown as being capable of performing the function of a printer. However, the ink jet printer 20 may also perform the functions of a scanner or a facsimile, in addition to the function of a printer.

Fourth Embodiment

Figure 28:
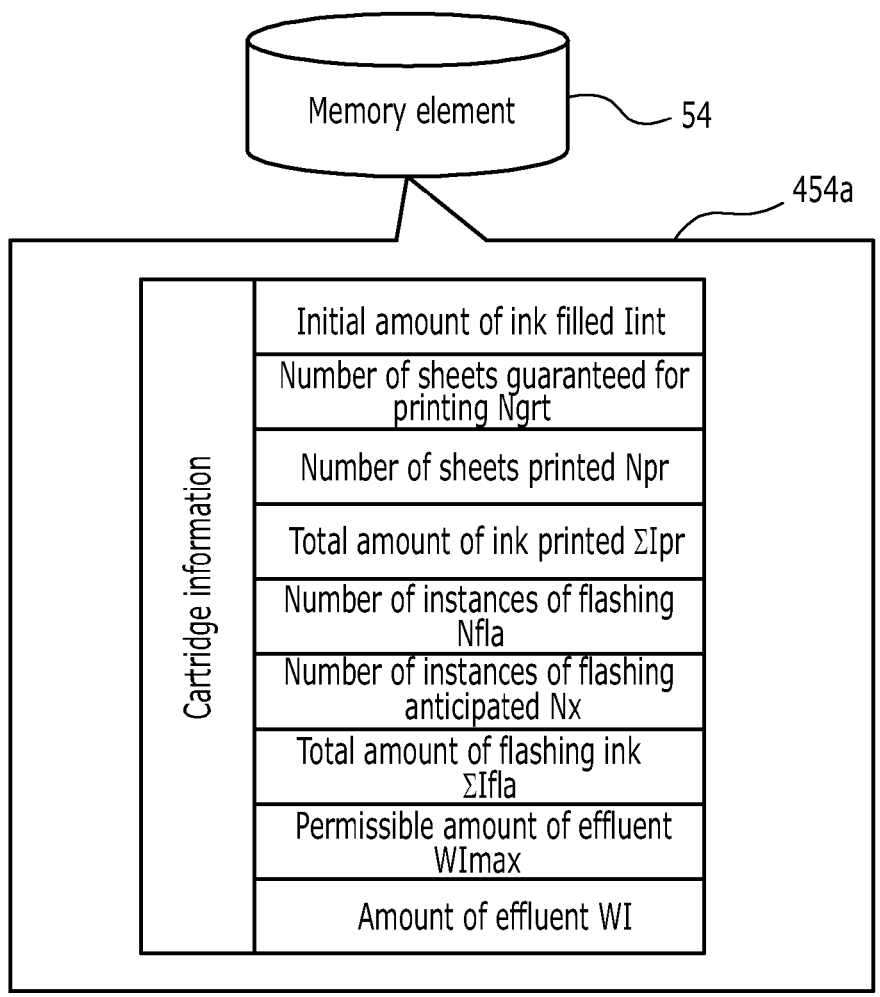
FIG. 28 is an illustration of information 454a stored in the memory element 54 of the fourth embodiment.

As the ink jet printer 20 of this embodiment has the same configuration as that of the first embodiment, a description thereof is omitted. In addition, as the contents displayed on the display unit 62 of the operation unit 60 are same as those of the third embodiment, a description thereof is also omitted. However, in this embodiment, information stored in the memory element 54 differs from that in the first embodiment, and a description thereof follows. FIG. 28 is an illustration of cartridge information 454a stored in the memory element 54.

As illustrated in FIG. 28, the cartridge information 454a includes items such as the initial amounts of ink filled Iint, corresponding to the individual ink containers 52a to 52f (C, M, Y, R, B, K), into an ink cartridge 50 attached at the time; the number of sheets guaranteed for printing Ngrt set as an upper limit of the number of sheets that can be printed with the ink cartridge 50 attached at the time; the number of sheets printed Npr that represents the number of sheets printed while the ink cartridge 50 in question is attached; the total amount of ink printed $\Sigma$Ipr that represents the total amount of ink consumed during printing performed while the ink cartridge 50 in question is attached; the number of instances of flushing Nfla actually performed while one sheet for printing is printed; the anticipated number of instances of flushing Nx that is set before printing of one sheet for printing is commenced, and that is expected to take place during the printing; the total amount of flushing ink $\Sigma$Ifla that represents the total amount of ink consumed during instances of flushing performed while one sheet for printing is being printed; the permissible amount of effluent Wimax that is the maximum amount that can be absorbed by the effluent pad 53; and the amount of effluent WI that is the amount that has been absorbed by the effluent pad 53 up to that time.

Figure 29:
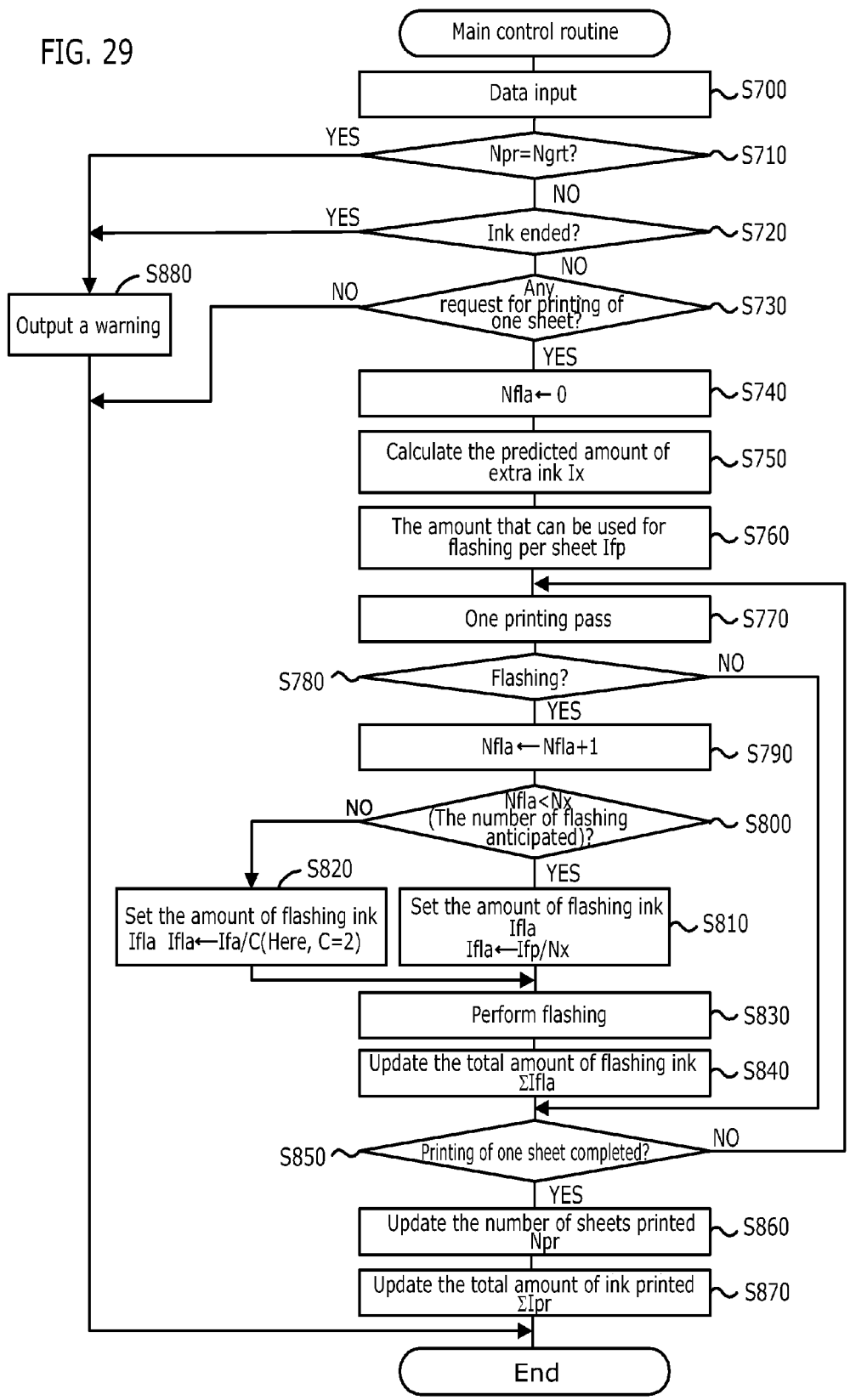
FIG. 29 is a flow chart illustrating one example of the main control routine of the fourth embodiment.

Next will be described operations of the ink jet printer 20 of this embodiment that has thus been configured. FIG. 29 is a flow chart illustrating one example of a main control routine executed by the CPU 72 of the controller 70. The routine is stored in the ROM 73 and is repeatedly executed by the CPU 72 at predetermined intervals after the power of the ink jet printer 20 has been turned ON. When the routine is started, the CPU 72 first enters various data (Step S700). More specifically, the CPU 72 enters data such as the initial amount of ink filled Iint, corresponding to individual ink containers 52a to 52f (C, M, Y, R, B, K), into an ink cartridge 50 attached at the time; the number of sheets guaranteed for printing Ngrt set as an upper limit of the number of sheets that can be printed with the ink cartridge 50 attached at the time; the number of sheets printed Npr that represents the number of sheets printed while the ink cartridge 50 in question has been attached; the total amount of ink printed $\Sigma$Ipr that represents the total amount of ink consumed during instances of printing performed while the ink cartridge 50 in question has been attached; the number of instances of flushing Nfla actually performed while one sheet for printing is being printed; the anticipated number of instances of flushing Nx that is set before printing of one sheet is commenced, and that is expected to take place during the printing; the total amount of flushing ink $\Sigma$Ifla that represents the total amount of ink consumed during instances of flushing performed while one sheet for printing is being printed. Although the data has been stored in both the memory element 54 attached to the ink cartridge 50 and the flash memory 75 of the controller 75, in this embodiment the data is read from the flash memory 75 and entered. In addition, when a cartridge cover (not shown), which is opened or closed when the ink cartridge 50 is replaced, is opened or closed, the CPU 72 judges whether or not data stored in the memory element 54 attached to the ink cartridge 50 matches data stored in the flash memory 75. If both data match, the CPU 72 judges that the cartridge has not been replaced, and thus does not update the data. However, if the two set of data do not match, the CPU 72 judges that the ink cartridge 50 has been replaced with a new one. Then, the CPU 72 updates the number of sheets guaranteed for printing Ngrt, and carries out a procedure such as resetting the total amount of ink $\Sigma$Icln, and the total amount of flushing ink $\Sigma$Ifla to zero.

Next, the CPU 72 judges whether or not the number of sheets printed Npr has reached the number of sheets guaranteed for printing Ngrt (step S710), and whether or not the amount of ink remaining in any one of the ink containers 52a to 52f has fallen under a ink runout judgment value (step S720). In this context, the ink runout judgment value is set so as to be slightly higher than zero so that ink will not run out while printing is being performed onto sheets for printing. In addition, the initial amount of ink filled Iinit into individual ink containers 52a to 52f is normally set so that ink runout will not occur before the number of sheets printed Npr reaches the number of sheets guaranteed for printing Ngrt. However, as the possibility of ink runout occurring for some unexpected reasons cannot be ruled out, in anticipation of such a contingency, the process of step S720 should be performed. The amount of ink remaining, or the ink runout judgment value, is expressed in terms of weight. Moreover, if, at step S710, the number of sheets printed Npr has not reached the number of sheets guaranteed for printing Ngrt, and when the amount of ink remaining in any of ink containers 52a to 52f does not fall under the ink runout judgment value, the CPU 72 judges whether or not any request for the cleaning of nozzles 23 exists (step S730). The request for printing is made by means of an instruction from a user from the operation panel 60, or by means of an instruction from a user, from a printer driver installed in the user PC 90.

If no request for printing has been made at step S730, the CPU 72 directly terminates the routine. On the other hand, if a request for printing has been made, the CPU 72 resets to zero the number of instances of flushing Nlfa that represents the number of instances of flushing performed while one sheet for printing was on this occasion being printed (step S740), and calculates the predicted amount of residual ink for each color (step S750). More specifically, if ink is used only for printing and flushing, the amount of ink used at this point in time is the sum of the total amount of ink printed $\Sigma$Ipr and the total amount of flushing ink $\Sigma$ifla. In addition, on the assumptions that only printing is to be performed from then on, and that the number of sheets printed Npr has reached the number of sheets guaranteed for printing Ngr, the predicted amount of ink printed is obtained by determining an average amount of ink printed per sheet of that color, by dividing the total amount of ink printed $\Sigma$Ipr by the number of sheets printed Npr, and by then multiplying the average value by the sheets remaining for printing (=Ngrt−Npr). In this case, the predicted amount of residual ink is a value obtained by subtracting from the initial amount of ink filled Iint into the ink cartridge 50 attached at the time (refer to the formula (3)) the amount of ink used ($\Sigma$Ipr+$\Sigma$Ifla) and the predicted amount of ink printed ((Ngrt−Npr)×($\Sigma$Ipr)/Npr). In addition, formula (3) is designed for circumstances where the number of sheets printed Npr is 1 or higher, and when the number of sheets printed Npr is zero, the predicted amount of residual ink Ix is calculated by deeming the average amount of ink printed per one sheet to be a predetermined default value D (refer to formula (4)). The default value D may be a value that is determined empirically.

When $Npr \geq 1$ $$Ix = Iint - (\Sigma Ipr + \Sigma Ifla) - (Ngrt - Npr) \times (\Sigma Ipr)/Npr \quad (3)$$
$$= Iint - Ngrt \times (\Sigma Ipr)/Npr - \Sigma Ifla$$

When $Npr = 0$, $$Ix = Iint - Ngrt \times D - \Sigma Ifla \quad (4)$$

Figure 30:
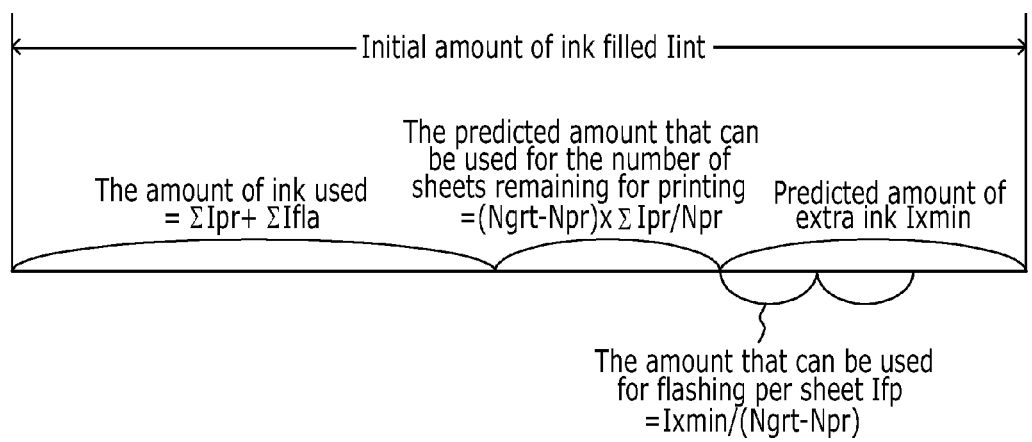
FIG. 30 is an illustration of the amount available for flushing in respect of one sheet for printing in the fourth embodiment.

The amount that can be used for flushing per sheet Ifp is calculated on the basis of the smallest value of the predicted amounts of residual ink Ix among the predicted amount of residual ink of each color that have thus been determined (step S760). More specifically, if an assumption is made that the smallest value of the predicted amount of residual ink Ix among the predicted amounts of residual ink Ix of respective colors is the predicted amount of residual ink Ixmin, the amount that can be used for flushing per sheet Ifp will be a value obtained by dividing this predicted amount of residual ink Ixmin by the number of sheets remaining for printing (=Ngrt−Npr) (refer to formula (5)). This condition is illustrated in FIG. 30.

$$Ifp = Ixmin/(Ngrt - Npr) \quad (5)$$

Next, a one-way movement of the carriage 22 from one end of the platen 40 to the other end is deemed to be one pass, and printing of the equivalent of one pass is performed (step S770). More specifically, print data of a photographic image, which is the object of a request for printing, is read from the print buffer of the RAM 74, and the print data is developed into a bitmap image. Then, after a recording sheet S is transported to the area on the platen 40 where printing is possible by the driving of the drive motor 33 of the printer mechanism 21 to perform the rotation of the paper feed roller 35, the CPU 72 controls voltage to the print head 24 so that while the carriage motor 34a is being driven and the carriage 22 moves by way of the carriage belt 32 from one end of the platen 40 to the other, the development data of one pass is printed on the recording sheet.

After printing of one pass has thus been performed, the CPU 72 judges whether or not it is an appropriate time to execute an instance of flushing (step S780). In this embodiment, the time for an instance of flushing to be performed occurs every time that a pre-defined given period of time elapses. Moreover, the relationship between, on the one hand, the period of time during which nozzles 23 are exposed and left in the fresh air and, on the other hand, increases in levels of thickening of ink within the nozzles 23, is determined in advance by means of experiments, and the time that nozzles 23 can be left is a value that is slightly lower than a period of abandonment that is required for the thickening of ink within the nozzles 23 to become a value that starts to interfere with the ejection of ink. Further, if it is not an appropriate time to perform an instance of flushing at step S770, the process proceeds to step S850 which will be described later.

On the other hand, if, at step S780, it is an appropriate time to perform an instance of flushing, the CPU 72 increases the number of instances of flushing Nfla by 1 (step S790), and judges whether or not the number of instances of flushing Nfla is less than the anticipated number of instances of flushing Nx (step S800). In this embodiment, the anticipated number of instances of flushing Nx is a value obtained by dividing the time required for the printing of one sheet for printing by the time required to perform an instance of flushing, and by rounding up any fractional part of the resultant value. The period of time required for the printing of one sheet for printing should be decided in such a way that it expands commensurately with improvements in printing resolution. Further, when the number of instances of flushing Nfl is less than the anticipated number of instances of flushing Nx, the CPU 72 sets as the amount of flushing ink Ifla on this occasion an amount of ink obtained by dividing the amount that can be used for flushing per print sheet Ifp by the anticipated number of instances of flushing Nx (step S810). When the number of instances of flushing Nfla exceeds the anticipated number of instances of flushing Nx, the CPU 72 sets as the amount of flushing ink Ifla on this occasion an amount of ink obtained by dividing the latest amount of flushing ink Ifla by a fixed value C (2 in this case) (step S820). In other words, when the number of instances of flushing Nfla is less than the anticipated number of instances of flushing Nx, the amount of flushing ink Ifla will be a given amount (a value obtained by dividing the amount that can be used for flushing per sheet Ifp by the anticipated number of instances of flushing Nx). When the number of instances of flushing Nfla has reached the anticipated number of instances of flushing Nx, and if the given amount of ink is consumed by flushing, all of the amount that can be used for flushing Ifp per sheet will be entirely used up at that time. Thus, a value obtained by dividing the given content by a fixed value C is made the flushing ink value Ifla. When the number of instances of flushing Nfla exceeds the anticipated number of instances of flushing Nx, a value obtained by dividing the latest amount of flushing ink Ifla by the fixed value C is the amount of flushing ink Ifla. Hence, even if the number of instances of flushing Nlfa exceeds the anticipated number of instances of flushing Nx, the amount of flushing ink Ifla required for every instance of flushing can be ensured, while at the same time care is taken to ensure that the amount of ink actually used for flushing Ifp per one sheet does not exceed the amount that can be used for flushing per sheet Ifp.

Figure 31:
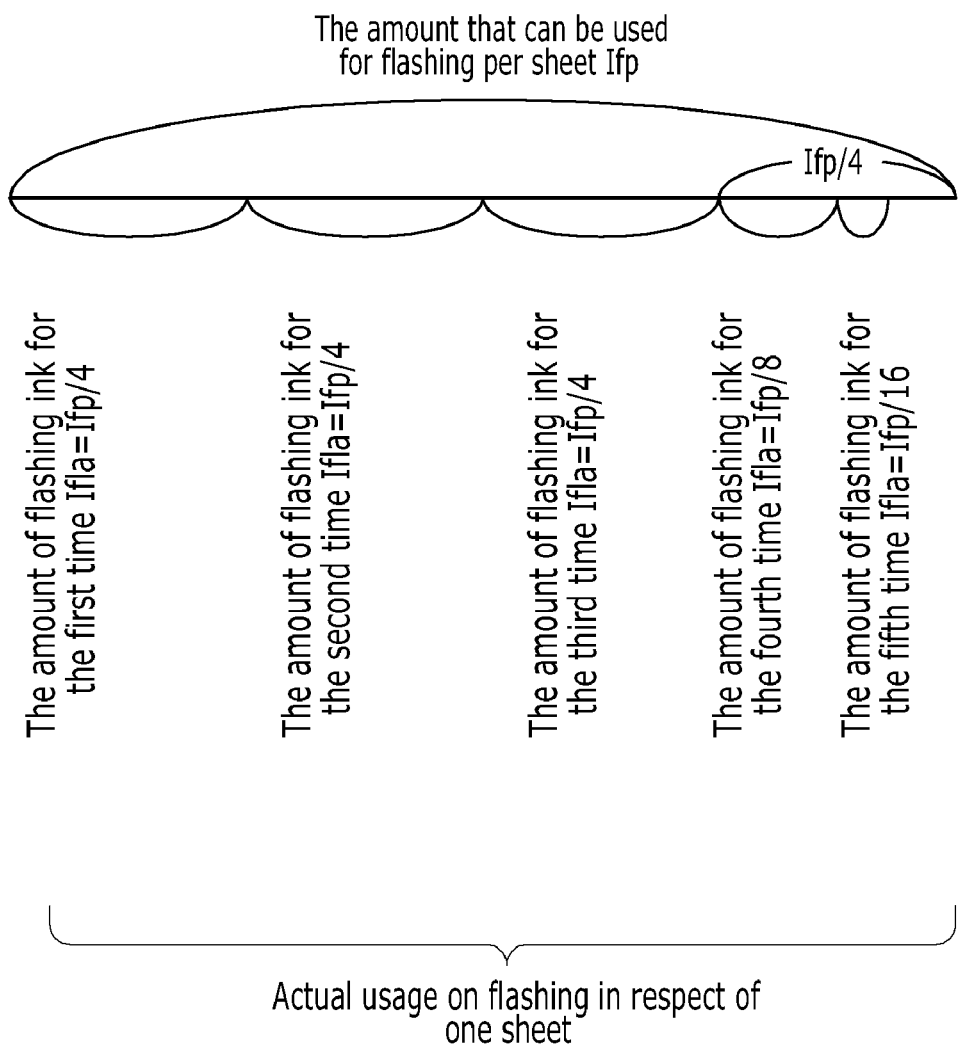
FIG. 31 is an illustration of variations in the amount of ink for flushing Ifla in the fourth embodiment.

FIG. 31 is an illustration of variations in the amount of ink for flushing Ifla when the anticipated number of instances of flushing Nx is set to 4. As shown in this Figure, when the number of instances of flushing Nfla is between 1 and 3, the amount of flushing ink Ifla is a value Ifp/4 obtained by dividing the amount that can be used for flushing Ifla per print sheet by the number of instances of flushing anticipated Nx. Further, if the number of instances of flushing Nfla is the $4^{th}$, the amount of flushing ink Ifla is a value Ifp/8 obtained by dividing the third amount of flushing ink Ifp/4 by a fixed value C (2 in this case). Furthermore, if the number of instances of flushing Nfla is the $5^{th}$, the amount of flushing ink is a value Ifp/16 obtained by dividing the fourth amount of flushing ink Ifp/8 by the fixed value C (2 in this case). Thus, even when the number of instances of flushing Nfla exceeds the number of instances of flushing anticipated Nx, the amount actually used for flushing Ifla per one sheet will not exceed the amount that can be used for flushing per one sheet Iflp.

After thus setting the amount of flushing ink Ifla, the CPU 72 performs an instance of flushing (step S830). More specifically, the carriage motor 34a is driven to move the carriage 22 by way of the carriage belt 32, so that nozzles 23 of the print head 24 are located in a position opposite to the flushing area 38 formed at the left end of the platen 40. Then, the CPU 72 controls voltage to print head 24 so that ink is ejected from the nozzles 23 of the print head 24, until such time as ink corresponding to the amount of flushing ink Ifla that has been set earlier is consumed. Then, the CPU 72 adds the amount of flushing ink Ifla on this occasion to the total amount of flushing ink ΣIfla for every color and calculates a new total amount of flushing ink ΣIfla that takes into account the amounts of ink added (step S840). Then, the CPU 72 judges whether or not printing of one sheet for printing has been completed (step S850). If printing of one sheet for printing has not yet been completed, the CPU 72 returns once again to step S770 and performs printing of one pass. On the other hand, when printing of one sheet for printing has been completed, the CPU 72 increases the number of sheets printed Npr by 1 (step S860), adds to the total amount of ink print ΣIpr the amount of ink printed Ipr used during printing on this occasion, and calculates a revised total amount of ink printed ΣIpr that takes into account the amount of ink added (step S870). Then, the CPU 72 terminates the routine. Furthermore, the total amount of ink printed ΣIpr needs to be calculated for every color. More specifically, dots are divided into three sizes, namely, large dots, medium dots, and small dots, and an ink weight is determined for every single dot of each size in each color. Then, every time that one printing pass is terminated, on the basis of information on what size of dot has been used for each color, how many times has each size of dot has been used for each color, and on the basis of ink weight of each single dot, ink usage for each color is calculated (Unit: weight). When printing of one sheet for printing has been completed, ink usage for every printing pass for every color is added up so as to calculate the amount of ink of each color printed Ipr. Then, the total amount of ink printed ΣIpr is calculated by adding up the amounts of ink of each color printed Ipr. The amounts of flushing ink Ifla should also be calculated in a similar fashion in terms of weight.

On the other hand, if, at step S710, the number of sheets printed Npr has reached the number of sheets guaranteed for printing Ngrt, or if, at step S720, the amount of ink remaining in any of the ink containers 52a to 52f falls below the ink runout judgment value, the CPU 72 displays on the message display unit 380b of the operation panel 60 a message to the effect that printing is not possible (step S880) and terminates the routine. Further, the initial amount of ink filled Iinit into the individual ink containers 52a to 52f is normally set so that ink runout will not occur before the number of sheets printed Npr reaches the number of sheets guaranteed for printing Ngrt. However, as the possibility of ink runout occurring for some unexpected reason cannot be denied, in anticipation of such circumstance, the process of step S720 should be performed.

The relationship between components of this embodiment and those of the present invention will be clarified. The print head 24 of this embodiment corresponds to the print head of the present invention. The CPU 72, the ROM 73, the RAM 74, and the flash memory 75 of the controller 70 correspond to the printing control module, the flushing request module, and the flushing control module. In addition, in this embodiment, one example of a control method of the printing device of the present invention will also be clarified by means of a description of operations of the ink jet printer 20.

Since according to the ink jet printer 20 of this embodiment, as described in detail above, flushing is performed as long as the amount of ink actually used for flushing per sheet for printing does not exceed the amount that can be used for flushing per sheet Ifp, calculated on the basis of the predicted amount of residual ink Ix and the number of sheets remaining for printing, almost no ink runout occurs before the number of sheets printed Npr reaches the number of sheets guaranteed for printing Ngrt. Effective shut-off control is thereby achieved. In addition, even if a number of instances of flushing are requested for one sheet for printing, each instance of flushing can be performed with a degree of certainty. Furthermore, the amount of ink remaining in the ink cartridge 50 after shut-off can be kept at as low a level as possible.

It goes without saying that, the present invention is not limited to the embodiments described above, and that it can be carried out in a variety of embodiments, as long as they remain confined to the technical range of this invention.

For instance, in the main control routine of FIG. 29 of the embodiment described above, a judgment is made at step S800 as to whether or not the number of instances of flushing per sheet for printing Nfla is less than the anticipated number of instances of flushing Nx. However, steps S800 and S810 may be eliminated, and by proceeding to S820 after step S790, the CPU 72 may set as the amount of flushing ink Ifla on this occasion an amount of ink obtained by dividing the latest amount of flushing ink Ifla by the fixed amount C. Then, the CPU 72 may proceed to step S830 and perform an instance of flushing. In this case, the first amount of flushing ink Ifla is a value obtained by dividing by the fixed value C the amount that can be used for flushing per sheet for printing Ifp. In a similar manner to the embodiment described above, this can not only result in effective shut-off control but also possesses the advantage that even if more than one instance of flushing is requested in respect of one sheet of print medium, each instance of flushing can be carried out with a degree of certainty. In addition, in this case, there is no need to set the anticipated number of instances of flushing, thus making it possible to eliminate the counting of the number of instances of flushing Nfla.

In the main control routine of the embodiment described above as illustrated in FIG. 29, at step S760, only the amount of ink used for printing and flushing is considered as the amount of ink used. However, if cleaning is performed, the amount of ink used during cleaning may also be added to the amount of ink used.

In the embodiment described above, the flushing area 38 is provided at the left end of the platen 40. However, flushing may be performed without providing a flushing area 38, and by instead making the capping device 41 an area in which printing does not take place. Alternatively, flushing may also be performed by making both the flushing area 38 and the capping device 41 areas where printing does not take place. In this case, the flushing area 38 can be used if flushing is performed while the print head 24 is located at the left end of the platen 40 after printing of one pass has been completed, and the capping device 41 can be used if flushing is performed while the print head 24 is located at the right end of the platen 40. Thus, throughput can be shortened.

In the embodiment described above, an instance of flushing is performed every time that a predetermined period of time elapses. However, an instance of flushing may also be performed every time that printing is performed throughout a predetermined number of passes. However, should for any reason the processing power of the CPU 72 be reduced, the time required for printing would become longer, even if printing were performed for the same number of passes. Consequently, the viscosity of ink in nozzles 23 that do not eject ink would increase more than expected, and in some cases thickening of ink might not be rectified. Thus, it is preferable to set in such a way that flushing is performed every time that a predetermined period of time elapses. Further, the performance of an instance of flushing may be made dependent on a flushing command from a user.

In the embodiment described above, the printer mechanism 21 is of an off-carriage type in which the ink cartridge 50 is mounted on the main body. However, the printer mechanism 21 may be a printer mechanism 21 of an on-carriage type in which the ink cartridge 50 is mounted on the carriage 22. In these circumstances, if the cartridge replace button (not shown) is pressed, the CPU 72 judges whether or not data stored in the memory element 54 attached to the ink cartridge 50 matches data stored in the flash memory 75, and may then determine whether or not replacement of the cartridge has occurred.

In the embodiment described above, the ink jet printer 20 is shown as performing the function of a printer. However, the ink jet printer 20 may also perform the function of a scanner or a facsimile, in addition to the printer function.

The present application claims the benefit of priority from Japanese Patent Application No. 2006-071372 filed on Mar. 15, 2006, Japanese Patent Application No. 2006-080191 filed on Mar. 23, 2006, Japanese Patent Application No. 2006-086128 filed on Mar. 27, 2006, and Japanese Patent Application No. 2006-101567 filed on Apr. 3, 2006, the entire contents of all of which are incorporated herein by reference.

What is claimed is:

1. A printing device for printing on a print medium, comprising:
    a printing module that prints an image onto a print medium by using a cartridge that contains a colorant, and for which cartridge is set a number of sheets guaranteed for printing, the number of sheets guaranteed for printing representing an upper limit of sheets that can be printed;
    a notification module that notifies information on a number of sheets remaining that can be printed with the cartridge; and
    a control module that prevents the printing module from printing with the cartridge when a number of sheets printed by the printing module has reached the number of sheets guaranteed for printing, and causes the printing module to print an image onto the print medium with the cartridge when the number of sheets printed has not reached the number of sheets guaranteed for printing, the control module determining the number of sheets remaining by subtracting the number of sheets printed from the number of sheets guaranteed for printing and causing the notification module to notify information on the thus determined number of sheets remaining.

2. The printing device according to claim 1, comprising:
    a storage module that stores the number of sheets remaining; and
    an acquisition module that acquires a notification command for causing the notification module to notify the number of sheets remaining;
    wherein the control module, after causing the printing module to print an image onto the print medium using the cartridge, reduces the number of sheets remaining and causes the storage module to store the number of sheets remaining; and when the acquisition module has acquired the notification command, the control module reads from the storage module the number of sheets remaining and, on the basis of the results read, causes the notification module to notify information on the number of sheets remaining.

3. The printing device according to claim 2, wherein the storage module is a memory element provided on the cartridge.

4. The printing device according to claim 1, wherein the control module causes the notification module to notify the information on the number of sheets remaining in a mode such that a relationship can be recognized between the number of sheets guaranteed for printing and the number of sheets remaining.

5. The printing device according to claim 1, wherein the control module keeps track of an amount of colorant remaining in the cartridge, and when the amount of the colorant remaining falls below a first predetermined amount remaining, or when the number of sheets remaining falls below a first predetermined number of sheets remaining, the control module causes the notification module to notify a message to the effect that the number of sheets that can be printed with the cartridge is limited, and when the amount of the colorant remaining has reached a second predetermined amount remaining, or the number of sheets remaining has reached a second predetermined number of sheets remaining, the control module not only causes the notification module to notify a message to the effect that printing is not possible with the cartridge, but also prevents the printing module from printing with the cartridge.

6. The printing device according to claim 1, wherein:
    the printing module prints a photographic image onto the print medium using the cartridge, the cartridge containing ink as the colorant.

7. A printing device for printing on a print medium, comprising:
    a notification module that notifies information;
    a printing module that prints an image onto a print medium using a cartridge that contains at least a guaranteed amount of colorant for printing, the guaranteed amount of colorant being an amount of colorant that guarantees printing an upper limit of sheets, the upper limit of sheets being set in advance as an upper limit of the number of sheets that can be printed using the cartridge;
    a storage module that stores information on amounts of colorants necessary, the amounts of colorants necessary being amounts of colorants that are adequate to print a predetermined number of entire sheets of each of multiple types of print media; and
    a control module that updates an amount of colorant printed based on a number of sheets printed and the amounts of colorants necessary in response to execution of printing by the printing module, prevents the print module from printing with the cartridge when the amount of colorant printed has reached the guaranteed amount of colorant, and causes the printing module to print an image onto the print medium with the cartridge when the amount of colorant printed has not reached the guaranteed amount of colorant, the control module determining, on the basis of the amounts of colorants printed, the guaranteed amount of colorant, and the information on amounts necessary, a number of sheets remaining for each of the multiple types of print media, and causing the notification module to notify information on the thus determined number of sheets remaining for each of the multiple types of print media.

8. The printing device according to claim 7, wherein:
    the storage module also stores the amount of colorant printed; and
    the control module, after causing the print module to print an image onto the print medium using the cartridge, adds an amount of colorant which has been used during the printing to the amount of colorant printed, and causes the storage module to store the amount of colorant printed.

9. The printing device according to claim 8, wherein:
    the storage module is a memory element provided on the cartridge.

* * * * *